US012765553B2

United States Patent
(12) United States Patent
Qiao

(10) Patent No.: US 12,765,553 B2
(45) Date of Patent: Oct. 20, 2026

(54) COMPOSITIONS AND METHODS FOR ANTIMICROBIAL ARTICLES

(71) Applicant: HALOMINE INC., Ithaca, NY (US)

(72) Inventor: Mingyu Qiao, Ithaca, NY (US)

(73) Assignee: HALOMINE INC., Ithaca, NY (US)

(*) Notice: Subject to any disclaimer, the term of this patent is extended or adjusted under 35 U.S.C. 154(b) by 700 days.

(21) Appl. No.: 17/981,756

(22) Filed: Nov. 7, 2022

(65) Prior Publication Data

US 2023/0165250 A1 Jun. 1, 2023

Related U.S. Application Data

(63) Continuation of application No. PCT/US2021/032226, filed on May 13, 2021.

(60) Provisional application No. 63/025,028, filed on May 14, 2020.

(51) Int. Cl.

| | |
|---|---|
| ***A01N 43/50*** | (2006.01) |
| ***A01P 1/00*** | (2006.01) |
| ***C08F 20/70*** | (2006.01) |
| ***C08L 23/06*** | (2006.01) |
| ***C08L 23/12*** | (2006.01) |
| ***C08L 27/06*** | (2006.01) |

(52) U.S. Cl.

CPC ................ *A01N 43/50* (2013.01); *A01P 1/00* (2021.08); *C08F 20/70* (2013.01); *C08L 23/06* (2013.01); *C08L 23/12* (2013.01); *C08L 27/06* (2013.01); *C08L 2203/16* (2013.01)

(58) Field of Classification Search

CPC .......... C08F 20/36; C08F 20/38; C08F 20/58; A01N 43/50

See application file for complete search history.

(56) References Cited

U.S. PATENT DOCUMENTS

| | | | |
|---|---|---|---|
| 3,925,310 | A | 12/1975 | Wolf et al. |
| 5,670,646 | A | 9/1997 | Worley et al. |
| 6,294,185 | B1 | 9/2001 | Worley et al. |
| 6,548,054 | B2 | 4/2003 | Worley et al. |
| 8,496,920 | B2 | 7/2013 | Worley et al. |
| 8,535,654 | B2 | 9/2013 | Broughton et al. |
| 8,821,907 | B2 | 9/2014 | Worley et al. |

(Continued)

FOREIGN PATENT DOCUMENTS

| | | | | |
|---|---|---|---|---|
| CN | 101967351 A | 2/2011 | | |
| WO | WO-2012096694 A1 * | 7/2012 | ................ | C08F 8/20 |
| WO | WO-2019246123 A1 * | 12/2019 | ............. | A01N 59/00 |

OTHER PUBLICATIONS

Yong et al., Langmuir 2019, 35, 1927-1934.*

(Continued)

*Primary Examiner* — Vu A Nguyen

(74) *Attorney, Agent, or Firm* — Brown Rudnick LLP; Craig S. Kenesky

(57) ABSTRACT

Microorganisms can contaminate a number of surfaces, such as those of consumer products. The present disclosure describes compositions and methods of manufacturing and using the same for providing biocidal activity on such surfaces. The compounds of the present invention can comprise a sample of a polymer. The polymer can comprise a repeating unit having a side chain that comprises a nitrogen-containing heterocycle. The nitrogen-containing heterocycle can form an N-halamine and exhibit the biocidal activity.

17 Claims, 4 Drawing Sheets

(56) References Cited

U.S. PATENT DOCUMENTS

| | | | |
|---|---|---|---|
| 10,178,866 | B2 | 1/2019 | Worley et al. |
| 2007/0062884 | A1 | 3/2007 | Sun et al. |
| 2009/0121251 | A1 | 5/2009 | Kniajanski et al. |
| 2012/0183494 | A1 | 7/2012 | Worley et al. |
| 2015/0166796 | A1 | 6/2015 | Sun et al. |

OTHER PUBLICATIONS

Cerkez, I. et al., "Rechargeable antimicrobial coatings for poly(lactic acid) nonwoven fabrics," Polymer, 2013, vol. 54, No. 2, pp. 536-541.

International Preliminary Report on Patentability issued in PCT/US2021/032226, dated Nov. 15, 2022.

International Search Report and Written Opinion issued in PCT/US2021/032226, mailed Sep. 21, 2021.

Ma, Y. et al., "Rechargeable Antibacterial N-Halamine Films with Antifouling Function for Food Packaging Applications," ACS Applied Materials & Interfaces, 2019, vol. 11, pp. 17814-17822.

Rai, R.K. et al., "Development of new hydantoin-based biocidal polymers with improved rechargeability and anti-microbial activity," New Journal of Chemistry, 2019, vol. 43, No. 9, pp. 3778-3787.

Xiu, K. et al., "Controlling the Structure and Antimicrobial Function of N-Halamine-Based Polyurethane Semi-interpenetrating Polymer Networks," Industrial & Engineering Chemistry Research, 2017, vol. 56, No. 42, pp. 12032-12037.

Yong, et al., Conformal Hydrogel Coatings on Catheters to Reduce Biofouling, Langmuir, 35(5):1927-1934, (2019).

* cited by examiner

COMPOSITIONS AND METHODS FOR ANTIMICROBIAL ARTICLES

CROSS-REFERENCE

This application is a continuation of International Application No. PCT/US2021/032226, filed on May 13, 2021, which claims the benefit of U.S. Provisional Application No. 63/025,028, filed on May 14, 2020, each of which is entirely incorporated herein by reference.

BACKGROUND

Microorganisms (e.g., fungi, bacteria, viruses, etc.) can grow on a number of surfaces, such as those of food packages or processing units, textiles, medical devices, and water treatment systems. For example, bacteria (e.g., *Pseudomonas, Listeria monocytogenes, Salmonella*, etc.) can adhere to and colonize solid surfaces of food processing units, resulting in harmful contamination and cross-contamination of food products. Without timely treatment, bacteria can form biofilms that are resistant to various common cleaning and disinfection agents, such as chlorine bleach, quaternary ammonium salts, hydrogen peroxides, etc.

INCORPORATION BY REFERENCE

Each patent, publication, and non-patent literature cited in the application is hereby incorporated by reference in its entirety as if each was incorporated by reference individually.

SUMMARY OF THE INVENTION

In some embodiments, the invention provides a sample of a polymer, wherein the polymer comprises a repeating unit having a side chain that comprises a nitrogen-containing heterocycle, wherein: (i) the nitrogen-containing heterocycle forms an N-halamine when exposed to an electrophilic halogen source, and (ii) a number average molar mass of the polymer in the sample is at least about 52 kilodaltons (kDa).

In some embodiments, the invention provides a sample of a polymer, wherein the polymer comprises a repeating unit having a side chain that comprises a nitrogen-containing heterocycle, wherein (i) the nitrogen-containing heterocycle forms an N-halamine when exposed to an electrophilic halogen source, (ii) a number average molar mass of the polymer in the sample is at least about 18 kilodaltons (kDa), and (iii) the polymer is substantially a homopolymer.

In some embodiments, the invention provides a sample of a copolymer, wherein the copolymer comprises a first repeating unit and a second repeating unit, wherein: (i) the first repeating unit comprises a nitrogen-containing heterocycle, wherein the nitrogen-containing heterocycle forms an N-halamine when exposed to an electrophilic halogen source, (ii) the second repeating unit comprises a non-fouling moiety, and (iii) a number average molar mass of the copolymer in the sample is at least about 21 kilodaltons (kDa).

In some embodiments, the invention provides a sample of a copolymer, wherein the copolymer comprises a first repeating unit and a second repeating unit, wherein: (i) the first repeating unit comprises a nitrogen-containing heterocycle, wherein the nitrogen-containing heterocycle forms an N-halamine when exposed to an electrophilic halogen source, (ii) the second repeating unit comprises a non-fouling moiety, and (iii) the copolymer does not comprise a repeating unit that comprises a catechol group.

In some embodiments, the invention provides a composition comprising: a first polymer comprising a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source; and a second polymer that does not comprise a side chain that comprises a hydantoin group, wherein a portion of the first polymer and a portion of the second polymer are substantially in a single phase.

In some embodiments, the invention provides an article of manufacture comprising: a first polymer comprising a repeating unit having a side chain, wherein the side chain comprises a nitrogen-containing heterocycle, wherein the nitrogen-containing heterocycle forms an N-halamine when exposed to an electrophilic halogen source; and a second polymer that does not comprise a side chain comprising a hydantoin group, wherein a portion of the first polymer and a portion of the second polymer are substantially in a single phase.

In some embodiments, the invention provides a method of manufacturing a polymeric composition, comprising: (a) contacting a first polymer and a second polymer, wherein: (i) the first polymer comprises a repeating unit, wherein the repeating unit comprises a nitrogen-containing heterocycle, wherein the nitrogen-containing heterocycle forms an N-halamine when exposed to an electrophilic halogen source, and (ii) the second polymer does not comprise a side chain that comprises a hydantoin group; and (b) softening a portion of the first polymer and a portion of the second polymer by application of a stress source, to blend the portion of the first polymer and the portion of the second polymer.

In some embodiments, the invention provides a method comprising: contacting a surface of an item with a medium that comprises an electrophilic halogen source, wherein the item is molded at least partially from a polymer, wherein the polymer comprises a repeating unit, wherein the repeating unit comprises a nitrogen-containing heterocycle, wherein the nitrogen-containing heterocycle forms an N-halamine upon exposure to the electrophilic halogen source.

In some embodiments, the invention provides a sample of a polymer prepared by a process, wherein the process comprises: subjecting a plurality of polymerizable monomers to polymerization to generate the sample of the polymer, wherein a monomer of the plurality of polymerizable monomers comprises a side chain, wherein the side chain comprises a nitrogen-containing heterocycle, wherein: (i) the nitrogen-containing heterocycle forms an N-halamine when exposed to an electrophilic halogen source, (ii) the plurality of polymerizable monomers are subjected to the polymerization in a solvent, wherein the solvent comprises methanol (MeOH) and water ($H_2O$) in a volume-to-volume ratio (MeOH:$H_2O$) of about 15:1 to about 1:1; and (iii) the polymerization occurs at a temperature of at least about 50° C.

In some embodiments, the invention provides an article of manufacture prepared by a process, wherein the process comprises: (a) contacting a first polymer and a second polymer, wherein: (i) the first polymer comprises a repeating unit, wherein the repeating unit comprises a nitrogen-containing heterocycle, wherein the nitrogen-containing heterocycle forms an N-halamine when exposed to an electrophilic halogen source; and (ii) the second polymer does not comprise a side chain that comprises a hydantoin group; and (b)

softening a portion of the first polymer and a portion of the second polymer by application of a stress source, to generate the article of manufacture comprising the portion of the first polymer and the portion of the second polymer.

In some embodiments, the invention provides a composition comprising: a first polymer comprising a plurality of active regions, wherein each active region of the plurality of active regions exhibits antimicrobial activity; and a second polymer that does not comprise the plurality of active regions, wherein in a study of discharging and recharging active regions of a test composition, wherein the test composition comprises a first portion that is the first polymer and a second portion that is the second polymer, wherein the study comprises a number of iterations of a two-phase experiment, wherein phase one of the two-phase experiment is discharging of the test composition by immersion of the test composition in a 0.6 N sodium hypochlorite solution for at least about 1 hour, wherein phase two of the two-phase experiment is discharging the test composition by an iodometric titration using 60 mM potassium iodide, 15% acetic acid, and 0.001 N sodium thiosulfate solution, and the number of iterations is at least three, then the test composition exhibits at least about 10% recharging of the active regions of the test composition as determined by the iodometric titration.

In some embodiments, the invention provides an article of manufacture prepared by a process, wherein the process comprises mixing a first polymer and a second polymer, wherein: (i) the first polymer comprises a plurality of active regions, wherein each active region of the plurality of active regions exhibits antimicrobial activity; (ii) the second polymer does not comprise the plurality of active regions; and (iii) in a study of discharging and recharging active regions of a test article of manufacture, wherein the test article of manufacture comprises a first portion that is the first polymer and a second portion that is the second polymer, wherein the study comprises a number of iterations of a two-phase experiment, wherein phase one of the two-phase experiment is discharging of the test article of manufacture by immersion of the test article of manufacture in a 0.6 N sodium hypochlorite solution for at least about 1 hour, wherein phase two of the two-phase experiment is discharging the test article of manufacture by an iodometric titration using 60 mM potassium iodide, 15% acetic acid, and 0.001 N sodium thiosulfate solution, and the number of iterations is at least three, then the test article of manufacture exhibits at least about 10% recharging of the active regions of the test article of manufacture as determined by the iodometric titration.

In some embodiments, the invention provides a composition comprising: a polymer comprising a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source, wherein the N-halamine exhibits antiviral activity, wherein, in a study of antiviral activity of a test composition, wherein the test composition comprises the polymer, wherein the study comprises contacting a surface of the test composition with a viral inoculum for a period of time, wherein the antiviral activity is measured subsequent to the period of time via a fifty-percent-tissue-culture-infective-dose ($TCID_{50}$) assay, and wherein the period of time is at least about 1 hour, then the surface of the test composition exhibits a reduction of the viral inoculum of at least about 0.1 log relative to a surface of a control composition as determined by the $TCID_{50}$ assay, wherein the control composition does not comprise the first polymer.

In some embodiments, the invention provides an article of manufacture prepared by a process, wherein the process comprises shaping a polymer resin into the article of manufacture, wherein the polymer resin comprises a polymer, wherein the polymer comprises a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source, wherein the N-halamine exhibits antiviral activity, and wherein, in a study of antiviral activity of a test article of manufacture, wherein the test article of manufacture comprises the polymer, wherein the study comprises contacting a surface of the test article of manufacture with a viral inoculum for a period of time, wherein the antiviral activity is measured subsequent to the period of time via a fifty-percent-tissue-culture-infective-dose ($TCID_{50}$) assay, and wherein the period of time is at least about 1 hour, then the surface of the test article of manufacture exhibits a reduction of the viral inoculum of at least about 0.1 log relative to a surface of a control article of manufacture as determined by the $TCID_{50}$ assay, wherein the control article of manufacture does not comprise the first polymer.

DETAILED DESCRIPTION

Figure 1:
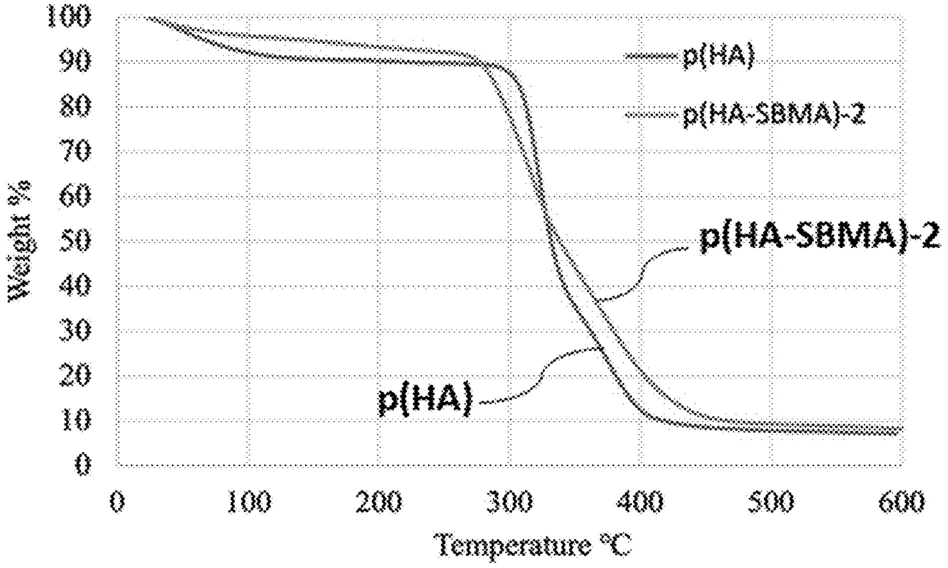
FIG. 1 shows thermal gravimetric analysis (TGA) of p(HA) and p(HA-co-SBMA)-2 N-halamine precursor polymer additives.
Figure 2:
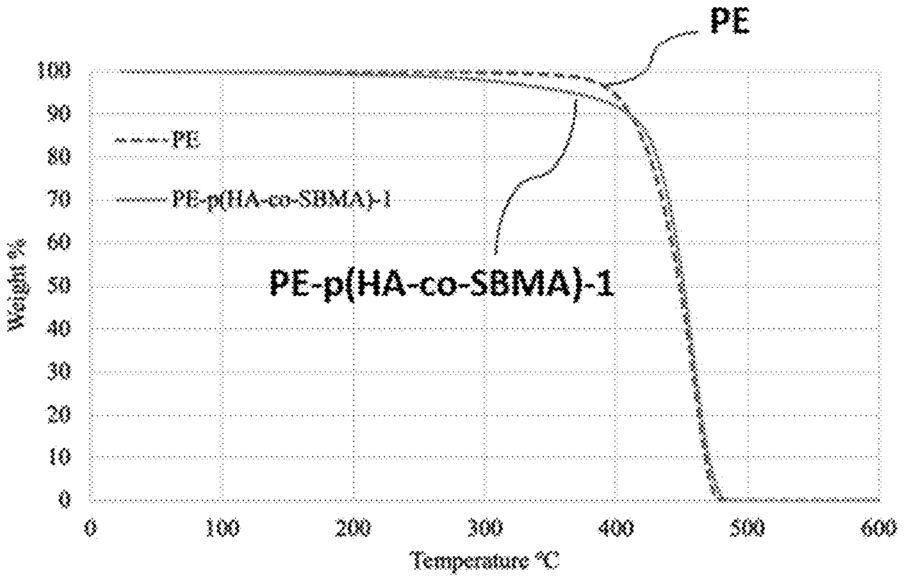
FIG. 2 shows TGA of PE resin and p(HA-co-SBMA)-1 compounded PE resin (PE-p(HA-co-SBMA)-1).
Figure 3:
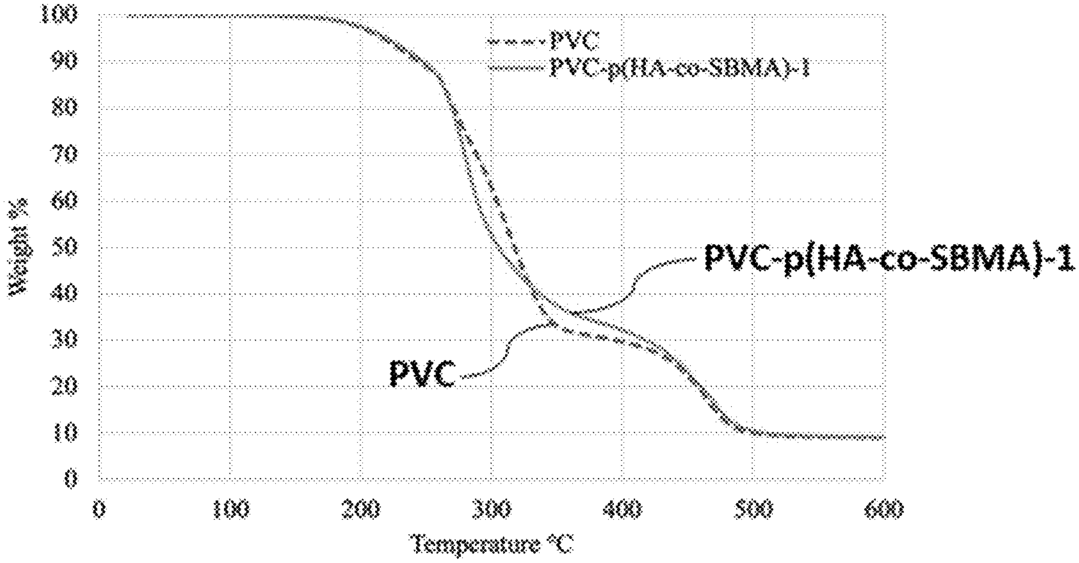
FIG. 3 shows TGA of PVC resin and p(HA-co-SBMA)-1 compounded PVC resin (PVC-p(HA-co-SBMA)-1).
Figure 4:
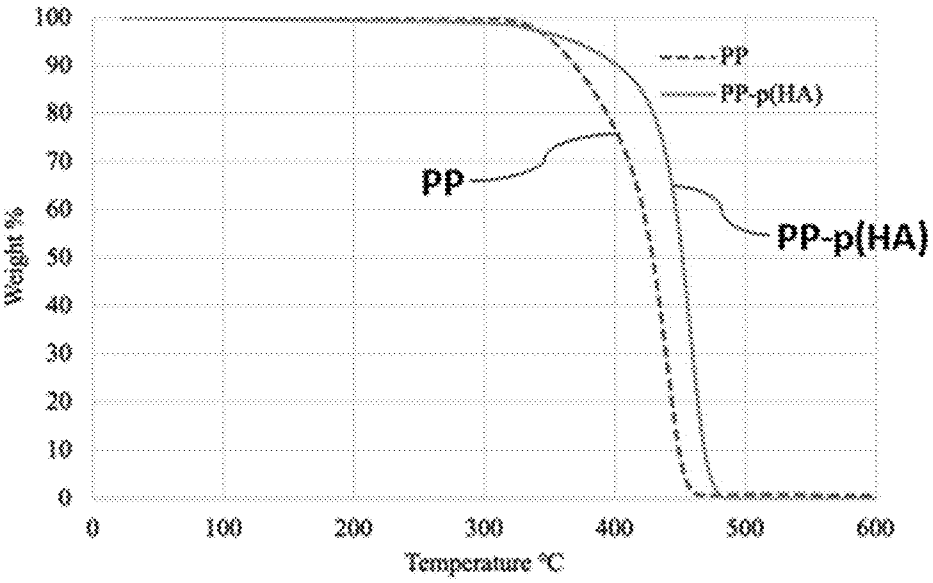
FIG. 4 shows TGA of PP resin and p(HA) compounded PP resin (PP-p(HA)).

The present invention provides compositions and methods of manufacturing and using the same for providing biocidal activity (e.g., antimicrobial and/or anti-fouling activity). The compositions of the present invention can be integrated into articles (e.g., polymeric products) to induce biocidal activity against microorganisms.

Polymers (e.g., homopolymers, copolymers, etc.) are used in products for a number of applications, such as in-home uses, agriculture, medicine, military, and space. Polymeric products (e.g., plastics) can be produced in various forms (e.g., films, fibers, foams, molded articles, etc.) depending on their applications. During storage, transportation, or use, surfaces of the polymeric products can be contaminated by microorganisms (e.g., fungi, bacteria, viruses, etc.). Without early intervention, such microorganisms can form biofilms, rendering the polymeric products unusable, difficult to sanitize, and/or harmful to users.

There has been tremendous interest in the hygiene industry to make substrate surface with continuing antimicrobial function. Traditional methods include compounding metal ions (e.g. silver, copper, zinc), small organic molecules (e.g. triclosan), polymer compounds (e.g. quaternary ammonium polymer), etc. However, all these approaches have a common problem: the efficacy is not potent enough within the range of safety regulation or economically viable. For example, EPA-approved antimicrobial additives based on silver ions (e.g. Bactekiller BM-103NA, EPA Reg. No. 82415-10) or silane quaternary ammonium salts (e.g. HM4100 Antimicrobial, EPA Reg. No. 83019-1) based cannot be added for more than 1-2% to the substrate. At this level, the surface won't be able to achieve sufficient antimicrobial potency to fulfill the efficacy requirement to be residual antimicrobial surface (>3 log reduction in <=2 hours with the presence of soils). For example, silver or quaternary ammonium polymer compounded plastics can give >3 log reduction in 24 hour of contact time, however they showed minimal reduction (<1 log reduction) in the time frame of 2 h or less. Three log reduction in 1-2 hour or less is the threshold that would allow an antimicrobial surface to make public health claim for the pathogens related to human health (e.g. *Listeria, Salmonella*, SARS-CoV-2, *Candida auris*, etc.). So almost all existing antimicrobial plastics can only make non-public health claims under EPA Treated Article Exemption like order control or mold prevention.

There is strong need from both professional and consumer segments to make plastic material having residual antimicrobial efficacy of >3 log reduction in less than 2 hours. Here we demonstrated an approach to achieve that through N-halamine technology, which will make the surface hold enough chlorine to achieve target efficacy and the process can be renewed to maintain high-level efficacy after repeated cleaning and use of the treated subjects.

In some cases, plastic surfaces can be uneven and/or damaged (e.g., scratched), thus exposing interior parts that can serve as "hot spots" for pathogenic microorganisms to hide and cross-contaminate to end-users (e.g., humans or animals) or other products. For example, certain viruses (e.g., coronaviruses) adhered to solid surfaces can survive in various conditions (e.g., dry and cold environments) for several days.

Polymeric products can be combined with antimicrobial compounds (e.g., via compounding, wetting, surface coating) to reduce or prevent microorganism contaminations. Examples of the antimicrobial compounds can include small molecules, such as metal ions (e.g., silver, copper), metal nanoparticles, and organic molecules (e.g. antibiotics, peptides). However, use of small molecule antimicrobial compounds is not without drawbacks, such as (1) increased cost of a final product due to a large amount of the antimicrobial compounds required to induce biocidal activity, (2) gradual or rapid leaching of small antimicrobial compounds from the final product after washing or sanitizing a surface of the final product, (3) undesired transfer of the antimicrobial compounds from the final product to subjects (e.g., end users, food, beverage, medications) in contact, (4) release of the antimicrobial compounds into the environment, which can induce antimicrobial resistance in subjects (e.g., radical-mediated mutagenesis due to metal oxides), (5) reduced or loss of biocidal activity when covered by debris (e.g., dirt, food), and/or (6) loss of the biocidal activity upon release of the coating of the antimicrobial compounds. Several antimicrobial compounds can be pathogen specific, thus unable to reduce or prevent contamination of a broad spectrum of pathogens.

Compositions of the Invention.

The compositions of the present invention can comprise polymers that can form any number of N-halamines upon exposure to an electrophilic halogen source. The polymers can comprise any number of N-halamine precursors that can form the N-halamines. The N-halamines can exhibit antimicrobial and/or anti-fouling activity against microorganisms. Upon transfer (i.e., discharge) of any number of oxidative halogen atoms from the N-halamines to microorganisms (e.g., bacteria), the compositions of the present invention can be re-exposed to the same or a different electrophilic halogen source to regenerate (i.e., recharge) the N-halamines.

The polymers of the present invention comprising any number of N-halamines can withstand at least or up to 1 discharge-recharge cycle, at least or up to 2 discharge-recharge cycles, at least or up to 3 discharge-recharge cycles, at least or up to 4 discharge-recharge cycles, at least or up to 5 discharge-recharge cycles, at least or up to about 10 discharge-recharge cycles, at least or up to about 15 discharge-recharge cycles, at least or up to 20 discharge-recharge cycles, at least or up to about 30 discharge-recharge cycles, at least or up to about 40 discharge-recharge cycles, at least or up to about 50 discharge-recharge cycles, at least or up to about 60 discharge-recharge cycles, at least or up to about 70 discharge-recharge cycles, at least or up to about 80 discharge-recharge cycles, at least or up to about 90 discharge-recharge cycles, at least or up to about 100 discharge-recharge cycles, at least or up to about 200 discharge-recharge cycles, at least or up to about 300 discharge-recharge cycles, at least or up to about 400 discharge-recharge cycles, at least or up to about 500 discharge-recharge cycles, or at least or up to about 1,000 discharge-recharge cycles.

The polymers of the present invention can comprise a repeating unit that can form an N-halamine when exposed to an electrophilic halogen source. The repeating unit can comprise any number of N-halamine precursors that can from an N-halamine. An N-halamine precursor can be a part of the backbone of the repeating unit and/or a part of a side chain of the repeating unit. The N-halamine precursor can comprise a nitrogen atom bound to a hydrogen atom. The N-halamine precursor can be a part of, for example, primary or secondary amines, amides, imides, cyclic amines (e.g., hydantoins, piperazines, etc.), cyclic amides, or cyclic imides. The N-halamine precursor can be a part of a non-heterocyclic compound. Alternatively, the N-halamine precursor can be a part of a heterocyclic compound. A heterocycle can be aromatic (heteroaryl) or non-aromatic. Non-limiting examples of heterocycles include pyrrole, pyrrolidine, pyridine, piperidine, succinimide, maleimide, morpholine, and imidazole. Non-limiting examples of heterocycles include heterocyclic units having a single ring containing one or more heteroatoms, non-limiting examples of which include, imidazolidinyl, oxazolidinyl, oxazolidinonyl, hydantoinyl, and piperazinyl.

Upon exposure to an electrophilic halogen source, the N-halamine precursor can form a nitrogen-halogen covalent bond, for example, a nitrogen-fluorine bond, a nitrogen-chlorine bond, a nitrogen-bromine bond, a nitrogen-iodine bond, or a combination thereof. The N-halamine precursor can form any number of nitrogen-halogen covalent bonds, for example, at least or up to 1 nitrogen-halogen covalent bond, at least or up to 2 nitrogen-halogen covalent bonds, at least or up to 3 nitrogen-halogen covalent bonds, at least or up to 4 nitrogen-halogen covalent bonds, at least or up to 5 nitrogen-halogen covalent bonds, at least or up to 6 nitrogen-halogen covalent bonds, at least or up to 7 nitrogen-halogen covalent bonds, at least or up to 8 nitrogen-halogen covalent bonds, at least or up to 9 nitrogen-halogen covalent bonds, at least or up to 10 nitrogen-halogen covalent bonds, at least or up to about 15 nitrogen-halogen covalent bonds, or at least or up to about 20 nitrogen-halogen covalent bonds.

The polymers of the present invention can form a single type of N-halamine. Alternatively, the polymers can form a plurality of different types of N-halamines, for example, two or more different types of N-halamines. The different types of -N-halamines can have different structures and/or different numbers of nitrogen-halogen covalent bonds.

An N-halamine precursor (or the N-halamine derivative thereof) can be a part of a side chain of a repeating unit of the polymer. The side chain can comprise any type of linker moiety between the N-halamine precursor and the backbone of the polymer. The linker moiety can be hydrophobic or hydrophilic. Non-limiting examples of the linker moiety include an ester, ether, thioether, ethyleneglycol, alkylene, alkenylene, alkynylene, heteroalkylene, cycloalkylene, heterocyclylene, arylene, heteroarylene, and heterocycloalkylene group, any of which can be substituted or unsubstituted. In some embodiments, a linker is not present.

In some embodiments, the N-halamine precursor comprises a nitrogen-containing heterocycle. A nitrogen-containing heterocycle can form at least or up to about 1 nitrogen-halogen covalent bond. A nitrogen-containing heterocycle can form at least or up to about 2 nitrogen-halogen covalent bonds. The N-halamine precursor can comprise at least or up to 1 nitrogen-containing heterocycle, at least or up to 2 nitrogen-containing heterocycles, at least or up to 3 nitrogen-containing heterocycles, at least or up to 4 nitrogen-containing heterocycles, at least or up to 5 nitrogen-containing heterocycles, at least or up to 6 nitrogen-containing heterocycles, at least or up to 7 nitrogen-containing heterocycles, at least or up to 8 nitrogen-containing heterocycles, at least or up to 9 nitrogen-containing heterocycles, or at least or up to 10 nitrogen-containing heterocycles.

The nitrogen-containing heterocycle can comprise a hydantoin group. The hydantoin group can have the structure:

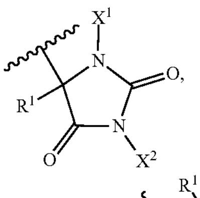

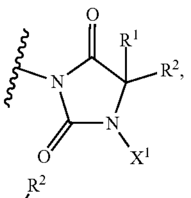

or

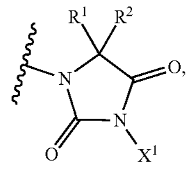

wherein: $X^1$ is H or halogen; $X^2$ is H or halogen; $R^1$ is H or $C_1$-$C_4$ alkyl; and $R^2$ is H or $C_1$-$C_4$ alkyl.

In some embodiments, the hydantoin group has the structure:

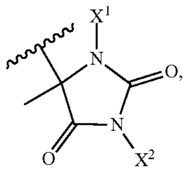

wherein: $X^1$ is H or halogen; and $X^2$ is H or halogen. In some embodiments, $X^1$ is H and $X^2$ is H. In some embodiments, $X^1$ is Cl and $X^2$ is Cl. In some embodiments, one of $X^1$ and $X^2$ is Cl and one of $X^1$ and $X^2$ is H.

In some embodiments, the nitrogen-containing heterocycle can be a six-membered ring with at least one heteroatom. In some embodiments, the nitrogen-containing heterocycle is an unsubstituted or substituted piperidinyl ring. In some embodiments, the nitrogen-containing heterocycle is 2,2,6,6-tetramethyl-4-piperidinyl methacrylate. In some embodiments, the nitrogen-containing heterocycle can have the structure:

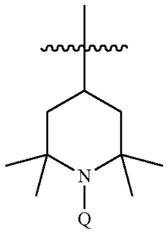

or

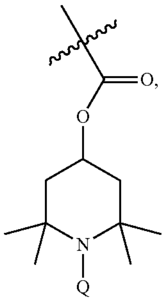

wherein Q is independently H, Cl, Br, or I. In some embodiments, the nitrogen-containing heterocycle can have the structure:

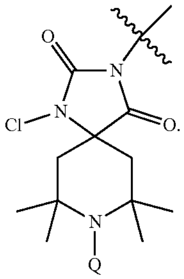

The polymers of the present invention can comprise at least one species of repeating unit. The polymers can comprise at least or up to 1 species of repeating unit, at least or up to 2 different species of repeating unit, at least or up to 3 different species of repeating unit, at least or up to 4 different species of repeating unit, at least or up to 5 different species of repeating unit, at least or up to 6 different species of repeating unit, at least or up to 7 different species of repeating unit, at least or up to 8 different species of repeating unit, at least or up to 9 different species of repeating unit, at least or up to 10 different species of repeating unit.

An average degree of polymerization of a species of repeating unit in a sample of a polymer can be at least or up to about 4, at least or up to about 5, at least or up to about 6, at least or up to about 7, at least or up to about 8, at least or up to about 9, at least or up to about 10, at least or up to about 11, at least or up to about 12, at least or up to about 13, at least or up to about 14, at least or up to about 15, at least or up to about 16, at least or up to about 17, at least or up to about 18, at least or up to about 19, at least or up to about 20, at least or up to about 25, at least or up to about 30, at least or up to about 35, at least or up to about 40, at least or up to about 45, at least or up to about 50, at least or up to about 60, at least or up to about 70, at least or up to about 80, at least or up to about 90, at least or up to about 100, at least or up to about 200, at least or up to about 300, at least or up to about 400, at least or up to about 500, at least or up to about 600, at least or up to about 700, at least or up to about 800, at least or up to about 900, at least or up to about 1,000, at least or up to about 2,000, at least or up to about 3,000, at least or up to about 4,000, at least or up to about 5,000, at least or up to about 6,000, at least or up to about 7,000, at least or up to about 8,000, at least or up to about 9,000, at least or up to about 10,000, at least or up to about 15,000, at least or up to about 20,000, at least or up to about 25,000, at least or up to about 30,000, at least or up to about 35,000, at least or up to about 40,000, at least or up to about 45,000, at least or up to about 50,000, or at least or up to about 100,000.

The polymers of the present invention can comprise homopolymers. The homopolymers can comprise a single species of repeating unit. In some embodiments, the single species of repeating unit forms any number of N-halamines as provided herein. For example, the single species of repeating unit comprises an N-halamine precursor (or the N-halamine derivative thereof). In another example, the single species of repeating unit comprises (i) an N-halamine precursor (or the N-halamine derivative thereof) and (ii) a non-fouling moiety, as disclosed herein. In some embodiments, the single species of repeating unit in the homopolymers does not comprise an N-halamine precursor (or the N-halamine derivative thereof).

The polymers of the present invention can comprise copolymers, for example, bipolymers, terpolymers, and quaterpolymers. The copolymers can comprise alternating copolymers, random copolymers, statistical copolymers, segmented polymers, block copolymers, multiblock copolymers, gradient copolymers, graft copolymers, star copolymers, branched copolymers, hyperbranched copolymers, and combinations thereof. The copolymers can comprise two or more species of repeating unit that are different from one another. The copolymers can comprise at least or up to 2 different species of repeating unit, at least or up to 3 different species of repeating unit, at least or up to 4 different species of repeating unit, at least or up to 5 different species of repeating unit, at least or up to 6 different species of repeating unit, at least or up to 7 different species of repeating unit, at least or up to 8 different species of repeating unit, at least or up to 9 different species of repeating unit, or at least or up to 10 different species of repeating unit.

A copolymer of the present invention can comprise a plurality (e.g., two or more) different species of repeating unit, wherein each species of the plurality of different species of repeating unit can form any number of N-halamines. In some embodiments, two different species of repeating unit can comprise different structures of N-halamine precursors (or the N-halamine derivative thereof). In some embodiments, two different species of repeating unit can comprise (i) the same structure of N-halamine precursor (or the N-halamine derivative thereof), but (ii) different monomeric derivatives and/or different linker moieties between the respective N-halamine precursor and the copolymer backbone.

A copolymer of the present invention can comprise (i) a first species of repeating unit that can form any number of N-halamines as provided herein and (ii) a second species of repeating unit that does not form an N-halamine. In some embodiments, the second species of repeating unit lacks a side chain and is present to control a density of the N-halamine precursor (or the N-halamine derivative thereof) from the first species of repeating unit in a final copolymer molecule. In some embodiments, the second species of repeating unit comprises at least one functional moiety to endow at least one additional function (e.g., antimicrobial and/or anti-fouling activity) to the final copolymer. The functional moiety can be a part of the backbone of the second species of repeating unit. Alternatively or additionally, the functional moiety can be a part of a side chain of the second species of repeating unit.

A copolymer of the present invention can comprise at least (i) a first species of repeating unit (RU1) and (ii) a second species of repeating unit (RU2), and RU1 and RU2 can be present in the copolymer in a molar ratio of about 10:1 to about 1:10 (RU1:RU2). The molar ratio of RU1:RU2 can be at least or up to about 100:1, at least or up to about 90:1, at least or up to about 80:1, at least or up to about 70:1, at least or up to about 60:1, at least or up to about 50:1, at least or up to about 40:1, at least or up to about 30:1, at least or up to about 20:1, at least or up to about 15:1, at least or up to about 10:1, at least or up to about 9:1, at least or up to about 8:1, at least or up to about 7:1, at least or up to about 6:1, at least or up to about 5:1, at least or up to about 4:1, at least or up to about 3:1, at least or up to about 2:1, at least or up to about 1:1, at least or up to about 1:2, at least or up to about 1:3, at least or up to about 1:4, at least or up to about 1:5, at least or up to about 1:6, at least or up to about 1:7, at least or up to about 1:8, at least or up to about 1:9, at least or up to about 1:10, at least or up to about 1:15, at least or up to about 1:20, at least or up to about 1:30, at least or up to about 1:40, at least or up to about 1:50, at least or up to about 1:60, at least or up to about 1:70, at least or up to about 1:80, at least or up to about 1:90, or at least or up to about 1:100.

In some embodiments, RU1 comprises an N-halamine precursor (or the N-halamine derivative thereof) and RU2 comprises at least one functional moiety (e.g., a non-fouling moiety, as disclosed herein), and a molar ratio of RU1:RU2 is at least or up to about 5:1, at least or up to about 4:1, at least or up to about 3:1, at least or up to about 2:1, at least or up to about 1:1, at least or up to about 1:2, at least or up to about 1:3, at least or up to about 1:4, or at least or up to about 1:5.

In some embodiments, the at least one functional moiety can comprise a non-fouling moiety. A non-fouling moiety can be a chemical compound capable of preventing or at least reducing adhesion, growth, and/or colonization of microorganism on a surface, e.g., an exposed surface of a material. In some cases, the non-fouling moiety can slow down or prevent the formation of biofilms on such surface. Non-limiting examples of the non-fouling moiety include poly(vinyl pyrrolidone), poly(2-hydroxyethylmethacrylate), poly(2-hydroxypropyl methacrylamide), poly(styrene sulfonate), alkylene glycol, polyether, zwitterion, and a carbohydrate moiety (e.g., hyaluronic acid).

The non-fouling moiety can comprise a cation, an anion, or a zwitterion. In some embodiments, the non-fouling moiety can comprise a zwitterion. The zwitterion can be a chemical compound carrying at least one positive charge and at least one negative charge simultaneously. The number of the at least one positive charge and the number of the at least one negative charge can be the same, such that the total net charge of a zwitterion is zero (i.e., electrically neutral). A zwitterion can comprise at least or up to 1 positive charge, at least or up to 2 positive charges, at least or up to 3 positive charges, at least or up to 4 positive charges, or at least or up to 5 positive charges. A zwitterion can comprise at least or up to 1 negative charge, at least or up to 2 negative charges, at least or up to 3 negative charges, at least or up to 4 negative charges, or at least or up to 5 negative charges.

The zwitterion can comprise: (i) at least one cationic unit comprising: ammonium, phosphonium, and/or sulfonium and (ii) at least one anionic unit comprising: carboxy, sulfonate, sulfate, phosphate, or phosphonate. Non-limiting examples of a zwitterion include phosphorylcholine, carboxylbetaine, sulfobetaine, imidazolium, phosphonium/amino acid, derivatives thereof, and combinations thereof.

In some embodiments, adding a zwitterion into an N-halamine chain can increase chlorine levels of the polymer chain by about 2-fold, about 5-fold, about 10-fold, about 20-fold, about 30-fold, about 40-fold, about 50-fold, about 60-fold, about 70-fold, about 80-fold, about 90-fold, about 100-fold, about 110-fold, about 120-fold, about 130-fold, about 140-fold, about 150-fold, about 160-fold, about 170-fold, about 180-fold, about 190-fold, or about 200-fold. In some embodiments, adding a zwitterion into an N-halamine chain can increase chlorine levels of the polymer chain by about 20-fold. In some embodiments, adding a zwitterion into an N-halamine chain can increase chlorine levels of the polymer chain by about 50-fold. In some embodiments, adding a zwitterion into an N-halamine chain can increase chlorine levels of the polymer chain by about 100-fold.

In some embodiments, the non-fouling group comprises a phosphorylcholine group. In some embodiments, the non-fouling group comprises a carboxylbetaine group. In some embodiments, the non-fouling group comprises a sulfobetaine group.

In some embodiments, the non-fouling group comprises a zwitterion having the structure:

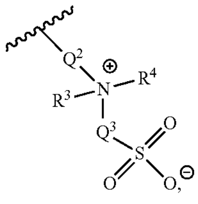

wherein: $Q^2$ is alkylene or absent; $Q^3$ is alkylene; $R^3$ is $C_1$-$C_4$ alkyl; and $R^4$ is $C_1$-$C_4$ alkyl. In some embodiments, $Q^2$ is absent. In some embodiments, $Q^2$ is methylene, ethylene, propylene, or butylene. In some embodiments, $Q^2$ is methylene. In some embodiments, $Q^2$ is ethylene. In some embodiments, $Q^2$ is propylene. In some embodiments, $Q^2$ is butylene. In some embodiments, $Q^3$ is methylene, ethylene, propylene, or butylene. In some embodiments, $Q^3$ is methylene. In some embodiments, $Q^3$ is ethylene. In some embodiments, $Q^3$ is propylene. In some embodiments, $Q^3$ is butylene.

In some embodiments, the non-fouling group comprises a zwitterion having the structure:

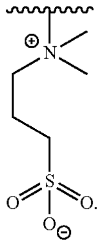 [SMILES: *[N+](C)(C)CCCS(=O)(=O)[O-]]

The non-fouling moiety can comprise alkylene glycol, such as ethylene glycol, propylene glycol, tetramethylene glycol, pentamethylene glycol, hexamethylene glycol, heptamethylene glycol, octamethylene glycol, nonamethylene glycol, and decamethylene glycol. Any alkylene glycol can be substituted or unsubstituted.

The non-fouling moiety can comprise polyether. The polyether can comprise unsubstituted poly(alkylene glycol) having alkylene chains of 1 to 3 carbon atoms, substituted or unsubstituted poly(alkylene glycol) having alkylene chains of at least 4 carbon atoms (e.g., less than about 10 carbon atoms). Non-limiting examples of a poly(alkylene glycol) moiety include poly(ethylene glycol), poly(trimethylene glycol), poly(tetramethylene glycol), poly(pentamethylene glycol), poly(hexamethylene glycol), poly(heptamethylene glycol), and poly(octamethylene glycol). Any poly(alkylene glycol) moiety can be substituted or unsubstituted. Non-limiting examples of an end group of a poly(alkylene glycol) moiety include hydroxyl, epoxy, and methyl.

An average number of repeated alkylene oxides in a poly(alkylene glycol) moiety can be at least or up to 2, at least or up to 3, at least or up to 4, at least or up to 5, at least or up to 6, at least or up to 7, at least or up to 8, at least or up to 9, at least or up to 10, at least or up to 20, at least or up to 30, at least or up to 40, at least or up to 50, at least or up to 60, at least or up to 70, at least or up to 80, at least or up to 90, at least or up to 100, at least or up to 150, at least or up to 200, at least or up to 250, at least or up to 300, at least or up to 350, at least or up to 400, at least or up to 450, at least or up to 500, at least or up to 550, at least or up to 600, at least or up to 650, at least or up to 700, at least or up to 750, at least or up to 800, at least or up to 850, at least or up to 900, or at least or up to 1,000.

In some embodiments, an average number of repeated alkylene oxides (e.g., ethylene oxides) in a poly(alkylene glycol) moiety (e.g., a poly(ethylene glycol) moiety) can be about 2 to about 500. An average number of repeated alkylene oxides in poly(alkylene glycol) chain can be about 2 to about 5, about 2 to about 10, about 2 to about 15, about 2 to about 30, about 2 to about 60, about 2 to about 100, about 2 to about 150, about 2 to about 200, about 2 to about 300, about 2 to about 400, about 2 to about 500, about 5 to about 10, about 5 to about 15, about 5 to about 30, about 5 to about 60, about 5 to about 100, about 5 to about 150, about 5 to about 200, about 5 to about 300, about 5 to about 400, about 5 to about 500, about 10 to about 15, about 10 to about 30, about 10 to about 60, about 10 to about 100, about 10 to about 150, about 10 to about 200, about 10 to about 300, about 10 to about 400, about 10 to about 500, about 15 to about 30, about 15 to about 60, about 15 to about 100, about 15 to about 150, about 15 to about 200, about 15 to about 300, about 15 to about 400, about 15 to about 500, about 30 to about 60, about 30 to about 100, about 30 to about 150, about 30 to about 200, about 30 to about 300, about 30 to about 400, about 30 to about 500, about 60 to about 100, about 60 to about 150, about 60 to about 200, about 60 to about 300, about 60 to about 400, about 60 to about 500, about 100 to about 150, about 100 to about 200, about 100 to about 300, about 100 to about 400, about 100 to about 500, about 150 to about 200, about 150 to about 300, about 150 to about 400, about 150 to about 500, about 200 to about 300, about 200 to about 400, about 200 to about 500, about 300 to about 400, about 300 to about 500, or about 400 to about 500.

An average molar mass (e.g., a number average molar mass as determined by gel permeation chromatography (GPC)) of a poly(alkylene glycol) moiety (e.g., a poly (ethylene glycol) moiety) can be at least or up to about 100 kilodaltons (kDa), at least or up to about 150 kDa, at least or up to about 200 kDa, at least or up to about 300 kDa, at least or up to about 400 kDa, at least or up to about 500 kDa, at least or up to about 600 kDa, at least or up to about 700 kDa, at least or up to about 800 kDa, at least or up to about 900 kDa, at least or up to about 1,000 kDa, at least or up to about 2,000 kDa, at least or up to about 3,000 kDa, at least or up to about 4,000 kDa, at least or up to about 5,000 kDa, at least or up to about 6,000 kDa, at least or up to about 7,000 kDa, at least or up to about 8,000 kDa, at least or up to about 9,000 kDa, at least or up to about 10,000 kDa, at least or up to about 11,000 kDa, 15,000 kDa, at least or up to about 20,000 kDa, at least or up to about 25,000 kDa, at least or up to about 30,000 kDa, at least or up to about 35,000 kDa, at least or up to about 40,000 kDa, at least or up to about 45,000 kDa, or at least or up to about 50,000 kDa.

In some embodiments, the non-fouling group comprises a polyether group having the structure:

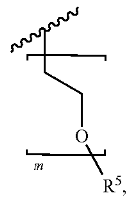

wherein: $R^5$ is hydrogen or alkyl; and m is 1 to 500. In some embodiments, $R^5$ is methyl, ethyl, propyl, or isopropyl. In some embodiments, $R^5$ is methyl. In some embodiments, $R^5$ is ethyl.

In some embodiments, the polymers of the present invention can have an average oxidative chlorine value (atoms/$cm^2$) of at least about 1E+14, at least about 1E+15, at least about 1E+16, at least about 1E+17, or at least about 1E+18. In some embodiments, the polymers of the present invention can have an average oxidative chlorine value of at least about 5E+14, at least about 5E+15, at least about 5E+16, at least about 5E+17, or at least about 5E+18. In some embodiments, the polymers of the present invention can have an average oxidative chlorine value of at least about 1E+16. In some embodiments, the polymers of the present invention can have an average oxidative chlorine value of at least about 5E+16. In some embodiments, the polymers of the present invention can have an average oxidative chlorine value of at least about 10E+16.

The polymers of the present invention (e.g., a sample of a polymer, which polymer comprises at least one N-halamine precursor) can be used alone, for example, to induce a biocidal activity against at least one microorganism. Alternatively, the polymers of the present invention can be used in combination with an additional material (e.g., metals, ceramics, polymers, etc.). In some embodiments, the additional material comprises additional polymers (e.g., homopolymers or copolymers) that do not comprise an N-halamine precursor. The additional polymers can be used in combination with the N-halamine forming polymers, as disclosed herein, as fillers and/or to endow at least one additional function (e.g., antimicrobial activity, anti-fouling activity, optical density, viscosity, stiffness, strength, etc.) to the final polymeric sample. In some embodiments, the additional polymers comprise a repeating unit, wherein the repeating unit comprises a non-fouling moiety, for example, a zwitterion, an alkylene glycol moiety, and derivatives thereof as disclosed herein.

In some embodiments, the additional polymers comprise fillers, for example, a thermoplastic, a thermoset, and an elastomer. In some examples, the fillers can be combined with the N-halamine forming polymers as disclosed herein, and a resulting composition can be processed (e.g., molded) into an article of use (e.g., food packages or processing units, textiles, medical devices, and water treatment system). The fillers can be natural polymers. Alternatively, the fillers can be synthetic polymers.

Non-limiting examples of the thermoplastic include polypropylene, polyethylene, polystyrene, polyurethane, polymethyl methacrylate, acrylonitrile butadiene styrene, polyamide, polylactic acid, polycarbonate, polyoxymethylene, polyester, polyketone, polyacrylate, polyether, polyvinyl ester, polyvinyl chloride, polyfluoroalkyl substance, variants thereof, and combinations thereof. In an example, the thermoplastic is semi-crystalline (e.g., polyethylene terephthalate). In another example the thermoplastic is amorphous (e.g., polystyrene, polycarbonate).

Non-limiting examples of the thermoset include epoxy, polyurethane, phenol-resorcinol polymer, urea-formaldehyde polymer, polyurea, phenol-formaldehyde polymer, melamine-formaldehyde polymer, soy-based polymer, polyester, polyimide, acrylic polymer, cyanoacrylate, polyanhydride, polydicyclopentadiene, polycarbonate, variants thereof, and combinations thereof.

Non-limiting examples of the elastomer include polyolefin, polysiloxane, polychloroprene, and polysulfides. Polyolefin elastomer can comprise polyisoprene (e.g., natural or synthetic rubber), polyisobutylene, polybutadiene, poly(cyclooctadiene), and/or poly(norbornene). Polysiloxane elastomer can comprise poly(dimethyl siloxane), poly(methyl siloxane), partially alkylated poly(methyl siloxane), poly(alkyl methyl siloxane), and/or poly(phenyl methyl siloxane). Polysulfide elastomer can comprise crosslinked poly[bis(ethylene oxy)-2-disulfide].

In some embodiments, the polymers of the present invention do not comprise a side-chain that comprises a catechol group. In some embodiments, a repeating unit of the polymers do not comprise a side-chain that comprises a catechol group. In some embodiments, a repeating unit of the polymers do not comprise a catechol group. In some embodiments, the polymers are substantially free of an immobilized catechol group. Non-limiting examples of the catechol group include dopa, dopamine, 2,3-dihydroxybenzoic acid (2,3-DHBA), 3,4-DHBA, norepinephrine, epinephrine, and 5,6-dihydroxyindole.

Non-limiting examples of optional substituents include hydroxyl groups, sulfhydryl groups, halogens, amino groups, nitro groups, nitroso groups, cyano groups, azido groups, sulfoxide groups, sulfone groups, sulfonamide groups, carboxyl groups, carboxaldehyde groups, imine groups, alkyl groups, alkenyl groups, halo-alkenyl groups, alkynyl groups, halo-alkynyl groups, alkoxy groups, aryl groups, aryloxy groups, aralkyl groups, arylalkoxy groups, heterocyclyl groups, acyl groups, acyloxy groups, carbamate groups, amide groups, ureido groups, epoxy groups, ester groups, charged groups, and zwitterionic groups.

Non-limiting examples of alkyl and alkylene groups include straight, branched, and cyclic alkyl and alkylene groups. An alkyl or alkylene group can be, for example, a C1, C2, C3, C4, C5, C6, C7, C8, C9, C10, C11, C12, C13, C14, C15, C16, C17, C18, C19, C20, C21, C22, C23, C24, C25, C26, C27, C28, C29, C30, C31, C32, C33, C34, C35, C36, C37, C38, C39, C40, C41, C42, C43, C44, C45, C46, C47, C48, C49, or C50 group that is substituted or unsubstituted.

Non-limiting examples of straight alkyl groups include methyl, ethyl, propyl, butyl, pentyl, hexyl, heptyl, octyl, nonyl, and decyl.

Branched alkyl groups include any straight alkyl group substituted with any number of alkyl groups. Non-limiting examples of branched alkyl groups include isopropyl, isobutyl, sec-butyl, and t-butyl.

Non-limiting examples of substituted alkyl groups includes hydroxymethyl, chloromethyl, trifluoromethyl, aminomethyl, 1-chloroethyl, 2-hydroxyethyl, 1,2-difluoroethyl, and 3-carboxypropyl.

Non-limiting examples of cyclic alkyl groups include cyclopropyl, cyclobutyl, cyclopentyl, cyclohexyl, cycloheptyl, and cyclooctyl groups. Cyclic alkyl groups also include fused-, bridged-, and spiro-bicycles and higher fused-, bridged-, and spiro-systems. A cyclic alkyl group can be substituted with any number of straight, branched, or cyclic alkyl groups. Non-limiting examples of cyclic alkyl groups include cyclopropyl, 2-methyl-cycloprop-1-yl, cycloprop-2-en-1-yl, cyclobutyl, 2,3-dihydroxycyclobut-1-yl, cyclobut-2-en-1-yl, cyclopentyl, cyclopent-2-en-1-yl, cyclopenta-2,4-dien-1-yl, cyclohexyl, cyclohex-2-en-1-yl, cycloheptyl, cyclooctanyl, 2,5-dimethylcyclopent-1-yl, 3,5-dichlorocyclohex-1-yl, 4-hydroxycyclohex-1-yl, 3,3,5-trimethylcyclohex-1-yl, octahydropentalenyl, octahydro-1H-indenyl, 3a,4,5,6,7,7a-hexahydro-3H-inden-4-yl, decahydroazulenyl, bicyclo-[2.1.1]hexanyl, bicyclo[2.2.1]heptanyl, bicyclo[3.1.1]heptanyl, 1,3-dimethyl[2.2.1]heptan-2-yl, bicyclo[2.2.2]octanyl, and bicyclo[3.3.3]undecanyl.

Non-limiting examples of alkenyl and alkenylene groups include straight, branched, and cyclic alkenyl groups. The olefin or olefins of an alkenyl group can be, for example, E, Z, cis, trans, terminal, or exo-methylene. An alkenyl or alkenylene group can be, for example, a C2, C3, C4, C5, C6, C7, C8, C9, C10, C11, C12, C13, C14, C15, C16, C17, C18, C19, C20, C21, C22, C23, C24, C25, C26, C27, C28, C29, C30, C31, C32, C33, C34, C35, C36, C37, C38, C39, C40, C41, C42, C43, C44, C45, C46, C47, C48, C49, or C50 group that is substituted or unsubstituted. Non-limiting examples of alkenyl and alkenylene groups include ethenyl, prop-1-en-1-yl, isopropenyl, but-1-en-4-yl; 2-chloroethenyl, 4-hydroxybuten-1-yl, 7-hydroxy-7-methyloct-4-en-2-yl, and 7-hydroxy-7-methyloct-3,5-dien-2-yl.

Non-limiting examples of alkynyl or alkynylene groups include straight, branched, and cyclic alkynyl groups. The triple bond of an alkylnyl or alkynylene group can be internal or terminal. An alkylnyl or alkynylene group can be, for example, a C2, C3, C4, C5, C6, C7, C8, C9, C10, C11, C12, C13, C14, C15, C16, C17, C18, C19, C20, C21, C22, C23, C24, C25, C26, C27, C28, C29, C30, C31, C32, C33, C34, C35, C36, C37, C38, C39, C40, C41, C42, C43, C44, C45, C46, C47, C48, C49, or C50 group that is substituted or unsubstituted. Non-limiting examples of alkynyl or alkynylene groups include ethynyl, prop-2-yn-1-yl, prop-1-yn-1-yl, and 2-methyl-hex-4-yn-1-yl; 5-hydroxy-5-methylhex-3-yn-1-yl, 6-hydroxy-6-methylhept-3-yn-2-yl, and 5-hydroxy-5-ethylhept-3-yn-1-yl.

An alkoxy group can be, for example, an oxygen atom substituted with any alkyl, alkenyl, or alkynyl group. An ether or an ether group comprises an alkoxy group. Non-limiting examples of alkoxy groups include methoxy, ethoxy, propoxy, isopropoxy, and isobutoxy.

An aryl group can be heterocyclic or non-heterocyclic. An aryl group can be monocyclic or polycyclic. An aryl group can be substituted with any number of substituents described herein, for example, hydrocarbyl groups, alkyl groups, alkoxy groups, and halogen atoms. Non-limiting examples of aryl groups include phenyl, toluyl, naphthyl, pyrrolyl, pyridyl, imidazolyl, thiophenyl, and furyl. Non-limiting examples of substituted aryl groups include 3,4-dimethylphenyl, 4-tert-butylphenyl, 4-cyclopropylphenyl, 4-diethylaminophenyl, 4-(trifluoromethyl)phenyl, 4-(difluoromethoxy)-phenyl, 4-(trifluoromethoxy)phenyl, 3-chlorophenyl, 4-chlorophenyl, 3,4-dichlorophenyl, 2-fluorophenyl, 2-chlorophenyl, 2-iodophenyl, 3-iodophenyl, 4-iodophenyl, 2-methylphenyl, 3-fluorophenyl, 3-methylphenyl, 3-methoxyphenyl, 4-fluorophenyl, 4-methylphenyl, 4-methoxyphenyl, 2,3-difluorophenyl, 3,4-difluorophenyl, 3,5-difluorophenyl, 2,3-dichlorophenyl, 3,4-dichlorophenyl, 3,5-dichlorophenyl, 2-hydroxyphenyl, 3-hydroxyphenyl, 4-hydroxyphenyl, 2-methoxyphenyl, 3-methoxyphenyl, 4-methoxyphenyl, 2,3-dimethoxyphenyl, 3,4-dimethoxyphenyl, 3,5-dimethoxyphenyl, 2,4-difluorophenyl, 2,5-difluorophenyl, 2,6-difluorophenyl, 2,3,4-trifluorophenyl, 2,3,5-trifluorophenyl, 2,3,6-trifluorophenyl, 2,4,5-trifluorophenyl, 2,4,6-trifluorophenyl, 2,4-dichlorophenyl, 2,5-dichlorophenyl, 2,6-dichlorophenyl, 3,4-dichlorophenyl, 2,3,4-trichlorophenyl, 2,3,5-trichlorophenyl, 2,3,6-trichlorophenyl, 2,4,5-trichlorophenyl, 3,4,5-trichlorophenyl, 2,4,6-trichlorophenyl, 2,3-dimethylphenyl, 2,4-dimethylphenyl, 2,5-dimethylphenyl, 2,6-dimethylphenyl, 2,3,4-trimethylphenyl, 2,3,5-trimethylphenyl, 2,3,6-trimethylphenyl, 2,4,5-trimethylphenyl, 2,4,6-trimethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 2,3,4-triethylphenyl, 2,3,5-triethylphenyl, 2,3,6-triethylphenyl, 2,4,5-triethylphenyl, 2,4,6-triethylphenyl, 2-isopropylphenyl, 3-isopropylphenyl, and 4-isopropylphenyl.

Non-limiting examples of substituted aryl groups include 2-aminophenyl, 2-(N-methylamino)phenyl, 2-(N,N-dimethylamino)phenyl, 2-(N-ethylamino)phenyl, 2-(N,N-diethylamino)phenyl, 3-aminophenyl, 3-(N-methylamino)phenyl, 3-(N,N-dimethylamino)phenyl, 3-(N-ethylamino)phenyl, 3-(N,N-diethylamino)phenyl, 4-aminophenyl, 4-(N-methylamino)phenyl, 4-(N,N-dimethylamino)phenyl, 4-(N-ethylamino)phenyl, and 4-(N,N-diethylamino)phenyl.

A sample of a polymer of the present invention can be characterized by one or more analysis methods. Non-limiting examples of the analysis methods include proton nuclear magnetic resonance ($^1H$ NMR), carbon-13 nuclear magnetic resonance ($^{13}C$ NMR), Fourier-transform infrared spectroscopy (FTIR, e.g., Bruker Vertex V80V vacuum FTIR system), gel permeation chromatography (GPC, e.g., in dimethylformamide (DMF) buffer using Waters Ambient Temperature GPC with Waters 2414 Differential Refractive Index (dRI) Detector) for average molar mass and/or polydispersity, rheology, water contact angle analysis, X-ray diffraction (e.g., powder or solution X-ray diffraction pattern analysis), melting and/or glass transition temperature analysis, an immobilized oxidative chlorine content analysis, and antimicrobial and/or anti-fouling activity (e.g., efficacy in killing microorganisms, such as bacteria).

A sample of a polymer (e.g., a homopolymer, a copolymer) of the present invention can be characterized by an average molar mass. The average molar mass can be a number average molar mass ($M_n$), a weight average molar mass ($M_w$), a size average molar mass ($M_z$), or a viscosity molar mass ($M_v$). In some embodiments, the average molar mass is a number average molar mass.

The sample of a polymer can have an average molar mass (e.g., a number average molar mass) of at least or up to about 1 kDa, at least or up to about 2 kDa, at least or up to about 3 kDa, at least or up to about 4 kDa, at least or up to about 5 kDa, at least or up to about 6 kDa, at least or up to about 7 kDa, at least or up to about 8 kDa, at least or up to about 9 kDa, at least or up to about 10 kDa, at least or up to about 11 kDa, at least or up to about 12 kDa, at least or up to about 13 kDa, at least or up to about 14 kDa, at least or up to about 15 kDa, at least or up to about 16 kDa, at least or up to about 17 kDa, at least or up to about 18 kDa, at least or up to about 19 kDa, at least or up to about 20 kDa, at least or up to about 21 kDa, at least or up to about 22 kDa, at least or up to about 23 kDa, at least or up to about 24 kDa, at least or up to about 25 kDa, at least or up to about 26 kDa, at least or up to about 27 kDa, at least or up to about 28 kDa, at least or up to about 29 kDa, at least or up to about 30 kDa, at least or up to about 31 kDa, at least or up to about 32 kDa, at least or up to about 33 kDa, at least or up to about 34 kDa, at least or up to about 35 kDa, at least or up to about 36 kDa, at least or up to about 37 kDa, at least or up to about 38 kDa, at least or up to about 39 kDa, at least or up to about 40 kDa, at least or up to about 41 kDa, at least or up to about 42 kDa, at least or up to about 43 kDa, at least or up to about 44 kDa, at least or up to about 45 kDa, at least or up to about 46 kDa, at least or up to about 47 kDa, at least or up to about 48 kDa, at least or up to about 49 kDa, at least or up to about 50 kDa, at least or up to about 51 kDa, at least or up to about 52 kDa, at least or up to about 53 kDa, at least or up to about 54 kDa, at least or up to about 55 kDa, at least or up to about 56 kDa, at least or up to about 57 kDa, at least or up to about 58 kDa, at least or up to about 59 kDa, at least or up to about 60 kDa, at least or up to about 65 kDa, at least or up to about 70 kDa, at least or up to about 75 kDa, at least or up to about 80 kDa, at least or up to about 85 kDa, at least or up to about 90 kDa, at least or up to about 95 kDa, at least or up to about 100 kDa, at least or up to about 110 kDa, at least or up to about 120 kDa, at least or up to about 130 kDa, at least or up to about 140 kDa, at least or up to about 150 kDa, at least or up to about 160 kDa, at least or up to about 170 kDa, at least or up to about 180 kDa, at least or up to about 190 kDa, at least or up to about 200 kDa, at least or up to about 250 kDa, at least or up to about 300 kDa, at least or up to about 350 kDa, at least or up to about 400 kDa, at least or up to about 450 kDa, at least or up to about 500 kDa, at least or up to about 600 kDa, or at least or up to about 700 kDa.

In some embodiments, the sample of the polymer has a number average molar mass of about 52 kDa to about 500 kDa. The sample of the polymer can have a number average molar mass of about 52 kDa to about 55 kDa, about 52 kDa to about 60 kDa, about 52 kDa to about 80 kDa, about 52 kDa to about 100 kDa, about 52 kDa to about 120 kDa, about 52 kDa to about 150 kDa, about 52 kDa to about 200 kDa, about 52 kDa to about 300 kDa, about 52 kDa to about 400 kDa, about 52 kDa to about 500 kDa, about 55 kDa to about 60 kDa, about 55 kDa to about 80 kDa, about 55 kDa to about 100 kDa, about 55 kDa to about 120 kDa, about 55 kDa to about 150 kDa, about 55 kDa to about 200 kDa, about 55 kDa to about 300 kDa, about 55 kDa to about 400 kDa, about 55 kDa to about 500 kDa, about 60 kDa to about 80 kDa, about 60 kDa to about 100 kDa, about 60 kDa to about 120 kDa, about 60 kDa to about 150 kDa, about 60 kDa to about 200 kDa, about 60 kDa to about 300 kDa, about 60 kDa to about 400 kDa, about 60 kDa to about 500 kDa, about 80 kDa to about 100 kDa, about 80 kDa to about 120 kDa, about 80 kDa to about 150 kDa, about 80 kDa to about 200 kDa, about 80 kDa to about 300 kDa, about 80 kDa to about 400 kDa, about 80 kDa to about 500 kDa, about 100 kDa to about 120 kDa, about 100 kDa to about 150 kDa, about 100 kDa to about 200 kDa, about 100 kDa to about 300 kDa, about 100 kDa to about 400 kDa, about 100 kDa to about 500 kDa, about 120 kDa to about 150 kDa, about 120 kDa to about 200 kDa, about 120 kDa to about 300 kDa, about 120 kDa to about 400 kDa, about 120 kDa to about 500 kDa, about 150 kDa to about 200 kDa, about 150 kDa to about 300 kDa, about 150 kDa to about 400 kDa, about 150 kDa to about 500 kDa, about 200 kDa to about 300 kDa, about 200 kDa to about 400 kDa, about 200 kDa to about 500 kDa, about 300 kDa to about 400 kDa, about 300 kDa to about 500 kDa, or about 400 kDa to about 500 kDa.

In some embodiments, the sample of the polymer has a number average molar mass (e.g., a number average molar mass) of about 18 kDa to about 200 kDa. The sample of the polymer can have a number average molar mass of about 18 kDa to about 20 kDa, about 18 kDa to about 30 kDa, about 18 kDa to about 40 kDa, about 18 kDa to about 50 kDa, about 18 kDa to about 60 kDa, about 18 kDa to about 70 kDa, about 18 kDa to about 80 kDa, about 18 kDa to about 90 kDa, about 18 kDa to about 100 kDa, about 18 kDa to about 150 kDa, about 18 kDa to about 200 kDa, about 20 kDa to about 30 kDa, about 20 kDa to about 40 kDa, about 20 kDa to about 50 kDa, about 20 kDa to about 60 kDa, about 20 kDa to about 70 kDa, about 20 kDa to about 80 kDa, about 20 kDa to about 90 kDa, about 20 kDa to about 100 kDa, about 20 kDa to about 150 kDa, about 20 kDa to about 200 kDa, about 30 kDa to about 40 kDa, about 30 kDa to about 50 kDa, about 30 kDa to about 60 kDa, about 30 kDa to about 70 kDa, about 30 kDa to about 80 kDa, about 30 kDa to about 90 kDa, about 30 kDa to about 100 kDa, about 30 kDa to about 150 kDa, about 30 kDa to about 200 kDa, about 40 kDa to about 50 kDa, about 40 kDa to about 60 kDa, about 40 kDa to about 70 kDa, about 40 kDa to about 80 kDa, about 40 kDa to about 90 kDa, about 40 kDa to about 100 kDa, about 40 kDa to about 150 kDa, about 40 kDa to about 200 kDa, about 50 kDa to about 60 kDa, about 50 kDa to about 70 kDa, about 50 kDa to about 80 kDa, about 50 kDa to about 90 kDa, about 50 kDa to about 100 kDa, about 50 kDa to about 150 kDa, about 50 kDa to about 200 kDa, about 60 kDa to about 70 kDa, about 60 kDa to about 80 kDa, about 60 kDa to about 90 kDa, about 60 kDa to about 100 kDa, about 60 kDa to about 150 kDa, about 60 kDa to about 200 kDa, about 70 kDa to about 80 kDa, about 70 kDa to about 90 kDa, about 70 kDa to about 100 kDa, about 70 kDa to about 150 kDa, about 70 kDa to about 200 kDa, about 80 kDa to about 90 kDa, about 80 kDa to about 100 kDa, about 80 kDa to about 150 kDa, about 80 kDa to about 200 kDa, about 90 kDa to about 100 kDa, about 90 kDa to about 150 kDa, about 90 kDa to about 200 kDa, about 100 kDa to about 150 kDa, about 100 kDa to about 200 kDa, or about 150 kDa to about 200 kDa.

In some embodiments, a sample of poly(HA) has a number average molar mass (e.g., a number average molar mass) of about 5-8 kDa. In some embodiments, a sample of p(HA-SBMA)-1 has a number average molar mass (e.g., a number average molar mass) of about 50-100 kDa. In some embodiments, a sample of p(HA-SBMA)-2 has a number average molar mass (e.g., a number average molar mass) of about 10-50 kDa.

The sample of the polymer can have a polydispersity, e.g., as determined by GPC. A polydispersity can be defined by a ratio of a weight average molar mass of the polymer in the sample ($M_w$) to the number average molar mass ($M_n$). The sample of the polymer can have a polydispersity of at least or up to about 1, at least or up to about 1.1, at least or up to about 1.2, at least or up to about 1.3, at least or up to about 1.4, at least or up to about 1.5, at least or up to about 1.6, at least or up to about 1.7, at least or up to about 1.8, at least or up to about 1.9, at least or up to about 2, at least or up to about 2.5, at least or up to about 3, at least or up to about 3.5, at least or up to about 4, at least or up to about 4.5, at least or up to about 5, at least or up to about 6, at least or up to about 7, at least or up to about 8, at least or up to about 9, or at least or up to about 10.

In some embodiments, the sample of the polymer has a polydispersity of about 1 to about 5. The sample of the polymer can have a polydispersity of about 1 to about 1.5, about 1 to about 2, about 1 to about 2.5, about 1 to about 3, about 1 to about 3.5, about 1 to about 4, about 1 to about 4.5, about 1 to about 5, about 1.5 to about 2, about 1.5 to about 2.5, about 1.5 to about 3, about 1.5 to about 3.5, about 1.5 to about 4, about 1.5 to about 4.5, about 1.5 to about 5, about 2 to about 2.5, about 2 to about 3, about 2 to about 3.5, about 2 to about 4, about 2 to about 4.5, about 2 to about 5, about 2.5 to about 3, about 2.5 to about 3.5, about 2.5 to about 4, about 2.5 to about 4.5, about 2.5 to about 5, about 3 to about 3.5, about 3 to about 4, about 3 to about 4.5, about 3 to about 5, about 3.5 to about 4, about 3.5 to about 4.5, about 3.5 to about 5, about 4 to about 4.5, about 4 to about 5, or about 4.5 to about 5.

The composition of the present invention can comprise any number of species of polymer disclosed herein. The composition of the present invention can comprise at least or up to 1 species of polymer, at least or up to 2 different species of polymer, at least or up to 3 different species of polymer, at least or up to 4 different species of polymer, at least or up to 5 different species of polymer, at least or up to 6 different species of polymer, at least or up to 7 different species of polymer, at least or up to 8 different species of polymer, at least or up to 9 different species of polymer, at least or up to 10 different species of polymer, at least or up to 15 different species of polymer, at least or up to 20 different species of polymer, at least or up to 30 different species of polymer, at least or up to 40 different species of polymer, or at least or up to 50 different species of polymer.

In some embodiments, the composition of the present invention comprises (i) a first species of polymer comprising one or more N-halamine precursors (or the N-halamine derivatives thereof) and (ii) a second species of polymer that does not comprise an N-halamine precursors (or the N-halamine derivatives thereof). In an example, the second species of polymer comprises a non-fouling moiety, as disclosed herein. In another example, the second species of polymer comprises a filler moiety, such as a thermoplastic or a thermoset. The first species of polymer (P1) and the second species of polymer (P2) can be present in the composition in a mass-to-mass ratio of about 1:10,000 to about 10,000:1 (P1:P2). The mass-to-mass ratio of P1:P2 can be about 1:1,000 to about 10:1. The mass-to-mass ratio of P1:P2 can be about 1:1,000 to about 1:1. The mass-to-mass ratio of P1:P2 can be about 1:100 to about 1:1. The mass-to-mass ratio of P1:P2 can be about 1:10 to about 10:1. The mass-mass ratio of P1:P2 can be at least or up to about 1:10,000, at least or up to about 5,000:1, at least or up to about 1,000:1, at least or up to about 500:1, at least or up to about 100:1, at least or up to about 50:1, at least or up to about 10:1, at least or up to about 5:1, at least or up to about 1:1, at least or up to about 5:1, at least or up to about 10:1, at least or up to about 50:1, at least or up to about 100:1, at least or up to about 500:1, at least or up to about 1,000:1, at least or up to about 5,000:1, or at least or up to about 10,000:1.

In some embodiments, the mass-to-mass ratio of P1:P2 can be at least or up to about 30:1, at least or up to about 29:1, at least or up to about 28:1, at least or up to about 27:1, at least or up to about 26:1, at least or up to about 25:1, at least or up to about 24:1, at least or up to about 23:1, at least or up to about 22:1, at least or up to about 21:1, at least or up to about 20:1, at least or up to about 19:1, at least or up to about 18:1, at least or up to about 17:1, at least or up to about 16:1, at least or up to about 15:1, at least or up to about 14:1, at least or up to about 13:1, at least or up to about 12:1, at least or up to about 11:1, at least or up to about 10:1, at least or up to about 9:1, at least or up to about 8:1, at least or up to about 7:1, at least or up to about 6:1, at least or up to about 5:1, at least or up to about 4:1, at least or up to about 3:1, at least or up to about 2:1, at least or up to about 1:1, at least or up to about 1:2, at least or up to about 1:3, at least or up to about 1:4, at least or up to about 1:5, at least or up to about 1:6, at least or up to about 1:7, at least or up to about 1:8, at least or up to about 1:9, at least or up to about 1:10, at least or up to about 1:11, at least or up to about 1:12, at least or up to about 1:13, at least or up to about 1:14, at least or up to about 1:15, at least or up to about 1:16, at least or up to about 1:17, at least or up to about 1:18, at least or up to about 1:19, at least or up to about 1:20, at least or up to about 1:21, at least or up to about 1:22, at least or up to about 1:23, at least or up to about 1:24, at least or up to about 1:25, at least or up to about 1:26, at least or up to about 1:27, at least or up to about 1:28, at least or up to about 1:29, or at least or up to about 1:30. In some embodiments, the mass-to-mass ratio of P1:P2 can be at least or up to about 19:1. In some embodiments, the mass-to-mass ratio of P1:P2 can be at least or up to about 1:19.

In some embodiments, the composition of the present invention comprises a plurality of species of polymer that are different. The plurality of species of polymer can be present in one or more phases in the composition. A phase of the composition can be solid, liquid, or a mixture thereof (e.g., semi-solid or gel). A phase of the composition can be a homogeneous mixture (e.g., a homogeneous entanglement) of the plurality of species of polymer. The homogeneous mixture can be characterized by having a homogeneous structure throughout the phase. The homogeneous structure can be present throughout two axes of the phase, wherein the two axes are not parallel (e.g., perpendicular). The homogeneous structure can be present throughout a volume of the phase. A phase can have a single grain that has the homogeneous structure throughout the grain. Alternatively, a single phase can have a plurality of grains, and each of the plurality of grains can have the same homogeneous structure. The plurality of grains can have the same size or different sizes.

In some embodiments, a plurality of different species of polymer in a composition can form at least or up to 1 phase, at least or up to 2 different phases, at least or up to 3 different phases, at least or up to 4 different phases, at least or up to 5 different phases, at least or up to 6 different phases, at least or up to 7 different phases, at least or up to 8 different phases, at least or up to 9 different phases, or at least or up to 10 different phases within the composition. In an example, a plurality of different phases can have different microstructures.

The composition of the present invention can be, for example, a solid composition, a semi-solid composition, a liquid composition, a gel composition, a crystalline composition, a semi-crystalline composition, an aerosol composition, modifications thereof, or combinations thereof. Such physical state of the composition of the present invention can be characterized in room temperature (e.g., 25 degrees Celsius (° C.)). The physical state of the composition of the present invention can be stable in a temperature of about −20° C. to about 140° C. The physical state of the composition of the present invention can be stable at a temperature of about −20° C. to about −10° C., about −20° C. to about 0° C., about −20° C. to about 10° C., about −20° C. to about 20° C., about −20° C. to about 25° C., about −20° C. to about 40° C., about −20° C. to about 60° C., about −20° C. to about 80° C., about −20° C. to about 100° C., about −20° C. to about 120° C., about −20° C. to about 140° C., about −10° C. to about 0° C., about −10° C. to about 10° C., about −10° C. to about 20° C., about −10° C. to about 25° C., about −10° C. to about 40° C., about −10° C. to about 60° C., about −10° C. to about 80° C., about −10° C. to about 100° C., about −10° C. to about 120° C., about −10° C. to about 140° C., about 0° C. to about 10° C., about 0° C. to about 20° C., about 0° C. to about 25° C., about 0° C. to about 40° C., about 0° C. to about 60° C., about 0° C. to about 80° C., about 0° C. to about 100° C., about 0° C. to about 120° C., about 0° C. to about 140° C., about 10° C. to about 20° C., about 10° C. to about 25° C., about 10° C. to about 40° C., about 10° C. to about 60° C., about 10° C. to about 80° C., about 10° C. to about 100° C., about 10° C. to about 120° C., about 10° C. to about 140° C., about 20° C. to about 25° C., about 20° C. to about 40° C., about 20° C. to about 60° C., about 20° C. to about 80° C., about 20° C. to about 100° C., about 20° C. to about 120° C., about 20° C. to about 140° C., about 25° C. to about 40° C., about 25° C. to about 60° C., about 25° C. to about 80° C., about 25° C. to about 100° C., about 25° C. to about 120° C., about 25° C. to about 140° C., about 40° C. to about 60° C., about 40° C. to about 80° C., about 40° C. to about 100° C., about 40° C. to about 120° C., about 40° C. to about 140° C., about 60° C. to about 80° C., about 60° C. to about 100° C., about 60° C. to about 120° C., about 60° C. to about 140° C., about 80° C. to about 100° C., about 80° C. to about 120° C., about 80° C. to about 140° C., about 100° C. to about 120° C., about 100° C. to about 140° C., or about 120° C. to about 140° C.

The physical state of the composition of the present invention can be stable at a pressure of about −14.7 (pounds per square in gauge) PSIG to about 100 PSIG. The physical state of the composition of the present invention can be stable at a pressure of about −14.7 PSIG to about −10 PSIG, about −14.7 PSIG to about −5 PSIG, about −14.7 PSIG to about 0 PSIG, about −14.7 PSIG to about 5 PSIG, about −14.7 PSIG to about 10 PSIG, about −14.7 PSIG to about 15 PSIG, about −14.7 PSIG to about 20 PSIG, about −14.7 PSIG to about 30 PSIG, about −14.7 PSIG to about 60 PSIG, about −14.7 PSIG to about 90 PSIG, about −14.7 PSIG to about 100 PSIG, about −10 PSIG to about −5 PSIG, about −10 PSIG to about 0 PSIG, about −10 PSIG to about 5 PSIG, about −10 PSIG to about 10 PSIG, about −10 PSIG to about 15 PSIG, about −10 PSIG to about 20 PSIG, about −10 PSIG to about 30 PSIG, about −10 PSIG to about 60 PSIG, about −10 PSIG to about 90 PSIG, about −10 PSIG to about 100 PSIG, about −5 PSIG to about 0 PSIG, about −5 PSIG to about 5 PSIG, about −5 PSIG to about 10 PSIG, about −5 PSIG to about 15 PSIG, about −5 PSIG to about 20 PSIG, about −5 PSIG to about 30 PSIG, about −5 PSIG to about 60 PSIG, about −5 PSIG to about 90 PSIG, about −5 PSIG to about 100 PSIG, about 0 PSIG to about 5 PSIG, about 0 PSIG to about 10 PSIG, about 0 PSIG to about 15 PSIG, about 0 PSIG to about 20 PSIG, about 0 PSIG to about 30 PSIG, about 0 PSIG to about 60 PSIG, about 0 PSIG to about 90 PSIG, about 0 PSIG to about 100 PSIG, about 5 PSIG to about 10 PSIG, about 5 PSIG to about 15 PSIG, about 5 PSIG to about 20 PSIG, about 5 PSIG to about 30 PSIG, about 5 PSIG to about 60 PSIG, about 5 PSIG to about 90 PSIG, about 5 PSIG to about 100 PSIG, about 10 PSIG to about 15 PSIG, about 10 PSIG to about 20 PSIG, about 10 PSIG to about 30 PSIG, about 10 PSIG to about 60 PSIG, about 10 PSIG to about 90 PSIG, about 10 PSIG to about 100 PSIG, about 15 PSIG to about 20 PSIG, about 15 PSIG to about 30 PSIG, about 15 PSIG to about 60 PSIG, about 15 PSIG to about 90 PSIG, about 15 PSIG to about 100 PSIG, about 20 PSIG to about 30 PSIG, about 20 PSIG to about 60 PSIG, about 20 PSIG to about 90 PSIG, about 20 PSIG to about 100 PSIG, about 30 PSIG to about 60 PSIG, about 30 PSIG to about 90 PSIG, about 30 PSIG to about 100 PSIG, about 60 PSIG to about 90 PSIG, about 60 PSIG to about 100 PSIG, or about 90 PSIG to about 100 PSIG. In some embodiments, physical state of the composition of the present invention is stable at about 0 PSIG (i.e. atmospheric pressure).

The composition of the present invention can retain some or entire function (e.g., a biocidal activity, such as an antimicrobial activity and/or anti-fouling activity against one or more microorganisms) at a temperature of about −20° C. to about 140° C. The composition of the present invention can retain some or entire function at a temperature of about −20° C. to about −10° C., about −20° C. to about 0° C., about −20° C. to about 10° C., about −20° C. to about 20° C., about −20° C. to about 25° C., about −20° C. to about 40° C., about −20° C. to about 60° C., about −20° C. to about 80° C., about −20° C. to about 100° C., about −20° C. to about 120° C., about −20° C. to about 140° C., about −10° C. to about 0° C., about −10° C. to about 10° C., about −10° C. to about 20° C., about −10° C. to about 25° C., about −10° C. to about 40° C., about −10° C. to about 60° C., about −10° C. to about 80° C., about −10° C. to about 100° C., about −10° C. to about 120° C., about −10° C. to about 140° C., about 0° C. to about 10° C., about 0° C. to about 20° C., about 0° C. to about 25° C., about 0° C. to about 40° C., about 0° C. to about 60° C., about 0° C. to about 80° C., about 0° C. to about 100° C., about 0° C. to about 120° C., about 0° C. to about 140° C., about 10° C. to about 20° C., about 10° C. to about 25° C., about 10° C. to about 40° C., about 10° C. to about 60° C., about 10° C. to about 80° C., about 10° C. to about 100° C., about 10° C. to about 120° C., about 10° C. to about 140° C., about 20° C. to about 25° C., about 20° C. to about 40° C., about 20° C. to about 60° C., about 20° C. to about 80° C., about 20° C. to about 100° C., about 20° C. to about 120° C., about 20° C. to about 140° C., about 25° C. to about 40° C., about 25° C. to about 60° C., about 25° C. to about 80° C., about 25° C. to about 100° C., about 25° C. to about 120° C., about 25° C. to about 140° C., about 40° C. to about 60° C., about 40° C. to about 80° C., about 40° C. to about 100° C., about 40° C. to about 120° C., about 40° C. to about 140° C., about 60° C. to about 80° C., about 60° C. to about 100° C., about 60° C. to about 120° C., about 60° C. to about 140° C., about 80° C. to about 100° C., about 80° C. to about 120° C., about 80° C. to about 140° C., about 100° C. to about 120° C., about 100° C. to about 140° C., or about 120° C. to about 140° C. In some embodiments, the composition of the present invention can retain some or all of its function in room temperature (i.e., about 25° C.).

The composition of the present invention can retain some or entire function at a pressure of about −14.7 PSIG to about 100 PSIG. The composition can retain some or entire function at a pressure from −14.7 PSIG to about −10 PSIG, about −14.7 PSIG to about −5 PSIG, about −14.7 PSIG to about 0 PSIG, about −14.7 PSIG to about 5 PSIG, about −14.7 PSIG to about 10 PSIG, about −14.7 PSIG to about 15 PSIG, about −14.7 PSIG to about 20 PSIG, about −14.7 PSIG to about 30 PSIG, about −14.7 PSIG to about 60 PSIG, about −14.7 PSIG to about 90 PSIG, about −14.7 PSIG to about 100 PSIG, about −10 PSIG to about −5 PSIG, about −10 PSIG to about 0 PSIG, about −10 PSIG to about 5 PSIG, about −10 PSIG to about 10 PSIG, about −10 PSIG to about 15 PSIG, about −10 PSIG to about 20 PSIG, about −10 PSIG to about 30 PSIG, about −10 PSIG to about 60 PSIG, about −10 PSIG to about 90 PSIG, about −10 PSIG to about 100 PSIG, about −5 PSIG to about 0 PSIG, about −5 PSIG to about 5 PSIG, about −5 PSIG to about 10 PSIG, about −5 PSIG to about 15 PSIG, about −5 PSIG to about 20 PSIG, about −5 PSIG to about 30 PSIG, about −5 PSIG to about 60 PSIG, about −5 PSIG to about 90 PSIG, about −5 PSIG to about 100 PSIG, about 0 PSIG to about 5 PSIG, about 0 PSIG to about 10 PSIG, about 0 PSIG to about 15 PSIG, about 0 PSIG to about 20 PSIG, about 0 PSIG to about 30 PSIG, about 0 PSIG to about 60 PSIG, about 0 PSIG to about 90 PSIG, about 0 PSIG to about 100 PSIG, about 5 PSIG to about 10 PSIG, about 5 PSIG to about 15 PSIG, about 5 PSIG to about 20 PSIG, about 5 PSIG to about 30 PSIG, about 5 PSIG to about 60 PSIG, about 5 PSIG to about 90 PSIG, about 5 PSIG to about 100 PSIG, about 10 PSIG to about 15 PSIG, about 10 PSIG to about 20 PSIG, about 10 PSIG to about 30 PSIG, about 10 PSIG to about 60 PSIG, about 10 PSIG to about 90 PSIG, about 10 PSIG to about 100 PSIG, about 15 PSIG to about 20 PSIG, about 15 PSIG to about 30 PSIG, about 15 PSIG to about 60 PSIG, about 15 PSIG to about 90 PSIG, about 15 PSIG to about 100 PSIG, about 20 PSIG to about 30 PSIG, about 20 PSIG to about 60 PSIG, about 20 PSIG to about 90 PSIG, about 20 PSIG to about 100 PSIG, about 30 PSIG to about 60 PSIG, about 30 PSIG to about 90 PSIG, about 30 PSIG to about 100 PSIG, about 60 PSIG to about 90 PSIG, about 60 PSIG to about 100 PSIG, or about 90 PSIG to about 100 PSIG. In some embodiments, the composition of the present invention can retain some or all of its function at about 0 PSIG (i.e. atmospheric pressure).

The composition of the present invention can have a content of oxidative chlorine as determined by, for example, iodometric/thiosulfate titration. The content of oxidative chlorine can comprise one or more oxidative chlorine atoms immobilized to a polymer of the composition. The one or more oxidative chlorine atoms can be immobilized to a repeating unit of the polymer of the composition. The one or more oxidative chlorine atoms can be immobilized to an N-halamine precursor of the repeating unit, as disclosed herein. In an example, the one or more oxidative chlorine atoms are immobilized to a nitrogen-containing heterocycle (e.g., a hydantoin) of the repeating unit. Alternatively or in addition to, the one or more oxidative chlorine atoms are immobilized to a non-heterocyclic moiety of the repeating unit.

In some embodiments, all or a portion of the content of oxidative chlorine can be present on a surface of the composition of the present invention. The content of oxidative chlorine present on the surface can be at least or up to about $10^2$ atoms/$cm^2$, at least or up to about $10^3$ atoms/$cm^2$, at least or up to about $10^4$ atoms/$cm^2$, at least or up to about $10^5$ atoms/$cm^2$, at least or up to about $10^6$ atoms/$cm^2$, at least or up to about $10^7$ atoms/$cm^2$, at least or up to about $10^8$ atoms/$cm^2$, at least or up to about $10^9$ atoms/$cm^2$, at least or up to about $10^{10}$ atoms/$cm^2$, at least or up to about $10^{11}$ atoms/$cm^2$, at least or up to about $10^{12}$ atoms/$cm^2$, at least or up to about $10^{13}$ atoms/$cm^2$, at least or up to about $10^{14}$ atoms/$cm^2$, at least or up to about $10^{15}$ atoms/$cm^2$, at least or up to about $10^{16}$ atoms/$cm^2$, at least or up to about $10^{17}$ atoms/$cm^2$, at least or up to about $10^{18}$ atoms/$cm^2$, at least or up to about $10^{19}$ atoms/$cm^2$, at least or up to about $10^{20}$ atoms/$cm^2$, at least or up to about $10^{21}$ atoms/$cm^2$, at least or up to about $10^{22}$ atoms/$cm^2$, at least or up to about $10^{23}$ atoms/$cm^2$, at least or up to about $10^{24}$ atoms/$cm^2$, at least or up to about $10^{25}$ atoms/$cm^2$, at least or up to about $10^{30}$ atoms/$cm^2$, at least or up to about $10^{40}$ atoms/$cm^2$, or at least or up to about $10^{50}$ atoms/$cm^2$.

In some embodiments, the content of oxidative chlorine present on the surface of the composition of the present invention can be about $10^{12}$ atoms/$cm^2$ to about $10^{18}$ atoms/$cm^2$, about $10^{14}$ atoms/$cm^2$ to about $10^{15}$ atoms/$cm^2$, about $10^{14}$ atoms/$cm^2$ to about $10^{16}$ atoms/$cm^2$, about $10^{14}$ atoms/$cm^2$ to about $10^{17}$ atoms/$cm^2$, about $10^{14}$ atoms/$cm^2$ to about $10^{18}$ atoms/$cm^2$, about $10^{14}$ atoms/$cm^2$ to about $10^{19}$ atoms/$cm^2$, about $10^{14}$ atoms/$cm^2$ to about $10^{20}$ atoms/$cm^2$, about $10^{15}$ atoms/$cm^2$ to about $10^{16}$ atoms/$cm^2$, about $10^{15}$ atoms/$cm^2$ to about $10^{17}$ atoms/$cm^2$, about $10^{15}$ atoms/$cm^2$ to about $10^{18}$ atoms/$cm^2$, about $10^{15}$ atoms/$cm^2$ to about $10^{19}$ atoms/$cm^2$, about $10^{15}$ atoms/$cm^2$ to about $10^{20}$ atoms/$cm^2$, about $10^{16}$ atoms/$cm^2$ to about $10^{17}$ atoms/$cm^2$, about $10^{16}$ atoms/$cm^2$ to about $10^{18}$ atoms/$cm^2$, about $10^{16}$ atoms/$cm^2$ to about $10^{19}$ atoms/$cm^2$, about $10^{16}$ atoms/$cm^2$ to about $10^{20}$ atoms/$cm^2$, about $10^{17}$ atoms/$cm^2$ to about $10^{18}$ atoms/$cm^2$, about $10^{17}$ atoms/$cm^2$ to about $10^{19}$ atoms/$cm^2$, about $10^{17}$ atoms/$cm^2$ to about $10^{20}$ atoms/$cm^2$, about $10^{18}$ atoms/$cm^2$ to about $10^{19}$ atoms/$cm^2$, about $10^{18}$ atoms/$cm^2$ to about $10^{20}$ atoms/$cm^2$, or about $10^{19}$ atoms/$cm^2$ to about $10^{20}$ atoms/$cm^2$.

In some embodiments, the content of oxidative chlorine present in the composition of the present invention can be at least or up to about $10^2$ atoms/$cm^3$, at least or up to about $10^3$ atoms/$cm^3$, at least or up to about $10^4$ atoms/$cm^3$, at least or up to about $10^5$ atoms/$cm^3$, at least or up to about $10^6$ atoms/$cm^3$, at least or up to about $10^7$ atoms/$cm^3$, at least or up to about $10^8$ atoms/$cm^3$, at least or up to about $10^9$ atoms/$cm^3$, at least or up to about $10^{10}$ atoms/$cm^3$, at least or up to about $10^{11}$ atoms/$cm^3$, at least or up to about $10^{12}$ atoms/$cm^3$, at least or up to about $10^{13}$ atoms/$cm^3$, at least or up to about $10^{14}$ atoms/$cm^3$, at least or up to about $10^{15}$ atoms/$cm^3$, at least or up to about $10^{16}$ atoms/$cm^3$, at least or up to about $10^{17}$ atoms/$cm^3$, at least or up to about $10^{18}$ atoms/$cm^3$, at least or up to about $10^{19}$ atoms/$cm^3$, at least or up to about $10^{20}$ atoms/$cm^3$, at least or up to about $10^{21}$ atoms/$cm^3$, at least or up to about $10^{22}$ atoms/$cm^3$, at least or up to about $10^{23}$ atoms/$cm^3$, at least or up to about $10^{24}$ atoms/$cm^3$, at least or up to about $10^{25}$ atoms/$cm^3$, at least or up to about $10^{30}$ atoms/$cm^3$, at least or up to about $10^{40}$ atoms/$cm^3$, or at least or up to about $10^{50}$ atoms/$cm^3$.

In some embodiments, the N-halamine precursor is present in the composition of the present invention in an amount of at least or up to about 0.01%, at least or up to about 0.02% at least or up to about 0.03%, at least or up to about 0.04%, at least or up to about 0.05%, at least or up to about 0.06%, at least or up to about 0.07%, at least or up to about 0.08%, at least or up to about 0.09%, at least or up to about 0.1%, at least or up to about 0.2%, at least or up to about 0.3%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 2%, at least or up to about 3%, at least or up to about 4%, at least or up to about 5%, at least or up to about 6%, at least or up to about 7%, at least or up to about 8%, at least or up to about 9%, at least or up to about 10%, at least or up to about 15%, at least or up to about 20%, at least or up to about 25%, at least or up to about 30%, at least or up to about 35%, at least or up to about 40%, at least or up to about 45%, at least or up to about 50%, at least or up to about 55%, at least or up to about 60%, at least or up to about 65%, at least or up to about 70%, at least or up to about 75%, at least or up to about 80%, at least or up to about 85%, or at least or up to about 90% by mass of the composition.

In some embodiments, the composition or article of manufacture as disclosed herein comprises a polymer that comprises a plurality of active regions. In some embodiments, the plurality of active regions comprises a plurality of hydantoin groups. In some examples, the first polymer comprises a repeating unit, and the repeating unit comprises a side chain. The side chain can comprise a nitrogen-containing heterocycle that forms an N-halamine when exposed to an electrophilic halogen source (e.g., a source comprising chlorine, such as HClO or NaClO). In some embodiments, the composition or article of manufacture can exhibit at least a partial recharging (e.g., at least 10% recharging or a complete recharging) of the plurality of active regions (e.g., active regions of the polymer) upon being subjected to a plurality of recharge-discharge cycles (e.g., a plurality of chlorination-dechlorination cycles).

In some embodiments, a recharge phase of a recharge-discharge cycle the plurality of recharge-discharge cycles can comprise immersing the composition or article of manufacture in a sodium hypochlorite solution for a time period of at least about 1 hour. The sodium hypochlorite solution can be at least or up to about 0.01 N, at least or up to about 0.05 N, at least or up to about 0.1 N, at least or up to about 0.2 N, at least or up to about 0.3 N, at least or up to about 0.4 N, at least or up to about 0.5 N, at least or up to about 0.6 N, at least or up to about 0.7 N, at least or up to about 0.8 N, at least or up to about 0.9 N, at least or up to about 1 N, at least or up to about 2 N, at least or up to about 3 N, at least or up to about 4 N, at least or up to about 5 N, at least or up to about 10 N, or at least or up to about 20 N. The time period can be at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, or at least about 24 hours.

In some embodiments, a sodium hypochlorite solution can have a pH of less than about 7, less than about 6.5, less than about 6, less than about 5.5, less than about 5, less than about 4.5, or less than about 4. In some embodiments, a sodium hypochlorite solution can have a pH of less than about 6. In some embodiments, a sodium hypochlorite solution can have a pH of less than about 5.5. In some embodiments, a sodium hypochlorite solution can have a pH of less than about 5. In some embodiments, a sodium hypochlorite solution can have a pH of greater than about 7, greater than about 7.5, greater than about 8, greater than about 8.5, greater than about 9, greater than about 9.5, greater than about 10, greater than about 10.5, greater than about 11, greater than about 11.5, or greater than about 12.

In some embodiments, a discharge phase of the recharge-discharge cycle the plurality of recharge-discharge cycles can comprise an iodometric titration using potassium iodide, acid (e.g., acetic acid), and/or sodium thiosulfate solution. The concentration of potassium iodide can be at least or up to about 1 millimolar (mM), at least or up to about 2 mM, at least or up to about 5 mM, at least or up to about 10 mM, at least or up to about 20 mM, at least or up to about 30 mM, at least or up to about 40 mM, at least or up to about 50 mM, at least or up to about 60 mM, at least or up to about 100 mM, at least or up to about 200 mM, or at least or up to about 500 mM. The concentration of acetic acid can be at least or up to about 0.1% (e.g., v/v % in water), at least or up to about 0.2%, at least or up to about 0.5%, at least or up to about 1%, at least or up to about 2%, at least or up to about 5%, at least or up to about 10%, at least or up to about 15%, at least or up to about 20%, or at least or up to about 50%. The concentration of sodium thiosulfate solution can be at least or up to about 0.0001 normal (N), at least or up to about 0.0002 N, at least or up to about 0.0005 N, at least or up to about 0.001 N, at least or up to about 0.002 N, at least or up to about 0.005 N, at least or up to about 0.01 N, or at least or up to about 0.1 N.

In some embodiments, the partial recharging can be at least or up to about 1% recharging, at least or up to about 5% recharging, at least or up to about 10% recharging, at least or up to about 10% recharging, at least or up to about 15% recharging, at least or up to about 20% recharging, at least or up to about 30% recharging, at least or up to about 40% recharging, at least or up to about 50% recharging, at least or up to about 60% recharging, at least or up to about 70% recharging, at least or up to about 75% recharging, at least or up to about 80% recharging, at least or up to about 85% recharging, at least or up to about 90% recharging, at least or up to about 95% recharging, at least or up to about 99% recharging, or at least or up to about 100% recharging.

In some embodiments, the plurality of recharge-discharge cycles (e.g., a plurality of chlorination-dechlorination cycles) can be at least or up to about 2 recharge-discharge cycles, at least or up to about 3 recharge-discharge cycles, at least or up to about 4 recharge-discharge cycles, at least or up to about 5 recharge-discharge cycles, at least or up to about 6 recharge-discharge cycles, at least or up to about 7 recharge-discharge cycles, at least or up to about 8 recharge-discharge cycles, at least or up to about 9 recharge-discharge cycles, at least or up to about 10 recharge-discharge cycles, at least or up to about 11 recharge-discharge cycles, at least or up to about 12 recharge-discharge cycles, at least or up to about 13 recharge-discharge cycles, at least or up to about 14 recharge-discharge cycles, at least or up to about 15 recharge-discharge cycles, at least or up to about 16 recharge-discharge cycles, at least or up to about 17 recharge-discharge cycles, at least or up to about 18 recharge-discharge cycles, at least or up to about 19 recharge-discharge cycles, at least or up to about 20 recharge-discharge cycles, at least or up to about 25 recharge-discharge cycles, at least or up to about 30 recharge-discharge cycles, at least or up to about 40 recharge-discharge cycles, at least or up to about 50 recharge-discharge cycles, at least or up to about 60 recharge-discharge cycles, at least or up to about 70 recharge-discharge cycles, at least or up to about 80 recharge-discharge cycles, at least or up to about 90 recharge-discharge cycles, or at least or up to about 100 recharge-discharge cycles.

In some embodiments, upon any recharge-discharge cycle, a measured content of oxidative chlorine present on the surface (or extracted from the surface) of the composition or article of manufacture can be, for example, about $10^{12}$ atoms/$cm^2$ to about $10^{18}$ atoms/$cm^2$, as provided in the present disclosure.

In some embodiments, upon any recharge-discharge cycle as disclosed herein, a measured content of oxidative chlorine present on the surface (or extracted from the surface) of the composition or article of manufacture can be at least or up to about 250 parts per million (ppm), at least or up to about 250 ppm, at least or up to about 260 ppm, at least or up to about 270 ppm, at least or up to about 280 ppm, at least or up to about 290 ppm, at least or up to about 300 ppm, at least or up to about 350 ppm, at least or up to about 400 ppm, at least or up to about 450 ppm, at least or up to about 500 ppm, at least or up to about 550 ppm, at least or up to about 600 ppm, at least or up to about 650 ppm, at least or up to about 700 ppm, at least or up to about 750 ppm, at least or up to about 800 ppm, at least or up to about 850 ppm, at least or up to about 900 ppm, at least or up to about 950 ppm, or at least or up to about 1,000 ppm.

Prior to a recharging process (e.g., a re-chlorination process) as disclosed herein, at least or up to about 90%, at least or up to about 91%, at least or up to about 92%, at least or up to about 93%, at least or up to about 94%, at least or up to about 95%, at least or up to about 96%, at least or up to about 97%, at least or up to about 98%, at least or up to about 90%, at least or up to about 99.5%, or substantially 100% of an amount of previously charged chlorine atoms on the surface (e.g., chlorine atoms bound to the hydantoin groups on the surface) can be discharged. For example, prior to the re-chlorination process, substantially all of the previously charged chlorine atoms on the surface of the composition or article of manufacture of the present disclosure can be discharged.

In some embodiments, the nitrogen-containing heterocycle is present in the composition of the present invention in an amount of at least or up to about 0.01%, at least or up to about 0.02%, at least or up to about 0.03%, at least or up to about 0.04%, at least or up to about 0.05%, at least or up to about 0.06%, at least or up to about 0.07%, at least or up to about 0.08%, at least or up to about 0.09%, at least or up to about 0.1%, at least or up to about 0.2%, at least or up to about 0.3%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 2%, at least or up to about 3%, at least or up to about 4%, at least or up to about 5%, at least or up to about 6%, at least or up to about 7%, at least or up to about 8%, at least or up to about 9%, at least or up to about 10%, at least or up to about 15%, at least or up to about 20%, at least or up to about 25%, at least or up to about 30%, at least or up to about 35%, at least or up to about 40%, at least or up to about 45%, at least or up to about 50%, at least or up to about 55%, at least or up to about 60%, at least or up to about 65%, at least or up to about 70%, at least or up to about 75%, at least or up to about 80%, at least or up to about 85%, or at least or up to about 90% by mass of the composition.

In some embodiments, the nitrogen-containing heterocycle is present in the composition of the present invention in an amount from about 0.1% to about 20%. The nitrogen-containing heterocycle is present in the composition of the present invention in an amount from at least about 0.1%. The nitrogen-containing heterocycle is present in the composition of the present invention in an amount from at most about 20%. The nitrogen-containing heterocycle is present in the composition of the present invention in an amount from about 0.1% to about 0.5%, about 0.1% to about 1%, about 0.1% to about 5%, about 0.1% to about 10%, about 0.1% to about 15%, about 0.1% to about 20%, about 0.5% to about 1%, about 0.5% to about 5%, about 0.5% to about 10%, about 0.5% to about 15%, about 0.5% to about 20%, about 1% to about 5%, about 1% to about 10%, about 1% to about 15%, about 1% to about 20%, about 5% to about 10%, about 5% to about 15%, about 5% to about 20%, about 10% to about 15%, about 10% to about 20%, or about 15% to about 20%. The nitrogen-containing heterocycle is present in the composition of the present invention in an amount from about 0.1%, about 0.5% about 1%, about 5%, about 10%, about 15%, or about 20% by mass of the composition.

The composition of the present invention can be a composite material comprising (i) any of the polymers of the present invention and (ii) a plurality of particles. In an example, the polymers can be combined with the plurality of particles subsequent to preparation (e.g., polymerization) of the polymers. In another example, monomeric units of the polymers can be mixed with the plurality of particles, and the monomeric units can be subjected to polymerization to form the composite material.

In some embodiments, the composition or article of manufacture of the present disclosure is substantially free of copper. The amount of copper in the composition or article of manufacture can be at most about 50 ppm, at most about 40 ppm, at most about 30 ppm, at most about 20 ppm, at most about 10 ppm, at most about 5 ppm, at most about 4 ppm, at most about 3 ppm, at most about 2 ppm, at most about 1 ppm, at most about 0.5 ppm, at most about 0.4 ppm, at most about 0.3 ppm, at most about 0.2 ppm, at most about 0.1 ppm, at most about 0.05 ppm, or at most about 0.01 ppm.

In some embodiments, the composition or article of manufacture of the present disclosure is substantially free of silver. The amount of silver in the composition or article of manufacture can be at most about 50 ppm, at most about 40 ppm, at most about 30 ppm, at most about 20 ppm, at most about 10 ppm, at most about 5 ppm, at most about 4 ppm, at most about 3 ppm, at most about 2 ppm, at most about 1 ppm, at most about 0.5 ppm, at most about 0.4 ppm, at most about 0.3 ppm, at most about 0.2 ppm, at most about 0.1 ppm, at most about 0.05 ppm, or at most about 0.01 ppm.

Biocidal Activity of the Compositions of the Invention.

In some embodiments, the compositions of the present invention is not toxic to mammals, for example, animals or humans. In some embodiments, the compositions of the exhibits a biocidal activity against a microorganism (e.g., a viral inoculum). The biocidal activity can comprise one or more of: antimicrobial (e.g., kill, reduce or prevent growth of a microorganism), anti-fouling activity (e.g., reduce or prevent adhesion of a microorganism).

The microorganism can comprise a fungus (e.g. mold and/or yeast), a bacterium, and/or a virus particle. Non-limiting examples of a fungus include *Absidia, Acremonium, Agaricus, Anaeromyces, Aspergillus*, Aeurobasidium, Cephalosporum, *Chaetomium, Coprinus, Dactyllum, Fusarium, Gliocladium, Humicola, Mucor, Neurospora, Neocallimastix, Orpinomyces, Penicillium, Phanerochaete, Phlebia, Piromyces, Pseudomonas, Rhizopus, Schizophyllum, Trametes*, and *Zygorhynchus*. Non-limiting examples of a bacteria include gram-positive bacteria (e.g., *Staphylococcus, Micrococcus, Bacillus, Propionibacterium*) and gram-negative bacteria (e.g., *Pseudomonas, Serratia, Burkholderia, Legionella*). Non-limiting examples of a virus include influenza viruses, coronaviruses (e.g., Severe Acute Respiratory Syndrome (SARS-CoV), SARS-CoV-2 (i.e., COVID-19), and Middle East Respiratory Syndrome (MERS-CoV), adenoviruses, rhinoviruses, and Gastroenteritis Virus. In some embodiments, a virus can be alphacoronavirus, betacoronavirus, deltacoronavirus, or gammacoronavirus. In some embodiments, a virus can be an influenza virus. An influenza virus can be Influenza virus A, Influenza virus B, Influenza virus C or Influenza virus D. In some embodiments, the composition of the present invention exhibits a biocidal activity against two or more of: a fungus, a bacterium, and a virus.

In some embodiments, the composition of the present invention exhibits a biocidal activity against one or more species of a microorganism. The composition can exhibit a biocidal activity against at least or up to 1 species, at least or up to 2 species, at least or up to 3 species, at least or up to 4 species, at least or up to 5 species, at least or up to 6 species, at least or up to 7 species, at least or up to 8 species, at least or up to 9 species, at least or up to 10 species, at least or up to 11 species, at least or up to 12 species, at least or up to 13 species, at least or up to 14 species, at least or up to 15 species, at least or up to 16 species, at least or up to 17 species, at least or up to 18 species, at least or up to 19 species, at least or up to 20 species of a microorganism.

In some embodiments, the composition of the present invention exhibits a biocidal activity against one or more genera of a microorganism. The composition can exhibit a biocidal activity against at least or up to 1 genus, at least or up to 2 genera, at least or up to 3 genera, at least or up to 4 genera, at least or up to 5 genera, at least or up to 6 genera, at least or up to 7 genera, at least or up to 8 genera, at least or up to 9 genera, at least or up to 10 genera, at least or up to 11 genera, at least or up to 12 genera, at least or up to 13 genera, at least or up to 14 genera, at least or up to 15 genera, at least or up to 16 genera, at least or up to 17 genera, at least or up to 18 genera, at least or up to 19 genera, at least or up to 20 genera of a microorganism.

In some embodiments, the composition of the present invention exhibits a biocidal activity against one or more families of a microorganism. The composition can exhibit a biocidal activity against at least or up to 1 family, at least or up to 2 families, at least or up to 3 families, at least or up to 4 families, at least or up to 5 families, at least or up to 6 families, at least or up to 7 families, at least or up to 8 families, at least or up to 9 families, at least or up to 10 families, at least or up to 11 families, at least or up to 12 families, at least or up to 13 families, at least or up to 14 families, at least or up to 15 families, at least or up to 16 families, at least or up to 17 families, at least or up to 18 families, at least or up to 19 families, at least or up to 20 families a microorganism.

The composition of the present invention can exhibit a biocidal activity against a microorganism for at least or up to 1 hour, at least or up to 2 hours, at least or up to 4 hours, at least or up to 6 hours, at least or up to 12 hours, at least or up to 18 hours, at least or up to 24 hours, at least or up to 2 days, at least or up to 3 days, at least or up to 4 days, at least or up to 5 days, at least or up to 6 days, at least or up to 7 days, at least or up to 2 weeks, at least or up to 3 weeks, at least or up to 4 weeks, at least or up to 2 months, at least or up to 3 months, at least or up to 4 months, at least or up to 5 months, at least or up to 6 months, at least or up to 7 months, at least or up to 8 months, at least or up to 9 months, at least or up to 10 months, at least or up to 11 months, at least or up to 12 months, at least or up to 2 years, at least or up to 3 years, at least or up to 4 years, at least or up to 5 years, or at least or up to 10 years. In some embodiments, the composition exhibits such biocidal activity without regenerating (or recharging) N-halamine precursor of the composition with an electrophilic halogen source.

Articles of Use.

The composition of the present invention can be used as a material to manufacture an article. In some embodiments, the composition of the present invention is applied to a surface of a manufactured article. Non-limiting examples of the manufactured article that can be coated include porous and non-porous substrates, such as cellulose, synthetic fibers, fabrics, filter materials, latex paint, chitin, chitosan, glass, ceramics, plastics, rubber, cement grout, latex caulk, porcelain, acrylic films, vinyl, polyurethanes, silicon tubing, marble, metal, metal oxides, and silica.

In some embodiments, the composition of the present invention is not applied as a coating to a manufactured article. Instead, the composition of the present invention is used as part of a starting material to manufacture (e.g., molding) the article. In an example, a sample of N-halamine-forming polymers of the present invention can be combined with an additional material (e.g., a filler polymer), and a resulting mixture can be used to manufacture the article. The manufactured article can comprise a mixture of the N-halamine-forming polymers and the additional material in one or more phases, as disclosed herein. A plurality of N-halamine precursors (or the N-halamine derivatives thereof) can be presented in all or a portion of a surface of the manufactured article. The surface can be an outer surface of the manufactured article. Alternatively or in addition to, the surface can be an inner surface of the manufactured article (e.g., a porous article).

The article can be for the home, stores, transportation units, or institutions. Non-limiting examples of the transportation units include bicycles, scooters, bikes, cars, buses, trains, airplanes, spaceships, boats, ships, submarines, and bridges. Non-limiting examples of the institutions include a school, a laboratory, a hospital, a pharmacy, and a factory (e.g., food processing plant, food storage facility, air filtration factory, water filtration factory, furniture factory, etc.).

Non-limiting examples of the article comprising the composition of the present invention include a medical device, a bed rail, a door handle, a button, a mobile device, a computer, a keyboard, a mouse, wipes, a conveyor belt, a container, a plastic packaging, automobile industry plastics, screen protection films for electronic displays (e.g., a light emitting diode panel or a liquid crystal display panel), a toothbrush, a hairbrush, a broom, a vacuum cleaner, a shower curtain, a tile, cutting boards, exercise equipment, a personal protective equipment (PPE) (e.g., gloves, hair nets, helmets, gowns, boots, or glasses), a pipe, a rotor (e.g., a rotor of a boat), a chair, a sofa, and a fabric.

Preparation of the Compositions of the Invention.

The polymers (e.g., homopolymers, copolymers) of the present invention can be prepared by subjecting a reaction mixture comprising monomers and/or oligomers to polymerization, for example, free radical polymerization. Examples of free radical polymerization include bulk polymerization (e.g., without a solvent), solution polymerization (e.g., with a solvent), suspension polymerization, emulsion polymerization, and photopolymerization. In some embodiments, controlled free radical polymerization (e.g., radical addition-fragmentation chain transfer (RAFT) polymerization) is used to synthesize a polymer disclosed herein, for example, an N-halamine polymer.

A repeating unit of the polymers of the present invention can comprise or be derived from a species of monomer. In an example, a monomer of a species of monomer comprises an N-halamine precursor (or the N-halamine derivative thereof). In another example, a monomer of a species of monomer comprises any of the at least one functional moiety as disclosed herein (e.g., a non-fouling moiety). In a different example, a monomer of a species of monomer does not comprise (i) the N-halamine precursor nor the N-halamine derivative thereof and (ii) the at least one functional moiety. The monomer can comprise at least one coupling site, and an N-halamine precursor or the N-halamine derivative thereof can be coupled to the coupling site (e.g., via site specific conjugation) following polymerization of the species of monomer into one or more polymers.

The polymers of the present invention can be derived from at least one species of monomer. The polymers of the present invention can be derived from at least or up to 1 species monomer, at least or up to 2 different species of monomer, at least or up to 3 different species of monomer, at least or up to 4 different species of monomer, at least or up to 5 different species of monomer, at least or up to 6 different species of monomer, at least or up to 7 different species of monomer, at least or up to 8 different species of monomer, at least or up to 9 different species of monomer, or at least or up to 10 different species of monomer.

Non-limiting examples of monomers usable for the polymerization of the present invention include acrylonitrile, styrene, acrylamide, methyl-methacrylate, ethylene, propylene, butylenes, butadienes, other alkenes and dienes, and derivatives thereof (e.g., derivatives comprising any number of N-halamine precursors and/or N-halamines). Additional non-limiting examples of the monomers include (i) polar acrylate or acrylic monomers, such as those having nitrile functional groups including methacrylonitrile, 2-cyanoethylacrylate, and 2-cyanoethylmethacrylate, (ii) nonpolar acrylate monomers, such as methyl acrylate, ethyl acrylate, ethyl methacrylate, n-propyl acrylate, propyl methacrylate, n-butyl acrylate, n-butyl methacrylate, isobutyl acrylate, isobutyl methacrylate, t-butyl acrylate, pentyl acrylate, hexyl acrylate, cyclohexyl acrylate, and n-octyl acrylate, (iii) aldehydic monomers, such as acrolein and methacrolein, (iv) hydroxy-containing monomers, such as 2-hydroxyethyl acrylate (HEA), 2-hydroxyethyl methacrylate (HEMA), 2-hydroxypropylacrylate, and 2-hydroxypropylmethacrylate, (v) anhydride monomers, such as maleic anhydride and itaconic anhydride, (vi) aromatic monomers, such as alpha-methylstyrene, phenyl acrylate, phenyl methacrylate, benzyl acrylate, and benzyl methacrylate, and (vii) derivatives and/or combinations thereof.

In some embodiments, a repeating unit of the polymers can be derived from an acrylamide monomer. Non-limiting examples of an acrylamide monomer include acrylamide and substituted acrylamides, such as methacrylamide, ethylacrylamide, crotonamide, N-methyl acrylamide, N-butyl acrylamide, and N-ethyl methacrylamide.

In some embodiments, a repeating unit of the polymer of the present invention can form at least one N-halamine and has the structure:

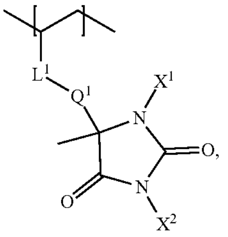

wherein: $L^1$ is an amide, ester, or arylene group; $Q^1$ is alkylene or absent; $X^1$ is H or halogen; and $X^2$ is H or halogen. In some embodiments, $Q^1$ is methylene, ethylene, propylene, or butylene. In some embodiments, $Q^1$ is methylene. In some embodiments, $Q^1$ is ethylene. In some embodiments, $Q^1$ is propylene. In some embodiments, $Q^1$ is butylene. In some embodiments, $Q^1$ is 1,1-dimethylethylene.

In some examples, the repeating unit of the polymer of the present invention has the structure:

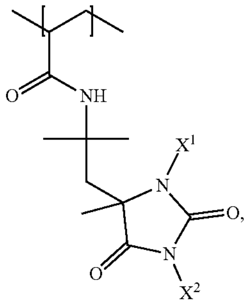

wherein: $X^1$ is H or halogen; and $X^2$ is H or halogen. In some embodiments, $X^1$ is H and $X^2$ is H. In some embodiments, $X^1$ is Cl and $X^2$ is Cl. In some embodiments, one of $X^1$ and $X^2$ is Cl and one of $X^1$ and $X^2$ is H.

In some embodiments, a repeating unit of the polymer of the present invention can comprise a zwitterion. The repeating unit can be derived from at least one species of monomer, and a monomer of the at least one species of monomer can comprise a zwitterion. Non-limiting examples of such zwitterionic monomers include an acrylamide derivative (e.g., a methacrylamide derivative) that comprises phosphorylcholine, carboxylbetaine, or sulfobetaine.

In some embodiments, a repeating unit of the polymer of the present invention can comprise a zwitterion and has the structure:

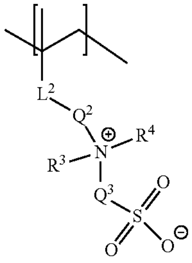

or

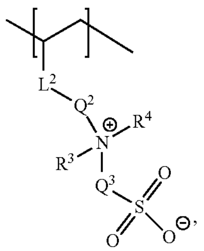

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl. In some embodiments, $Q^2$ is absent. In some embodiments, $Q^2$ is methylene, ethylene, propylene, or butylene. In some embodiments, $Q^2$ is methylene. In some embodiments, $Q^2$ is ethylene. In some embodiments, $Q^2$ is propylene. In some embodiments, $Q^2$ is butylene. In some embodiments, $Q^3$ is methylene, ethylene, propylene, or butylene. In some embodiments, $Q^3$ is methylene. In some embodiments, $Q^3$ is ethylene. In some embodiments, $Q^3$ is propylene. In some embodiments, $Q^3$ is butylene.

In some examples, the repeating unit of the polymer of the present invention has the structure:

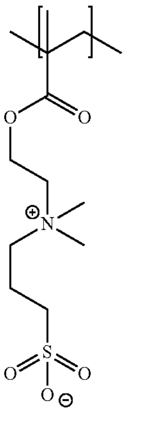

or

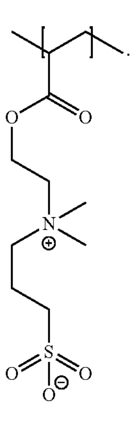.

In some embodiments, a repeating unit of the polymer of the present invention can comprise polymer, for example, a poly(alkylene glycol) moiety. The repeating unit can be derived from at least one species of monomer, and a monomer of the at least one species of monomer can comprise a poly(alkylene glycol) moiety. Non-limiting examples of such monomers include an acrylamide derivative (e.g., a methacrylamide derivative) that comprises a polyethylene glycol moiety or a polypropylene glycol moiety.

In some embodiments, a repeating unit of the polymer of the present invention can comprise a polyethylene glycol moiety and has the structure:

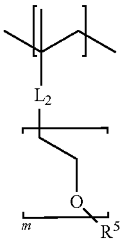

or

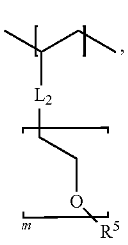, wherein: $L^2$ is an amide or ester group; $R^5$ is hydrogen or alkyl; and m is 1 to 500. In some embodiments, $R^5$ is methyl, ethyl, propyl, or isopropyl. In some embodiments, $R^5$ is methyl. In some embodiments, $R^5$ is ethyl.

In an example, the repeating unit of the polymer of the present disclosure has the structure:

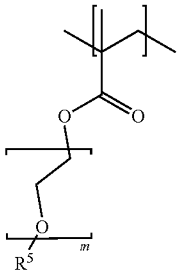

or

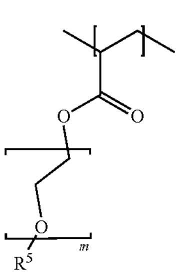, wherein: $R^5$ is hydrogen or alkyl; and m is 1 to 500. In some embodiments, $R^5$ is methyl, ethyl, propyl, or isopropyl. In some embodiments, $R^5$ is methyl. In some embodiments, $R^5$ is ethyl.

In the reaction mixture for polymerization, at least one species of monomer can be present in an amount of at least or up to about 0.1%, at least or up to about 0.2%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 1.5%, at least or up to about 2%, at least or up to about 2.5%, at least or up to about 3%, at least or up to about 3.5%, at least or up to about 4%, at least or up to about 4.5%, at least or up to about 5%, at least or up to about 5.5%, at least or up to about 6%, at least or up to about 6.5%, at least or up to about 7%, at least or up to about 7.5%, at least or up to about 8%, at least or up to about 8.5%, at least or up to about 9%, at least or up to about 9.5% at least or up to about 10%, at least or up to about 15%, at least or up to about 20%, at least or up to about 25%, at least or up to about 30%, at least or up to about 35%, at least or up to about 40%, at least or up to about 45%, at least or up to about 50%, at least or up to about 55%, at least or up to about 60%, at least or up to about 65%, at least or up to about 70%, at least or up to about 75%, at least or up to about 80%, at least or up to about 85%, at least or up to about 90%, or at least or up to about 95% by weight of the reaction mixture.

In the reaction mixture for polymerization, at least one species of monomer can be present in an amount of at least or up to about 0.1 millimoles (mmol), at least or up to about 0.2 mmol, at least or up to about 0.3 mmol, at least or up to about 0.4 mmol, at least or up to about 0.5 mmol, at least or up to about 0.6 mmol, at least or up to about 0.7 mmol, at least or up to about 0.8 mmol, at least or up to about 0.9 mmol, at least or up to about 1 mmol, at least or up to about 2 mmol, at least or up to about 3 mmol, at least or up to about 4 mmol, at least or up to about 5 mmol, at least or up to about 6 mmol, at least or up to about 7 mmol, at least or up to about 8 mmol, at least or up to about 9 mmol, at least or up to about 10 mmol, at least or up to about 20 mmol, at least or up to about 30 mmol, at least or up to about 40 mmol, at least or up to about 50 mmol, at least or up to about 60 mmol, at least or up to about 70 mmol, at least or up to about 80 mmol, at least or up to about 90 mmol, at least or up to about 100 mmol, at least or up to about 200 mmol, at least or up to about 300 mmol, at least or up to about 400 mmol, at least or up to about 500 mmol, at least or up to about 600 mmol, at least or up to about 700 mmol, at least or up to about 800 mmol, at least or up to about 900 mmol, or at least or up to about 1,000 mmol.

In the reaction mixture for polymerization, at least one species of monomer can be present in a solvent in an amount of at least or up to about 0.01 millimoles/liter (mmol/L), at least or up to about 0.02 mmol/L, at least or up to about 0.03 mmol/L, at least or up to about 0.04 mmol/L, at least or up to about 0.05 mmol/L, at least or up to about 0.06 mmol/L, at least or up to about 0.07 mmol/L, at least or up to about 0.08 mmol/L, at least or up to about 0.09 mmol/L, at least or up to about 0.1 mmol/L, at least or up to about 0.2 mmol/L, at least or up to about 0.3 mmol/L, at least or up to about 0.4 mmol/L, at least or up to about 0.5 mmol/L, at least or up to about 0.6 mmol/L, at least or up to about 0.7 mmol/L, at least or up to about 0.8 mmol/L, at least or up to about 0.9 mmol/L, at least or up to about 1 mmol/L, at least or up to about 2 mmol/L, at least or up to about 3 mmol/L, at least or up to about 4 mmol/L, at least or up to about 5 mmol/L, at least or up to about 6 mmol/L, at least or up to about 7 mmol/L, at least or up to about 8 mmol/L, at least or up to about 9 mmol/L, at least or up to about 10 mmol/L, at least or up to about 20 mmol/L, at least or up to about 30 mmol/L, at least or up to about 40 mmol/L, at least or up to about 50 mmol/L, at least or up to about 60 mmol/L, at least or up to about 70 mmol/L, at least or up to about 80 mmol/L, at least or up to about 90 mmol/L, or at least or up to about 100 mmol/L.

In some embodiments, a reaction mixture for the polymerization of any of the species of monomer comprises an initiator, such as a free radical initiator. Non-limiting examples of a free radical initiator include 2,2'-azobis(2-methylpropionitrile), benzoyl peroxide, 1,1'-azobis(cyclohexanecarbonitrile) (ABCN), t-butylperoxide, dicumylperoxide, potassium persulfate, aralkyl halides, aryl halides, 2,2-Dimethoxy-2-phenylacetophenone, (2,4,6-trimethylbenzoyl)-diphenylphosphine oxide, azobisisobutyronitrile (AIBN), 4,4'-Azobis(4-cyanovaleric acid) (ACVA), gamma radiation initiator, Lewis acids (e.g., scandium(III) triflate or yttrium (III) triflate), modifications thereof, and combinations thereof.

In the reaction mixture for polymerization, at least one initiator can be present in an amount of at least or up to about 0.1%, at least or up to about 0.2%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 1.5%, at least or up to about 2%, at least or up to about 2.5%, at least or up to about 3%, at least or up to about 3.5%, at least or up to about 4%, at least or up to about 4.5%, at least or up to about 5%, at least or up to about 5.5%, at least or up to about 6%, at least or up to about 6.5%, at least or up to about 7%, at least or up to about 7.5%, at least or up to about 8% at least or up to about 8.5%, at least or up to about 9%, at least or up to about 9.5%, or at least or up to about 10% by weight of the reaction mixture.

The reaction mixture for polymerization can comprise a solvent. Non-limiting examples of the solvent can include methanol, ethanol, methylene chloride, toluene, dioxane, tetrahydrofuran, chloroform, cyclohexane, dimethyl sulfoxide, dimethyl formamide, acetone, acetonitrile, n-butanol, n-pentanol, chlorobenzene, diethyl ether, tert-butanol, 1,2,-dichloroethylene, diisopropyl ether, ethanol, ethylacetate, ethylmethylketone, heptane, hexane, isopropylalcohol, isoamyl alcohol, methanol, pentane, n-propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, glycerol, and combinations thereof. In some embodiments, the solvent is water.

In some embodiments, the solvent does not comprise an aqueous solvent. In some embodiments, the solvent is an organic solvent. In some embodiments, the solvent is methanol. In some embodiments, the solvent is an organic solvent. In some embodiments, the solvent is ethanol.

In some embodiments, the solvent comprises a mixture of an organic solvent and an aqueous solvent. In some embodiments, the solvent comprises water and methanol. In some embodiments, the solvent comprises water and ethanol.

In some embodiments, the solvent can comprise the organic solvent (OS) and the aqueous solvent (AS) in a volume-to-volume ratio (OS:AS) of at least or up to about 30:1, at least or up to about 29:1, at least or up to about 28:1, at least or up to about 27:1, at least or up to about 26:1, at least or up to about 25:1, at least or up to about 24:1, at least or up to about 23:1, at least or up to about 22:1, at least or up to about 21:1, at least or up to about 20:1, at least or up to about 19:1, at least or up to about 18:1, at least or up to about 17:1, at least or up to about 16:1, at least or up to about 15:1, at least or up to about 14:1, at least or up to about 13:1, at least or up to about 12:1, at least or up to about 11:1, at least or up to about 10:1, at least or up to about 9:1, at least or up to about 8:1, at least or up to about 7:1, at least or up to about 6:1, at least or up to about 5:1, at least or up to about 4:1, at least or up to about 3:1, at least or up to about 2:1, at least or up to about 1:1, at least or up to about 1:2, at least or up to about 1:3, at least or up to about 1:4, at least or up to about 1:5, at least or up to about 1:6, at least or up to about 1:7, at least or up to about 1:8, at least or up to about 1:9, at least or up to about 1:10, at least or up to about 1:11, at least or up to about 1:12, at least or up to about 1:13, at least or up to about 1:14, at least or up to about 1:15, at least or up to about 1:16, at least or up to about 1:17, at least or up to about 1:18, at least or up to about 1:19, at least or up to about 1:20, at least or up to about 1:21, at least or up to about 1:22, at least or up to about 1:23, at least or up to about 1:24, at least or up to about 1:25, at least or up to about 1:26, at least or up to about 1:27, at least or up to about 1:28, at least or up to about 1:29, or at least or up to about 1:30.

In some examples, the solvent comprises a mixture of methanol and water. The solvent can comprise methanol (MeOH) and water ($H_2O$) in a volume-to-volume ratio (MeOH:$H_2O$) of at least or up to about 15:1, at least or up to about 14:1, at least or up to about 13:1, at least or up to about 12:1, at least or up to about 11:1, at least or up to about 10:1, at least or up to about 9:1, at least or up to about 8:1, at least or up to about 7:1, at least or up to about 6:1, at least or up to about 5:1, at least or up to about 4:1, at least or up to about 3:1, at least or up to about 2:1, or at least or up to about 1:1. In some embodiments, the volume-to-volume ratio of MeOH:$H_2O$ is about 9:1. In some embodiments, the volume-to-volume ratio of MeOH:$H_2O$ is about 8:2. In some embodiments, the volume-to-volume ratio of MeOH:$H_2O$ is about 7:3. In some embodiments, the volume-to-volume ratio of MeOH:$H_2O$ is about 6:4.

In some examples, the solvent comprises a mixture of ethanol and water. The solvent can comprise ethanol (EtOH) and water ($H_2O$) in a volume-to-volume ratio (EtOH:$H_2O$) of at least or up to about 15:1, at least or up to about 14:1, at least or up to about 13:1, at least or up to about 12:1, at least or up to about 11:1, at least or up to about 10:1, at least or up to about 9:1, at least or up to about 8:1, at least or up to about 7:1, at least or up to about 6:1, at least or up to about 5:1, at least or up to about 4:1, at least or up to about 3:1, at least or up to about 2:1, or at least or up to about 1:1. In some embodiments, the volume-to-volume ratio of EtOH:$H_2O$ is about 9:1. In some embodiments, the volume-to-volume ratio of EtOH:$H_2O$ is about 8:2. In some embodiments, the volume-to-volume ratio of EtOH:$H_2O$ is about 7:3. In some embodiments, the volume-to-volume ratio of EtOH:$H_2O$ is about 6:4.

Polymerization of the at least one species of monomer into one or more polymers can be performed in a temperature of at least or up to about 30° C., at least or up to about 35° C., at least or up to about 40° C., at least or up to about 45° C., 50° C., at least or up to about 55° C., at least or up to about 60° C., at least or up to about 65° C., at least or up to about 70° C., at least or up to about 75° C., at least or up to about 80° C., at least or up to about 85° C., at least or up to about 90° C., at least or up to about 95° C., at least or up to about 100° C., at least or up to about 105° C., at least or up to about 110° C., at least or up to about 115° C., or at least or up to about 120° C.

Polymerization of the at least one species of monomer into one or more polymers can be performed in a temperature of about 40° C. to about 50° C., about 40° C. to about 60° C., about 40° C. to about 70° C., about 40° C. to about 80° C., about 40° C. to about 90° C., about 40° C. to about 100° C., about 40° C. to about 110° C., about 40° C. to about 120° C., about 40° C. to about 130° C., about 40° C. to about 140° C., about 50° C. to about 60° C., about 50° C. to about 70° C., about 50° C. to about 80° C., about 50° C. to about 90° C., about 50° C. to about 100° C., about 50° C. to about 110° C., about 50° C. to about 120° C., about 50° C. to about 130° C., about 50° C. to about 140° C., about 60° C. to about 70° C., about 60° C. to about 80° C., about 60° C. to about 90° C., about 60° C. to about 100° C., about 60° C. to about 110° C., about 60° C. to about 120° C., about 60° C. to about 130° C., about 60° C. to about 140° C., about 70° C. to about 80° C., about 70° C. to about 90° C., about 70° C. to about 100° C., about 70° C. to about 110° C., about 70° C. to about 120° C., about 70° C. to about 130° C., about 70° C. to about 140° C., about 80° C. to about 90° C., about 80° C. to about 100° C., about 80° C. to about 110° C., about 80° C. to about 120° C., about 80° C. to about 130° C., about 80° C. to about 140° C., about 90° C. to about 100° C., about 90° C. to about 110° C., about 90° C. to about 120° C., about 90° C. to about 130° C., about 90° C. to about 140° C., about 100° C. to about 110° C., about 100° C. to about 120° C., about 100° C. to about 130° C., about 100° C. to about 140° C., about 110° C. to about 120° C., about 110° C. to about 130° C., about 110° C. to about 140° C., about 120° C. to about 130° C., about 120° C. to about 140° C., or about 130° C. to about 140° C.

At least one species of monomer can be subjected to polymerization (e.g., in a reaction mixture comprising an initiator) for at least or up to 5 minutes, at least or up to 10 minutes, at least or up to 20 minutes, at least or up to 30 minutes, at least or up to 40 minutes, at least or up to 50 minutes, at least or up to 60 minutes, at least or up to 1.5 hours, at least or up to 2 hours, at least or up to 2.5 hours, at least or up to 3 hours, at least or up to 3.5 hours, at least or up to 4 hours, at least or up to 4.5 hours, at least or up to 5 hours, at least or up to 5.5 hours, at least or up to 6 hours, at least or up to 6.5 hours, at least or up to 7 hours, at least or up to 7.5 hours, at least or up to 8 hours, at least or up to 8.5 hours, at least or up to 9 hours, at least or up to 9.5 hours, at least or up to 10 hours, or at least or up to 24 hours.

Any N-halamine precursor-comprising polymer herein can be exposed to an electrophilic halogen source to form any number of N-halamines. For chlorination, non-limiting examples of the electrophilic halogen source include gaseous chlorine, calcium hypochlorite, N-chlorosuccinimide, sodium hypochlorite, sodium dichloroisocyanurate, trichloroisocyanuric acid, tertiary butyl hypochlorite, N-chloroacetamide, and chloramines. For bromination, non-limiting examples of the electrophilic halogen source include molecular bromine liquid, sodium bromide in the presence of an oxidizer, and brominated hydantoins.

Any polymer herein can be combined with an additional polymer (e.g., a filler polymer, such as a thermoplastic or a thermoset) to form a polymeric composition. The polymeric composition can exhibit a biocidal activity to one or more microorganisms. In some embodiments, the polymeric composition is used to manufacture an article of use, as disclosed herein.

In some embodiments, a mixture comprising (i) a first polymer comprising any number of N-halamine precursors (or the N-halamine derivatives thereof) and (ii) a second polymer that does not comprise a side chain comprising a hydantoin group is used to manufacture a polymeric composition and/or an article of use. A method of manufacturing the polymeric composition can comprise contacting the first polymer and the second polymer, for example, combining the first polymer and the second polymer in the same mixture. The method can further comprise softening a portion of the first polymer and a portion of the second polymer by application of a stress source. In some embodiments, the application of the stress source form at least one phase that is characterized by having a homogeneous structure comprising both the portion of the first polymer and the portion of the second polymer.

In some embodiments, a mixture of the first polymer and the second polymer can be subjected to iterations of exposure to the stress source. An initial object formed by subjecting the mixture to an exposure to a stress source can be subjected to one or more additional exposures to the same stress source and/or one or more different stress sources to form a different object. The initial object and the different object can have the same shape. The initial object and the different object can have different shapes. The one or more additional exposures can be at least or up to about 1 additional exposure, at least or up to about 2 additional exposures, at least or up to about 2 additional exposures, at least or up to about 3 additional exposures, at least or up to about 4 additional exposures, or at least or up to about 5 additional exposures, at least or up to about 10 additional exposures.

The stress sources can comprise a heat source, for example, a heat gun, an oven, or a temperature controlled mixture vessel. The heat source can subject the portion of the first polymer (or all of the first polymer) and the portion of the second polymer (or all of the second polymer) to a temperature of at least or up to 80° C., at least or up to 85° C., at least or up to 90° C., at least or up to 95° C., at least or up to 100° C., at least or up to 105° C., at least or up to 110° C., at least or up to 115° C., at least or up to 120° C., at least or up to 125° C., at least or up to 130° C., at least or up to 135° C., at least or up to 140° C., at least or up to 145° C., at least or up to 150° C., at least or up to 155° C., at least or up to 160° C., at least or up to 165° C., at least or up to 170° C., at least or up to 175° C., at least or up to 180° C., at least or up to 185° C., at least or up to 190° C., at least or up to 195° C., at least or up to 200° C., at least or up to 205° C., at least or up to 210° C., at least or up to 215° C., at least or up to 220° C., at least or up to 225° C., at least or up to 230° C., at least or up to 235° C., at least or up to 240° C., at least or up to 245° C., or at least or up to 250° C.

In some embodiments, the heat source can subject the portion of the first polymer (or all of the first polymer) and the portion of the second polymer (or all of the second polymer) to a temperature of about 130° C. to about 140° C., about 130° C. to about 150° C., about 130° C. to about 160° C., about 130° C. to about 170° C., about 130° C. to about 180° C., about 130° C. to about 190° C., about 130° C. to about 200° C., about 130° C. to about 210° C., about 130° C. to about 220° C., about 130° C. to about 230° C., about 140° C. to about 150° C., about 140° C. to about 160° C., about 140° C. to about 170° C., about 140° C. to about 180° C., about 140° C. to about 190° C., about 140° C. to about 200° C., about 140° C. to about 210° C., about 140° C. to about 220° C., about 140° C. to about 230° C., about 150° C. to about 160° C., about 150° C. to about 170° C., about 150° C. to about 180° C., about 150° C. to about 190° C., about 150° C. to about 200° C., about 150° C. to about 210° C., about 150° C. to about 220° C., about 150° C. to about 230° C., about 160° C. to about 170° C., about 160° C. to about 180° C., about 160° C. to about 190° C., about 160° C. to about 200° C., about 160° C. to about 210° C., about 160° C. to about 220° C., about 160° C. to about 230° C., about 170° C. to about 180° C., about 170° C. to about 190° C., about 170° C. to about 200° C., about 170° C. to about 210° C., about 170° C. to about 220° C., about 170° C. to about 230° C., about 180° C. to about 190° C., about 180° C. to about 200° C., about 180° C. to about 210° C., about 180° C. to about 220° C., about 180° C. to about 230° C., about 190° C. to about 200° C., about 190° C. to about 210° C., about 190° C. to about 220° C., about 190° C. to about 230° C., about 200° C. to about 210° C., about 200° C. to about 220° C., about 200° C. to about 230° C., about 210° C. to about 220° C., about 210° C. to about 230° C., or about 220° C. to about 230° C.

The stress sources can comprise a pressure source, for example, a heat gun, an oven, or a temperature controlled mixture vessel. The heat source can subject the portion of the first polymer (or all of the first polymer) and the portion of the second polymer (or all of the second polymer) to a pressure of at least or up to 500 pounds per square inch (psi), at least or up to about 1,000 psi, at least or up to about 1,500 psi, 2,000 psi, at least or up to about 3,000 psi, at least or up to about 4,000 psi, at least or up to about 5,000 psi, at least or up to about 6,000 psi, at least or up to about 7,000 psi, at least or up to about 8,000 psi, at least or up to about 9,000 psi, at least or up to about 10,000 psi, at least or up to about 11,000 psi, at least or up to about 12,000 psi, at least or up to about 13,000 psi, at least or up to about 14,000 psi, at least or up to about 15,000 psi, at least or up to about 16,000 psi, at least or up to about 17,000 psi, at least or up to about 18,000 psi, at least or up to about 19,000 psi, at least or up to about 20,000 psi, at least or up to about 21,000 psi, at least or up to about 22,000 psi, at least or up to about 23,000 psi, at least or up to about 24,000 psi, at least or up to about 25,000 psi, at least or up to about 26,000 psi, at least or up to about 27,000 psi, at least or up to about 28,000 psi, at least or up to about 29,000 psi, or at least or up to about 30,000 psi.

The stress source can be applied to the first polymer and the second polymer for at least or up to 5 minutes, at least or up to 10 minutes, at least or up to 20 minutes, at least or up to 30 minutes, at least or up to 40 minutes, at least or up to 50 minutes, at least or up to 60 minutes, at least or up to 1.5 hours, at least or up to 2 hours, at least or up to 2.5 hours, at least or up to 3 hours, at least or up to 3.5 hours, at least or up to 4 hours, at least or up to 4.5 hours, at least or up to 5 hours, at least or up to 5.5 hours, at least or up to 6 hours, at least or up to 6.5 hours, at least or up to 7 hours, at least or up to 7.5 hours, at least or up to 8 hours, at least or up to 8.5 hours, at least or up to 9 hours, at least or up to 9.5 hours, at least or up to 10 hours, or at least or up to 24 hours.

Application of the stress source can decrease a stiffness (e.g., as determined by a tensile test) of the portion of the first polymer and/or the portion of the second polymer by at least or up to about 0.1%, at least or up to about 0.2%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 1.5%, at least or up to about 2%, at least or up to about 2.5%, at least or up to about 3%, at least or up to about 3.5%, at least or up to about 4%, at least or up to about 4.5%, at least or up to about 5%, at least or up to about 5.5%, at least or up to about 6%, at least or up to about 6.5%, at least or up to about 7%, at least or up to about 7.5%, at least or up to about 8%, at least or up to about 8.5% at least or up to about 9%, at least or up to about 9.5%, at least or up to about 10%, at least or up to about 15%, at least or up to about 20%, at least or up to about 25%, at least or up to about 30%, at least or up to about 35%, at least or up to about 40%, at least or up to about 45%, at least or up to about 50%, at least or up to about 55%, at least or up to about 60%, at least or up to about 65%, at least or up to about 70%, at least or up to about 75%, at least or up to about 80%, at least or up to about 85%, or at least or up to about 90% as compared to that without the stress source.

Application of the stress source can decrease a viscosity (e.g., as measured by a rheometer) of the portion of the first polymer and/or the portion of the second polymer by at least or up to about 0.1%, at least or up to about 0.2%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 1.5%, at least or up to about 2%, at least or up to about 2.5%, at least or up to about 3%, at least or up to about 3.5%, at least or up to about 4%, at least or up to about 4.5%, at least or up to about 5%, at least or up to about 5.5%, at least or up to about 6%, at least or up to about 6.5% at least or up to about 7%, at least or up to about 7.5%, at least or up to about 8%, at least or up to about 8.5%, at least or up to about 9%, at least or up to about 9.5%, at least or up to about 10%, at least or up to about 15%, at least or up to about 20%, at least or up to about 25%, at least or up to about 30%, at least or up to about 35%, at least or up to about 40%, at least or up to about 45%, at least or up to about 50%, at least or up to about 55%, at least or up to about 60%, at least or up to about 65%, at least or up to about 70%, at least or up to about 75%, at least or up to about 80%, at least or up to about 85%, or at least or up to about 90% as compared to that without the stress source.

Application of the stress source can decrease a hardness (e.g., as measured by an indentation hardness test) of the portion of the first polymer and/or the portion of the second polymer by at least or up to about 0.1%, at least or up to about 0.2%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 1.5%, at least or up to about 2%, at least or up to about 2.5%, at least or up to about 3%, at least or up to about 3.5%, at least or up to about 4%, at least or up to about 4.5%, at least or up to about 5%, at least or up to about 5.5%, at least or up to about 6%, at least or up to about 6.5%, at least or up to about 7%, at least or up to about 7.5%, at least or up to about 8% at least or up to about 8.5%, at least or up to about 9%, at least or up to about 9.5%, at least or up to about 10%, at least or up to about 15%, at least or up to about 20%, at least or up to about 25%, at least or up to about 30%, at least or up to about 35%, at least or up to about 40%, at least or up to about 45%, at least or up to about 50%, at least or up to about 55%, at least or up to about 60%, at least or up to about 65%, at least or up to about 70%, at least or up to about 75%, at least or up to about 80%, at least or up to about 85%, or at least or up to about 90% as compared to that without the stress source.

Application of the stress sources can soften at least or up to about 0.1%, at least or up to about 0.2%, at least or up to about 0.4%, at least or up to about 0.5%, at least or up to about 0.6%, at least or up to about 0.7%, at least or up to about 0.8%, at least or up to about 0.9%, at least or up to about 1%, at least or up to about 1.5%, at least or up to about 2%, at least or up to about 2.5%, at least or up to about 3%, at least or up to about 3.5%, at least or up to about 4%, at least or up to about 4.5%, at least or up to about 5%, at least or up to about 5.5%, at least or up to about 6%, at least or up to about 6.5%, at least or up to about 7%, at least or up to about 7.5%, at least or up to about 8%, at least or up to about 8.5%, at least or up to about 9%, at least or up to about 9.5%, at least or up to about 10%, at least or up to about 15%, at least or up to about 20%, at least or up to about 25%, at least or up to about 30%, at least or up to about 35%, at least or up to about 40%, at least or up to about 45%, at least or up to about 50%, at least or up to about 55%, at least or up to about 60%, at least or up to about 65%, at least or up to about 70%, at least or up to about 75%, at least or up to about 80%, at least or up to about 85%, or at least or up to about 90% of the first polymer and/or the second polymer. In an example, application of the stress source can soften all of the first polymer and/or all of the second polymer.

In some embodiments, application of the stress source can melt the portion of the first polymer, but not the portion of the second polymer. In some embodiments, application of the stress source can melt the portion of the first polymer and the portion of the second polymer. In some examples, a first melting temperature of the first polymer and a second melting temperature of the second polymer differ by no more than about 50° C., no more than about 45° C., no more than about 40° C., no more than about 35° C., no more than about 30° C., no more than about 29° C., no more than about 28° C., no more than about 27° C., no more than about 26° C., no more than about 25° C., no more than about 24° C., no more than about 23° C., no more than about 22° C., no more than about 21° C., no more than about 20° C., no more than about 19° C., no more than about 18° C., no more than about 17° C., no more than about 16° C., no more than about 15° C., no more than about 14° C., no more than about 13° C., no more than about 12° C., no more than about 11° C., no more than about 10° C., no more than about 9° C., no more than about 8° C., no more than about 7° C., no more than about 6° C., no more than about 5° C., no more than about 4° C., no more than about 3° C., no more than about 2° C., or no more than about 1° C.

In some embodiments, the portion of the first polymer (or all of the first polymer) and the portion of the second polymer (or all of the second polymer) can be mixed (e.g., via mechanical mixing) either simultaneously, concurrently, or sequentially with the application of the stress source. The portion of the first polymer and the portion of the second polymer can be mixed for at least or up to 5 minutes, at least or up to 10 minutes, at least or up to 20 minutes, at least or up to 30 minutes, at least or up to 40 minutes, at least or up to 50 minutes, at least or up to 60 minutes, at least or up to 1.5 hours, at least or up to 2 hours, at least or up to 2.5 hours, at least or up to 3 hours, at least or up to 3.5 hours, at least or up to 4 hours, at least or up to 4.5 hours, at least or up to 5 hours, at least or up to 5.5 hours, at least or up to 6 hours, at least or up to 6.5 hours, at least or up to 7 hours, at least or up to 7.5 hours, at least or up to 8 hours, at least or up to 8.5 hours, at least or up to 9 hours, at least or up to 9.5 hours, at least or up to 10 hours, or at least or up to 24 hours.

In some embodiments, the portion of the first polymer (or all of the first polymer) and the portion of the second polymer (or all of the second polymer) can be mixed, e.g., in a container (e.g., a barrel). The container can comprise a blending unit (e.g., one or more blades, a single-screw extruder, a twin-screw extruder) configured to subject at least the portion of the first polymer and the portion of the second polymer to rotation about an axis (e.g., a vertical axis) within the container. The portion of the first polymer and the portion of the second polymer to rotation about an axis within the container at a rotational speed of at least or up to about 10 rotations per minute (rpm), at least or up to about 20 rpm, at least or up to about 30 rpm, at least or up to about 40 rpm, at least or up to about 50 rpm, at least or up to about 60 rpm, at least or up to about 70 rpm, at least or up to about 80 rpm, at least or up to about 90 rpm, at least or up to about 100 rpm, at least or up to about 110 rpm, at least or up to about 120 rpm, at least or up to about 130 rpm, at least or up to about 140 rpm, at least or up to about 150 rpm, at least or up to about 160 rpm, at least or up to about 170 rpm, at least or up to about 180 rpm, at least or up to about 190 rpm, at least or up to about 200 rpm, at least or up to about 250 rpm, at least or up to about 300 rpm, at least or up to about 350 rpm, at least or up to about 400 rpm, at least or up to about 450 rpm, or at least or up to about 500 rpm. The portion of the first polymer and the portion of the second polymer to rotation about an axis within the container at a constant rotational speed or at varied rotational speeds (e.g., increasing, decreasing, or a combination of both).

In some embodiments, the portion of the first polymer (or all of the first polymer) and the portion of the second polymer (or all of the second polymer) can be molded into a shape, either simultaneously, concurrently, or sequentially with the application of the stress source. In some embodiments, the portion of the first polymer (or all of the first polymer) and the portion of the second polymer (or all of the second polymer) can be molded into a shape, either simultaneously, concurrently, or sequentially with the mixing. In some examples, the shape may be a portion of an article of use, as disclosed herein. Non-limiting examples of the shape include sheet, fiber, sphere, cuboid, or disc, or any partial shape or combination of shapes thereof. The shape can have a cross-section that is circular, triangular, square, rectangular, pentagonal, hexagonal, or any partial shape or combination of shapes thereof. Non-limiting examples of the molding process for the polymers include injection molding, transfer molding, reaction injection molding, liquid injection molding, casting, and compression molding.

EXAMPLES

Example 1: Preparation of a Copolymer of N-Halamine (HA) and a Poly(Ethylene Glycol) Moiety (PEG) (i.e., p(HA-Co-PEG))

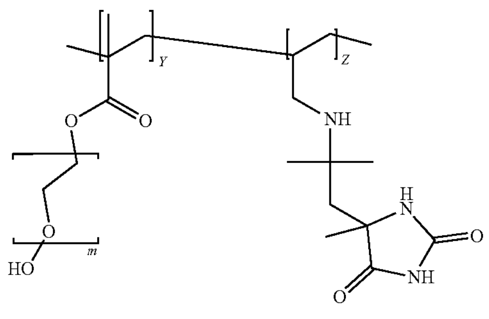

Preparation of the N-Halamine Monomer 2-acrylamido-2-methyl-4-pentanone, potassium cyanide, and ammonium carbonate in a 1:2:6 molar ratio are added to a water/ethanol solvent (1:1 water:ethanol ratio by volume), and the mixture is reacted in a glass vessel at room temperature for about 4 days. After evaporation of ethanol, the crude product is isolated by exposure to dilute HClO or NAClO, then filtered to produce N-halamine monomer.

Preparation of p(HA-Co-PEG)

For polymerization, the N-halamine monomers and the ethylene glycol monomers are added to a reaction mixture at a 2:1 molar ratio (HA monomer:ethylene glycol monomer) in 100% Methanol or DMF. AIBN is added at 1% weight per volume ratio as a catalyst. The mixture is then heated at 60° C. for 3 hours, and the resulting polymer (e.g., the p(HA-co-PEG) copolymer) is precipitated in the bottom of flask after cooling.

Characterization of p(HA-Co-PEG)

The sample of copolymers were characterized with gel permeation chromatography (GPC) in DMF. Waters Ambient Temperature GPC, PSS SDV column, and Waters 2414 Differential Refractive Index (dRI) Detector were used.

Table 1 shows the results of the GPC analysis of a sample of the p(HA-co-PEG) copolymer. The number average molar mass ($M_n$) of the copolymer in the sample was about 110 kDa. The weight average molar mass ($M_w$) of the copolymer in the sample was about 302 kDa. The size average molar mass ($M_z$) of the copolymer in the sample was about 700 kDa. The polydispersity of the copolymer in the sample (e.g., $M_w/M_n$) was about 2.7.

A copolymer of N-halamine precursor (HA) and a poly (ethylene glycol) (PEG) moiety (p(HA-co-PEG)) and a polyvinyl chloride thermoplastic resin (PVC) are added to a hopper at a mass-to-mass ratio of 5:95 (p(HA-co-PEG): PVC) and mixed in a barrel to provide a substantially homogeneous mixture. The barrel has a blender (e.g., a twin-screw extruder) that blends p(HA-co-PEG) and at an initial rotational speed of about 40 rotations per minute (rpm) to about 200 rpm, followed by a higher rotational speed of about 200 rpm to about 800 rpm. The barrel also has a heater (e.g., heater bands around the blender) that subjects p(HA-co-PEG) and PVC to a temperature of about 100° C. to about 260° C. to melt a portion of p(HA-co-PEG) and a portion of PVC during the mixing.

The substantially homogeneous p(HA-co-PEG)/PVC mixture is injected from the barrel to a mold cavity (e.g., via a nozzle that controls a flow rate and volume of the p(HA-co-PEG)/PVC mixture). The p(HA-co-PEG)/PVC mixture is cooled and hardened into composite blocks that can be stored for storage and/or further processing (e.g., compression molding).

TABLE 1

| Distribution Name | Mn (Daltons) | Mw (Daltons) | MP (Daltons) | Mz (Daltons) | Mz + 1 (Daltons) | Polydispersity | Mz/Mw | Mz + 1/Mw |
|---|---|---|---|---|---|---|---|---|
| 1 | 110132 | 302766 | 314440 | 700043 | 1156827 | 2.749117 | 2.312161 | 3.820867 |

Example 2: Manufacturing an Article of Use Via Injection Molding

An N-halamine-forming polymer disclosed herein is combined with a filler (e.g., a thermoplastic) via injection molding to manufacture an article of use. The composite article can be a computer keyboard, or a portion thereof (e.g., one or more keys for the computer keyboard).

A copolymer of N-halamine precursor (HA) and a poly (ethylene glycol) (PEG) moiety (p(HA-co-PEG)) and an acrylonitrile butadiene styrene thermoplastic resin (ABS) are added to a hopper at a mass-to-mass ratio of 5:95 (p(HA-co-PEG):ABS) and mixed in a barrel to provide a substantially homogeneous mixture. The barrel has a blender (e.g., a twin-screw extruder) that blends p(HA-co-PEG) and ABS at an initial rotational speed of about 40 rotations per minute (rpm) to about 200 rpm, followed by a higher rotational speed of about 200 rpm to about 800 rpm. The barrel also has a heater (e.g., heater bands around the blender) that subjects p(HA-co-PEG) and ABS to a temperature of about 190° C. to about 240° C. to melt a portion of p(HA-co-PEG) and a portion of ABS during the mixing.

The substantially homogeneous p(HA-co-PEG)/ABS mixture is injected from the barrel to a mold cavity (e.g., via a nozzle that controls a flow rate and volume of the p(HA-co-PEG)/ABS mixture). The mold cavity is a negative-image of the article of use (e.g., one or more keys for the computer keyboard). The p(HA-co-PEG)/ABS mixture is cooled and hardened into the article of use. Subsequently, the mold cavity is opened to retrieve the manufactured article. The manufactured article of use is optionally surface treated (e.g., sanded, painted, cleaned, etc.).

Example 3: Manufacturing an Article of Use Via Compression Molding

An N-halamine-forming polymer disclosed herein is combined with a filler (e.g., a thermoplastic) via compression molding to manufacture an article of use. The composite article canis a personal protective equipment (PPE), such as boots.

The p(HA-co-PEG)/PVC composite blocks are inserted into a receiving mold. The receiving mold is heated (e.g., to a temperature of about 100° C. to about 260° C.) to soften the p(HA-co-PEG)/PVC composite blocks. Subsequent to or simultaneously with the heating, a top mold moves towards the receiving mold and compresses the p(HA-co-PEG)/PVC composite. The top mold exerts a compression force of about 100 psi to about 1000 psi. The top mold and the receiving mold compresses the p(HA-co-PEG)/PVC composite block into a specific shape to manufacture the article of use. Subsequently, the top mold is raised to retrieve the manufactured article. The manufactured article of use is optionally surface treated (e.g., sanded, painted, cleaned, etc.).

Example 4: Activation of N-Halamines in N-Halamine-Forming Polymers

An article of use comprising an N-halamine-forming polymer disclosed herein (e.g., the boots in Example 3) can be treated with an electrophilic chlorine source to form a plurality of N-halamines (e.g., N-chlorinated hydantoins) on a surface of the article of use.

Boots are made of a polymer composite comprising (1) a copolymer of N-halamine precursor (HA) and a poly(ethylene glycol) (PEG) moiety (p(HA-co-PEG)) and (ii) a polyvinyl chloride thermoplastic resin (PVC). The boots are not further coated with another biocidal polymer composition, e.g., another polymer composition that comprises a copolymer of N-halamine precursors and dopamine. The surfaces of the boots are treated with bleach (e.g., 0.5 volume % sodium hypochlorite in water) to chlorinate some or all of N-halamine precursors exposed on the surfaces.

To investigate a biocidal activity of the N-halamine-activated surfaces of the boots, fluorescent bacteria (e.g., *E. coli* or *S. aureus* that constitutively express green fluorescent protein (GFP)) are used. An inoculum of such bacteria (e.g.,

*E. coli* or *S. aureus*) is added to the surfaces of the boots in an amount of about 4×107 colony-forming unit per milliliter (CFU/ml). Following, the surfaces of the boots and subsequently imaged (e.g., via fluorescent imaging) at one or more time points to determine bacterial adhesion to and growth on the surfaces of the boots. In comparison to control boots that do not comprise the p(HA-co-PEG) copolymer, the N-halamine-activated boots kill more bacteria and reduces colonization of the bacteria on the surfaces. In some examples, the N-halamine-activated boots substantially prevents colonization of the bacteria on the surfaces.

The boots are re-treated with bleach every day, every week, or every month to re-charge the N-halamine precursors.

Example 5: Preparation of a Copolymer of N-Halamine (HA) and N-(3-Sulfopropyl)-N-Methacroyloxyethyl-N,N-Dimethylammonium Betaine (SBMA) p(HA-co-SBMA)-1

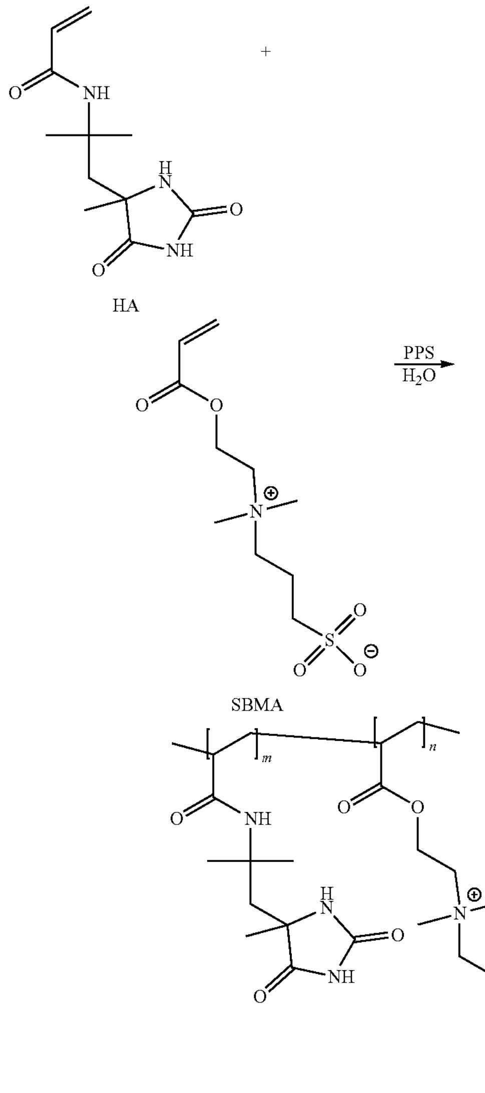

HA
SBMA
p(HA-co-SBMA)-1

2-Propenamide, N-[1,1-dimethyl-2-(4-methyl-2,5-dioxo-4-imidazolidinyl)ethyl] (HA; e.g., about 3.35 grams) was reacted with N-(3-Sulfopropyl)-N-methacroyloxyethyl-N,N-dimethylammonium betaine (SBMA; e.g., about 1.76 grams) by a free-radical polymerization in a round bottom flask equipped with heating bath and reflux. HA and SBMA monomers were added into flask, e.g., with 60 mL DI water. The reaction mixture was mixed moderately (e.g., with a magnetic stirrer) until monomers were substantially dissolved under nitrogen gas. Following, potassium persulfate (PPS; e.g., about 50 milligrams) was added as an initiator into the reaction flask. Nitrogen was purged (e.g., for an additional of 20 minutes) while mixing the reaction mixture moderately. The reaction mixture was heated (e.g., to a temperature of about 65° C.) and polymerization was allowed to proceed (e.g., for at least or up to about 3 hours). At the end of the polymerization reaction, heating was turned off and the reaction mixture was allowed to cool down (e.g., to room temperature). Water was then removed (e.g., with rotavapor). The resulting p(HA-co-SBMA)-1 copolymer was collected in dry powder. The copolymer powder was kept in vacuum oven (e.g., at about 30° C. for 24 hours) to further dry moisture from the system.

p(HA-Co-SBMA)-2, Synthesis with Chain Transfer Agent

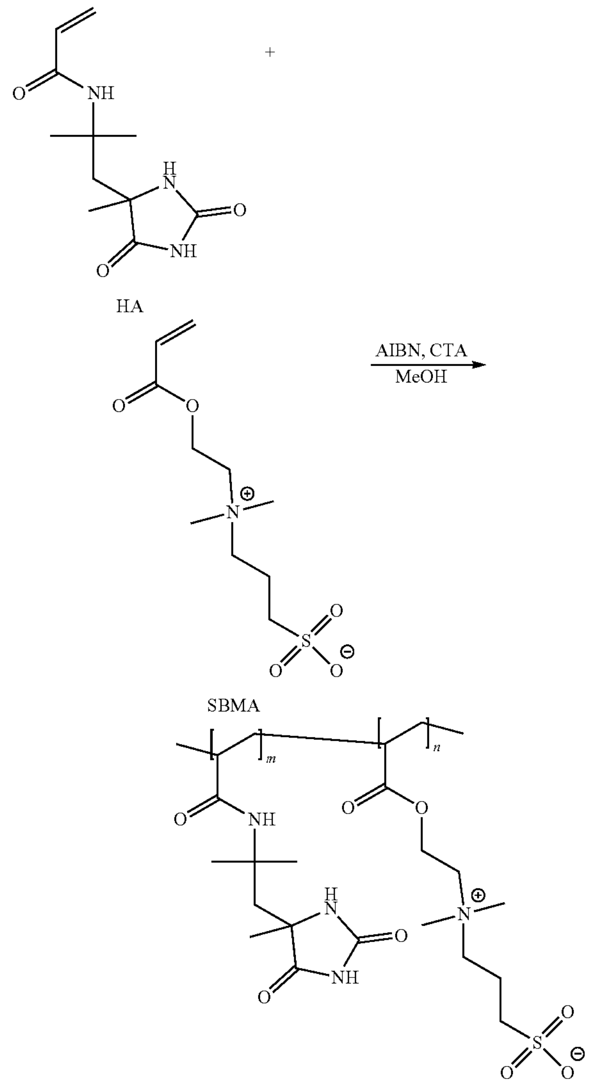

HA
SBMA
p(HA-co-SBMA)-2

Controlled free radical polymerization (e.g., radical addition-fragmentation chain transfer (RAFT) polymerization) was used to synthesize the p(HA-co-SBMA) copolymer, e.g., to control and reduce the number average molar mass of the p(HA-co-SBMA) copolymer.

2-Propenamide N-[1,1-dimethyl-2-(4-methyl-2.5-dioxo-4-imidazolidinyl)ethyl] (HA; e.g., about 33.5 grams) was reacted with N-(3-Sulfopropyl)-N-methacroyloxyethyl-N, N-dimethylammonium betaine (SBMA; e g, about 17.6 grams) in a round bottom flask equipped with heating bath and reflux. The HA and SBMA monomers were added into the flask in methanol (e.g., about 225 mL methanol). The monomers were allowed to dissolve in methanol under nitrogen purge while mixing moderately, then mixed with azobis(isobutyronitrile) (AIBN) free-radical initiator (e.g., about 45 milligrams) and 1-dodecanethiol chain transfer agent (CTA) (e.g., about 200 μL). The reaction mixture was then purged with nitrogen (e.g., for an additional of 20 minutes) while mixing moderately with magnetic stirrer bar. The reaction mixture was heated to 65° C. and the polymerization reaction proceeded (e.g., for 3 hours). At the end of the polymerization reaction. The heating was turned off and the reaction mixture was cooled down to room temperature. Rotavapor was used to remove methanol from the reaction mixture. The resulting p(HA-co-SBMA)-2 copolymer was collected in dry powder form. The resulting copolymer powder was kept in vacuum oven (e.g., at 25° C. for 48 hours) to further dry moisture trapped in the system.

Example 6: Preparation of a N-Halamine (HA) Homopolymer

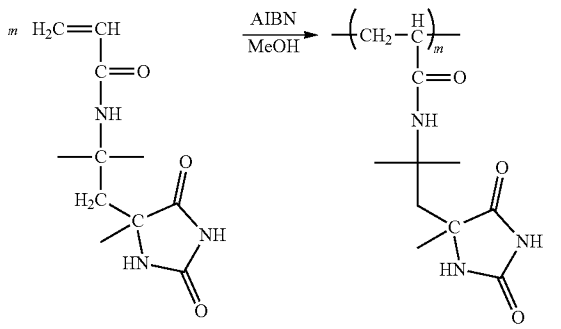

HA p(HA)

A homopolymer N-halamine (p(HA)) (e.g., hydantoin acrylamide homopolymer) was synthesized by free radical polymerization. In a flask (e.g., a 50 mL round-bottom flask), 2-Propenamide, N-[1,1-dimethyl-2-(4-methyl-2,5-dioxo-4-imidazolidinyl)ethyl] (HA; e.g., about 4.78 grams) was dissolved in methanol (e.g., about 25 mL methanol) under nitrogen purge. Following, azobis(isobutyronitrile) (AIBN) was added to the flask, and nitrogen gas was bubbled through the solution (e.g., for about 20 min) to remove some or all of (e.g., substantially all of) dissolved oxygen before initiating the reaction (e.g., polymerization reaction). The mixture was heated at reflux (e.g., at about 65° C. for about 5 hours) under the nitrogen atmosphere. After completion of the polymerization reaction, the solvent was removed by evaporation in rotavapor. Some or substantially all of any unreacted molecules (e.g., unreacted monomers) were removed by immersing the crude polymer in methanol solvent, while mixing moderately (e.g., for 1 hour at room temperature). This process was repeated twice, and the resulting polymer was then collected by vacuum filtration. The resulting polymer was collected and further dried in vacuum oven at room temperature, to yield a white powder form product.

In some cases, the aforementioned polymerization process was prepared in aqueous conditions. For example, the HA monomer (e.g., about 4.787 grams) was dissolved in water (e.g., about 60 mL DI water) under nitrogen gas. Potassium persulfate (PPS) was used as an initiator. After addition of PPS, the reaction parameters were kept the same as aforementioned. Once the polymerization was completed, the resulting p(HA) homopolymer was precipitated out and collected via vacuum filtration.

Example 7: Polymer Melting

Polymer Melt Blending Via Twin Screw Extruder with N-Halamine Precursors Additives Melt blends were prepared using a vertical conical counter-rotating twin screw batch compounder with a mixing chamber (e.g., a 5 g capacity mixing chamber). Polymer processing (e.g., mixing a plurality of different polymers) was carried out to blend (i) Polypropylene (PP) and/or Polyethylene (PE) with (ii) one or more of p(HA) homopolymer, p(HA-co-SBMA)-1 copolymer, or p(HA-co-SBMA)-2 copolymer. Prior to the polymer melt blending and compounding by extrusion process, PP and/or PE polymer resins were mixed with p(HA), p(HA-co-SBMA)-1, and/or p(HA-co-SBMA)-2 using a circular motion rotational device (e.g., a rock tumbler), then pressed into a desired shape (e.g., hot pressed into a thin film using a hot plate).

In some cases, alternatively, a twin screw with an appropriate hopper fused for feeding polymer pellets and powder may be used.

Polypropylene (PP) Polymer Melt Blending with p(HA) Polymer Additive Via Twin Screw Extruder Prior to polymer melt blending and compounding by extrusion process, PP pellets were mixed with p(HA) polymer additive (e.g., at a mass-to-mass ratio of 5:100 (p(HA): PP)). In this process, p(HA) additive (e.g., about 0.75 grams) and PP pellets (e.g., about 15 grams) were measured and added into a cylindrical conical container equipped with screw top cap. The container was placed horizontally on circular motion rotational device (e.g., a rock tumbler) or vertically on a vortex mixer and mixed together. One set of PP resin (e.g., about 15 grams) with p(HA) polymer additive (e.g., about 0.75 grams) was mixed using a vortex mixer (e.g., for 5 minutes). Another set of p(HA) (e.g., about 0.75 grams) and PP resin pellets (e.g., about 15 grams) was mixed using a tumbler (e.g., for 30 minutes).

Following, the polymer mixtures were subsequently hot pressed into a desired shape (e.g., at 180° C. or 200° C. for 5 min) to create a desired shape (e.g., coherent films or thin films). For example, the resulting p(HA) additive mixed PP film was then cut into smaller pieces (e.g., about 5 millimeters wide) and subsequently fed to twin screw extruder through feeder opening. The PP-p(HA) polymer blends were extruded (e.g., at 190° C., 210° C., or 230° C. for 8 minutes without a die). Following, the resulting p(HA) compounded PP polymer blends were collected and subsequently hot pressed into thin films (e.g., at 180° C. for 5 min). The films were then cut into smaller pieces (e.g., into 1×1 inch$^2$ size coupons) and kept in sealed containers until further use.

Polymer processing parameters of the PP-p(HA)-[5 w %] blended films (e.g., Sample #1, #2, #4, #6, and #8) are provided in Table 2.

Polypropylene (PP) Polymer Melt Blending with p(HA-co-SBMA)-2 Polymer Additive Via Twin Screw Extruder Similar to the aforementioned preparation of the p(HA) homopolymer compounded PP blend film, PP-p(HA-co-SBMA)-2 films were compounded by melt blend extrusion process. PP pellets were mixed with p(HA-co-SBMA)-2 polymer additive (e.g., at mass-to-mass ratio of about 0.5:100, 2.5:100, 5:100, 10:100, 20:100, or 30:100 ratio (p(HA-co-SBMA)-2:PP)). For example, to prepare p(HA-co-SBMA)-2 blended PP (e.g., at 0.5 weight %), p(HA-co-SBMA)-2 (e.g., about 0.1 g) and PP pellets (e.g., 20 g) were measured and added into a cylindrical container with a screw top cap and mixed together by vortex mixer (e.g., for 5 minutes). Following, the polymer mixture was hot pressed into a thin film (e.g., at 180° C. for 5 min), which was subsequently extruded (e.g., without a die at 200° C. for 8 minutes). The resulting p(HA-co-SBMA)-2 compounded PP polymer blend was collected and hot pressed into a thin film (e.g., at 180° C. for 5 min). Films were then cut into smaller pieces (e.g., into 1×1 inch2 size coupons) and kept in a sealed container until further use.

Polymer processing parameters of the PP-p(HA-SBMA)-2 blended films (e.g., Sample #12, #13, #14, #18, #19, and #20) are provided in Table 2.

TABLE 2

Mixing conditions and melt blend extrusion process parameters of PP-p(HA) and PP-p(HA-co-SBMA)-2 compounded films.

| Sample ID | Sample Specifications | Mixing Time | Hot Plate Temperature | Extruder Temperature |
|---|---|---|---|---|
| 1 | PP-p(HA)-[5 w %] | Vortex 5 min | 180° C., 5 min | 190° C., 8 min |
| 2 | PP-p(HA)-[5 w %] | Vortex 5 min | 180° C., 5 min | 190° C., 8 min |
| 4 | PP-p(HA)-[5 w %] | Vortex 5 min | 200° C., 5 min | 210° C., 8 min |
| 6 | PP-p(HA)-[5 w %] | Tumbler 30 min | 200° C., 5 min | 210° C., 8 min |
| 8 | PP-p(HA)-[5 w %] | Tumbler 30 min | 200° C., 5 min | 230° C., 8 min |
| 12 | PP-p(HA-SBMA)-2[0.5 w %] | Vortex 5 min | 180° C., 5 min | 200° C., 8 min |
| 13 | PP-p(HA-SBMA)-2[2.5 w %] | Vortex 5 min | 180° C., 5 min | 200° C., 8 min |
| 14 | PP-p(HA-SBMA)-2[5.0 w %] | Vortex 5 min | 180° C., 5 min | 200° C., 8 min |
| 18 | PP-P(HA-SBMA)-2[10.0 w %] | Vortex 5 min | 180° C., 5 min | 200° C., 8 min |
| 19 | PP-P(HA-SBMA)-2[20.0 w %] | Vortex 5 min | 180° C., 5 min | 200° C., 8 min |
| 20 | PP-P(HA-SBMA)-2[30.0 w %] | Vortex 5 min | 180° C., 5 min | 200° C., 8 min |

Polyethylene (PE) Polymer Melt Blending with p(HA) Additive Via Twin Screw Extruder Prior to polymer melt blending and compounding by extrusion process, PE pellets were mixed with p(HA) (e.g., at a mass-to-mass ratio of 5:100 (p(HA):PE)). In this process, p(HA) (e.g., about 1.5 grams) and PE pellets (e.g., about 30 g) were measured and added into a cylindrical conical container equipped with screw top cap. Container was placed horizontally on circular motion rotational device (e.g., a rock tumbler) or vertically on a vortex mixer and mixed together. One set of PE resin (e.g., about 30 grams) with p(HA) polymer additive (e.g., about 1.5 grams) was mixed using a vortex mixer (e.g., for 5 minutes). Another set of 5 wt % p(HA) mixed PE resin pellets (e.g., about 1.5 grams p(HA) and about 30 grams PE resin) was mixed using a tumbler (e.g., for 30 minutes).

Each of the 5 w % p(HA) and PE polymer mixtures were subsequently hot pressed into thin films (e.g., at 180° C. or 200° C. for 5 min) to create coherent films. The films were then cut into smaller size pieces and subsequently extruded (e.g., without a die at 190° C., 210° C., or 230° C. for 8 minutes). The resulting PE-P(HA)-[5 w %] compounded blends were then hot pressed into thin films (e.g., at 180° C. for 5 min). The resulting films were then cut into smaller pieces (e.g., into 1×1 inch$^2$ size coupons) and kept in a sealed container until further use.

Polymer processing parameters of the PE-P(HA)-[5 w %] blended films (e.g., Sample #3, #5, #7, and #9) are provided in Table 3.

Polypropylene (PE) Polymer Melt Blending with p(HA-Co-SBMA)-1 Polymer Additive Via Twin Screw Extruder 5 wt % p(HA-co-SBMA)-1 blended PP films were compounded by melt blend extrusion process. In this process PE pellets were mixed with p(HA-co-SBMA)-1 polymer additive (e.g., at mass-to-mass ratio of 0.5:100 (p(HA-SBMA)-1:PE)). For example, PE pellets (e.g., about 15 grams) were mixed with p(HA-SBMA)-1 copolymer additive (e.g., about 0.75 grams) using a tumbler (e.g., for 30 minutes) and hot pressed into a thin film (e.g., at 200° C. for 5 minutes) and subsequently extruded (e.g., at 210° C. for 8 minutes). The resulting p(HA-SBMA)-1 compounded PE blend was then hot pressed into a thin film (e.g., at 180° C. for 5 min). The film was then cut into smaller pieces (e.g., 1×1 inch$^2$ size coupons) and kept in a sealed container until further use.

Polymer mixing and extrusion conditions of PE-P(HA-SBMA)-1 [5 w %] compounded films (e.g., Sample #10) are provided in Table 2.

TABLE 3

Mixing conditions and melt blend extrusion process parameters of PE-p(HA) and PE-p(HA-co-SBMA)-1 compounded films

| Sample ID | Sample Specifications | Mixing Time | Hot Plate Temperature | Extruder Temperature |
|---|---|---|---|---|
| 3 | PE-p(HA)-[5 w %] | Vortex 5 min | 180° C., 5 min | 190° C., 8 min |
| 5 | PE-p(HA)-[5 w %] | Vortex 5 min | 200° C., 5 min | 210° C., 8 min |
| 7 | PE-p(HA)-[5 w %] | Tumbler 30 min | 200° C., 5 min | 210° C., 8 min |
| 9 | PE-p(HA)-[5 w %] | Tumbler 30 min | 200° C., 5 min | 230° C., 8 min |
| 10 | PE-p(HA-SBMA)-1[5 w %] | Tumbler 30 min | 200° C., 5 min | 210° C., 8 min |

Polyvinylchloride (PVC) Polymer Melt Blending with p(HA-Co-SBMA)-1 and p(HA-Co-SBMA)-2 Copolymer Additives Via Twin Screw Extruder Prior to polymer melt blending and compounding by extrusion process, PVC endotracheal tubes that have been cut into small pieces (e.g., approximately 3 mm by 3 mm in size) were mixed with either p(HA-co-SBMA)-1 or p(HA-co-SBMA)-2 N-halamine precursor copolymers, as aforementioned, using a vortex and tumbler mixer. One set of p(HA-co-SBMA)-1 polymer additive was mixed with the PVC polymer pieces (e.g., at a 5 to 100 mass-to-mass ratio (p(HA-co-SBMA)-1:PVC)) using a tumbler mixer (e.g., for 30 minutes) and subsequently hot pressed into a film (e.g., at 160° C. for 5 minutes). This film then was cut into smaller pieces and subsequently extruded (e.g., at 180° C. for 8 minutes). The 5 wt % P(HA-SBMA)-1 compounded PVC blend was then hot pressed into a thin film (e.g., at 160° C. for 5 minutes).

In another example, PVC pellets were mixed with p(HA-co-SBMA)-2 polymer additive (e.g., at a mass-to-mass ratio of 0.5:100, 2.5:100, or 5:100 (p(HA-co-SBMA)-2:PVC)) by using a vortex mixer (e.g., for about 5 minutes). Each of the prepared p(HA-co-SBMA)-2 mixed PVC mixtures were then hot pressed into a thin film (e.g., at 180° C. for 5 minutes). The prepared films were then cut into smaller pieces and subsequently extruded (e.g., at 180° C. for 8 minutes). Each of the p(HA-co-SBMA)-2 compounded PVC blends were then hot pressed into a thin film (e.g., at 180° C. for 5 minutes). The resulting p(HA-co-SBMA)-2 compounded PVC films were then cut into smaller pieces (e.g., into 1×1 $inch^2$ size coupons) and kept in a sealed container until further use.

Mixing and extrusion conditions of PVC polymer compounds melt extruded with p(HA-co-SBMA)-1 and/or p(HA-co-SBMA)-2 N-halamine precursor polymers (e.g., Sample #11, #15, #16, and #17) are provided in Table 4.

TABLE 4

Mixing conditions and melt blend extrusion process parameters of PVC-p(HA-co-SBMA)-1 and PVC-p(HA-co-SBMA)-2 compounded films

| Sample ID | Sample Specifications | Mixing Time | Hot Plate Temperature | Extruder Temperature |
|---|---|---|---|---|
| 11 | PVC-p(HA-SBMA)-1 [5 w %] | Tumbler 30 min | 160° C., 5 min | 180° C., 8 min |
| 15 | PVC-p(HA-SBMA)-2 [0.5 w %] | Vortex 5 min | 180° C., 5 min | 180° C., 8 min |
| 16 | PVC-p(HA-SBMA)-2 [2.5 w %] | Vortex 5 min | 180° C., 5 min | 180° C., 8 min |
| 17 | PVC-p(HA-SBMA)-2 [5.0 w %] | Vortex 5 min | 180° C., 5 min | 180° C., 8 min |

Example 8: Chlorination Process of N-halamine Precursor Compounded PP, PVC and PE Polymer Films Various polymer films (or polymer film matrices) as disclosed herein (e.g., PP, PE, or PVC polymer films, each compounded and blended with p(HA), p(HA-SBMA)-1, or p(HA-SBMA)-2 N-halamine precursor polymer additives) were chlorinated, to activate the —N—H moieties in the N-halamine precursor units of the compounded polymers within each film. The —N—H units activated (e.g., activated once) by the chlorination process provide, for example, antimicrobial properties for the films. In this process, the —N—H group of amine, amide, and imide moieties of the N-halamine precursor in the polymer film matrix was chlorinated and formed —N—Cl bonds. The chlorination reaction of —N—H groups occurs during chlorination procedure and a stable chlorine bond forms between nitrogen and chlorine at the end of the chlorination procedure.

Chlorination of N-halamine Precursor p(HA) and p(HA-SBMA)-2 Compounded PP Films

An aqueous solution of bleach (e.g., household bleach, such as 8.25% NaOCl) was prepared in deionized water (e.g., 10 v/v bleach in water). The pH of the solution was adjusted (e.g., to 7) by addition of a HCl solution (e.g., about 6N HCl). PP-p(HA)-[5 w %] polymer films were cut into small pieces (e.g., 1×1 $inch^2$ coupons) and immersed in the sodium hypochlorite solution and agitated (e.g., at about 200 rpm) on a shaker (e.g., for 1 hour), for chlorination. After the chlorination process, the pieces (or coupons) were rinsed in deionized water and wiped to dry. Following, the pieces were kept in a closed container at ambient conditions until iodometric titration of the chlorinated coupons.

Another set of PP-p(HA)-[5 w %] polymer films, which were cut into small pieces (e.g., 1×1 $inch^2$ coupons), was chlorinated by immersing in 10 v/v % aqueous sodium hypochlorite solution at a pH of 5 (e.g., final sodium hypochlorite concentration of about 0.825 weight %) and agitated at 200 rpm on a shaker for 1 hour. After the chlorination process, the coupons were rinsed in deionized water, then surface wiped to dry. After the chlorination reaction and drying process, the small pieces were kept in a closed container for 16 hours at ambient conditions until titration of the chlorinated coupons.

PP-p(HA-SBMA)-2 polymer films, prepared at a mass-to-mas ratio (p(HA-SBMA:PP)) of 0.5:100, 2.5:100, 5:100, 10:100, 20:100, or 30:10 and cut into 1×1 $inch^2$ coupons, were immersed in 10 v/v % aqueous sodium hypochlorite solution at a pH of 5 (adjusted by a 6 N HCl solution) and agitated at 200 rpm on a shaker for 1 hour. After the chlorination process, the coupons were rinsed in deionized water, surface wiped (e.g., with Kimwipes™). After the chlorination reaction and drying process, coupons were kept in a closed container for 22-24 hours at ambient conditions until titration of the chlorinated coupons.

Chlorination of N-halamine Precursor p(HA) and p(HA-SBMA)-1 Compounded PE Films

An aqueous solution of 10 v/v % household bleach (e.g., 8.25% NaOCl) was prepared in deionized water. pH of the solution was adjusted to 7 by addition of a 6N HCl solution. PE-p(HA) (e.g., 5 wt % p(HA)) polymer films were cut into 1×1 $inch^2$ coupons and immersed in the sodium hypochlorite solution and agitated at 200 rpm on a shaker for 1 hour. After the chlorination process, the coupons were rinsed in deionized water, surface wiped (e.g., with Kimwipes). After the chlorination reaction and drying process, coupons were kept in a closed container for 16 hours at ambient conditions until titration process.

Another set of PE-p(HA)-[5 w %] polymer films, cut into 1×1 $inch^2$ coupons, were chlorinated by immersing in the 10 v/v % sodium hypochlorite solution at a pH of 5 (adjusted by a 6 N HCl solution) and agitated at 200 rpm on a shaker for 1 hour. After the chlorination process, the coupons were rinsed in deionized water, surface wiped. After the chlorination reaction and drying process, coupons were kept in a closed container for 16 hours at ambient conditions until titration of the coupons.

PE-p(HA-SBMA)-1 polymer films prepared at 5:100 (p(HA-SBMA):PE) mass-to-mass ratio were cut into 1×1 $inch^2$ coupons and immersed in 10 v/v % sodium hypochlorite solution at a pH of 5 (adjusted by a 6 N HCl solution) and agitated at 200 rpm on a shaker for 1 hour. After the chlorination process, the coupons were rinsed in deionized water, surface wiped. After the chlorination reaction and drying process, coupons were kept in a closed container for 18 hours at ambient conditions until titration.

Chlorination of N-halamine Precursor p(HA-SBMA)-1 and p(HA-SBMA)-2 Compounded PVC Films An aqueous solution of 10 v/v % household bleach (e.g., 8.25% NaOCl) was prepared in deionized water. pH of the solution was adjusted to 5 by addition of a 6N HCl solution. PVC-P(HA-SBMA)-1 (e.g., 5 wt % P(HA-SBMA)-1), PVC-P(HA-SBMA)-2 (e.g., 5 wt % P(HA-SBMA)-2), PVC-P(HA-SBMA)-2 (e.g., 2.5 wt % P(HA-SBMA)-2), and PVC-P(HA-SBMA)-2 (e.g., 5 wt % P(HA-SBMA)-2) polymer films were cut into 1×1 $inch^2$ coupons and immersed in the sodium hypochlorite solution and agitated at 200 rpm on a shaker for 1 hour. After the chlorination process, the coupons were rinsed in deionized water, surface wiped. After the chlorination reaction and drying process, coupons were kept in a closed container for 19 to 22 hours at ambient conditions until iodometric titration process of the chlorinated coupons.

Example 9: Recharging Analysis of the N-Halamine Precursor Compounded PP, PVC and PE Polymer Films Through Repeated Chlorination Process Any of the polymer blends (e.g., films) comprising N-halamine, as disclosed herein, can exhibit rechargeable antimicrobial function, e.g., by using a re-chlorination process. To confirm the recharging function of the polymer blends, coupons made of such polymer blends were subjected to repeated re-chlorination cycles. Once the chlorine atom bounded to amine, imide, and/or amine groups of N-halamine additive in the polymer blend was used up (e.g., discharged), it can be replaced back (e.g., re-charged) by second re-chlorination step. This re-chlorination cycle was repeated several times.

Re-Chlorination Process of N-Halamine Precursor p(HA) and p(HA-SBMA)-2 Compounded PP Films p(HA) and p(HA-SBMA)-2 compounded PP polymer films were cut into 1×1 $inch^2$ coupons and immersed in the sodium hypochlorite solution and agitated at 200 rpm on a shaker for 1 hour. After the re-chlorination process, the coupons were rinsed in deionized water and surface wiped to dry. After the re-chlorination reaction and drying process, coupons were kept in a closed container at ambient conditions until iodometric titration of the chlorinated coupons.

PP-p(HA) (e.g., 5 wt % p(HA)) compounded films (e.g., Sample #1 and #2 coupons from Table 2) were subjected to 5 cycles of re-chlorinating process after 1st chlorination cycle. Sample #4, #6, and #8 coupons (e.g., from Table 2) were subjected to 2 cycles of re-chlorination process. PP-p(HA-SBMA)-2 (e.g., 0.5 wt % p(HA-SBMA); sample #12 from Table 2), PP-p(HA-SBMA)-2 (e.g., 3.5 wt % PP-p(HA-SBMA)-2; sample #13 from Table 2) and PP-p(HA-SBMA)-2 (e.g., 5 wt % p(HA-SBMA)-2; sample #14 from Table 2) compounded films were subjected to 3 cycles of re-chlorination process. Re-chlorination parameters and average chlorine amount titrated after each re-chlorination cycle of PP compounded coupons are shown in Table 5.

Re-Chlorination of N-Halamine Precursor p(HA-SBMA)-2 Compounded PVC Films p(HA-SBMA)-2 compounded PVC polymer films were cut into 1×1 $inch^2$ coupons and immersed in the sodium hypochlorite solution and agitated at 200 rpm on a shaker for 1 hour. After the re-chlorination process, the coupons were rinsed in deionized water and surface wiped to dry. After the re-chlorination reaction and drying process, coupons were kept in a closed container at ambient conditions until iodometric titration of the chlorinated coupons.

PVC-p(HA-SBMA)-2 (e.g., 0.5 wt % p(HA-SBMA)-2; sample #15 from Table 3), PVC-p(HA-SBMA)-2 (e.g., 2.5 wt % p(HA-SBMA)-2; sample #16 from Table 3), and PVC-p(HA-SBMA)-2 (e.g., 5.0 wt % p(HA-SBMA)-2; sample #17 from Table 3) were subjected to 2 cycles of re-chlorinating process after 1st chlorination cycle. Re-chlorination parameters and average chlorine amount titrated after each re-chlorination cycle of PVC compounded coupons are shown in Table 5.

Example 10: Analytical Titration of the N-Halamine Compounded PP, PE and PVC Polymers Films The immobilized oxidative halogen content of the N-halamine compounded polymer films was determined by standard iodometric/thiosulfate titration. Approximately 200 mg of potassium iodide was dissolved in 20 mL deionized water (e.g., 60 mM potassium iodide) in a 125 mL Erlenmeyer flask. N-halogenated PP, PE, and PVC coupons (e.g., each in size of 6.45 $cm^2$) were placed into the flask containing the aqueous solution prepared with excess KI. Following, 10 drops of 15% acetic acid were added. Flasks containing coupons were covered with a stopper and agitated for 1 hour using a shaker. Then 10 drops of 0.5 w/w % soluble starch were added into the mixture, and the end point was determined by titration with 0.001 N sodium thiosulfate solution. The available chlorine and bromine atoms/$cm^2$ were calculated using the following equation:

$$\text{Total halogen content (atoms/cm}^2\text{)} = \frac{N \times V}{2A} \times 6.02 \times 10^{23} \quad (1)$$

where N and V are the normality (equiv/L) and volume (L) of the titrant ($Na_2S_2O_3$), respectively, and A is the surface area of both of the sides of the 1 $inch^2$ coupon in $cm^2$ (e.g., 12.9 $cm^2$).

Chlorine Content of N-Chlorinated N-Halamine Compounded PP, PE and PVC Polymers Films The amount of chlorine that is bound on the surface N—H groups of each N-halamine blended films was measured by iodometric/thiosulfate titration. The results were shown in Table 4 below. After chlorination reaction, PP coupons (e.g., sample #1, #2, #4, #6, and #8 from Table 1) when compounded and blended with p(HA) polymer had approximately 2E+14 to 3E+14 atoms/$cm^2$ oxidative chlorine regardless of the extrusion temperature and mixing conditions. Similar chlorine amount was observed for p(HA) compounded PE coupons where only 2E+14 to 3E+14 atoms/$cm^2$ oxidative chlorine was measured regardless of the extrusion temperature and mixing conditions.

Significantly higher chlorine amount was detected when PP coupons (e.g., sample #12, #13, and #14 from Table 2) compounded and blended with p(HA-co-SBMA)-2 polymer. Increasing weight percent concentration of p(HA-co-SBMA)-2 in PP polymer blend yielded higher oxidative chlorine measurement of PP-p(HA-SBMA)-2 compounded films. Measured oxidative chlorine content of PP-p(HA-SBMA)-2 (e.g., 0.5 wt % p(HA-SBMA)-2) and PP-p(HA-SBMA)-2 (e.g., 5.0 wt % p(HA-SBMA)-2) increased from 9.94E+14 to 2.23E+16 atoms/$cm^2$, respectively. Increasing p(HA-co-SBMA)-2 concentration from about 10 wt % to about 30 wt % resulted in significant increase in the chlorine content of PP-p(HA-SBMA)-2 (e.g., about 10.0 wt % p(HA-SBMA)-2), PP-p(HA-SBMA)-2 (e.g., about 20.0 wt % p(HA-SBMA)-2), and PP-p(HA-SBMA)-2 (e.g., about 30.0 wt % p(HA-SBMA)-2) blended coupons. Chlorine content of samples #18, #19, and #20 (from Table 2) was measured 6.31E+16, 1.43E+17, and 1.86E+17, respectively.

The oxidative chlorine content of PE-p(HA-SBMA)-1 (e.g., 5 wt % p(HA-SBMA)-1) coupons was measured at 1.72E+16 atoms/$cm^2$. Both of PE and PP with 5 wt % N-halamine polymer compounded films reached approximately 100-fold higher chlorine levels when p(HA-SBMA) polymer used as an additive compared to when p(HA) polymer was used as an additive. However, when 5 wt % p(HA-SBMA) N-halamine additive was blended with PVC resin, chlorine content of PVC-p(HA-SBMA)-1 (e.g., 5 wt % p(HA-SBMA)-1) and PVC-p(HA-SBMA)-2 (e.g., 5.0 wt % p(HA-SBMA)-2) was measured at 1.45E+17 and 1.03E+17 atoms/$cm^2$, respectively. Of the same 5 wt % concentration of p(HA-SBMA) N-halamine polymer additive compounded coupons, PVC films had 10-fold higher chlorine amount than PP and PE compounded films did. Measured oxidative chlorine content of PVC-p(HA-SBMA)-2 (e.g., 0.5 wt % p(HA-SBMA)), PVC-p(HA-SBMA)-2 (e.g., 2.5 wt % p(HA-BSMA)-2), and PVC-p(HA-SBMA)-2 (e.g., 5.0 wt % p(HA(-SBMA)) was 1.44E+16, 7.50E+16, 1.03E+17, respectively. In addition, chlorine amount measured at each additive mass ratio of PVC coupons increased with the increase of additive concentration of N-halamine compounded PVC resins. Changing the polymerization reaction parameters of p(HA-SBMA) synthesis did not have any significant effect on the ultimate chlorine content.

TABLE 5

Average oxidative chlorine values ($Cl^+$ atoms/$cm^2$) of p(HA), P(HA-SBMA)-1 and p(HA-SBMA)-2N-halamine precursor polymer compounded PP, PE, and PVC films

| Sample ID | Sample Specifications | Chlorination Cycles | pH of NaOCl | Storage Time (h) | Average [$Cl^+$] (atoms/$cm^2$) |
|---|---|---|---|---|---|
| 1 | PP-p(HA)-[5 w %] | $1^{st}$ | 7 | 0 | 2.92E+14 |
| 2 | PP-p(HA)-[5 w %] | $1^{st}$ | 7 | 0 | 2.92E+14 |
| 4 | PP-p(HA)-[5 w %] | $1^{st}$ | 5 | 16 | 3.50E+14 |
| 6 | PP-p(HA)-[5 w %] | $1^{st}$ | 5 | 16 | 1.75E+14 |
| 8 | PP-P(HA)-[5 w %] | $1^{st}$ | 5 | 16 | 2.33E+14 |
| 12 | PP-p(HA-SBMA)-2 [0.5 w %] | $1^{st}$ | 5 | 22 | 9.94E+14 |
| 13 | PP-p(HA-SBMA)-2 [2.5 w %] | $1^{st}$ | 5 | 22 | 9.24E+15 |
| 14 | PP-p(HA-SBMA)-2 [5.0 w %] | $1^{st}$ | 5 | 22 | 2.23E+16 |
| 18 | PP-P(HA-SBMA)-2[10.0 w %] | $1^{st}$ | 5 | 24 | 6.31E+16 |
| 19 | PP-P(HA-SBMA)-2[20.0 w %] | $1^{st}$ | 5 | 24 | 1.43E+17 |
| 20 | PP-P(HA-SBMA)-2[30.0 w %] | $1^{st}$ | 5 | 24 | 1.86E+17 |
| 3 | PE-P(HA)-[5 w %] | $1^{st}$ | 7 | 0 | 2.19E+14 |
| 5 | PE-P(HA)-[5 w %] | $1^{st}$ | 5 | 16 | 3.69E+14 |

TABLE 5-continued

Average oxidative chlorine values ($Cl^+$ atoms/$cm^2$) of p(HA), P(HA-SBMA)-1 and p(HA-SBMA)-2N-halamine precursor polymer compounded PP, PE, and PVC films

| Sample ID | Sample Specifications | Chlorination Cycles | pH of NaOCl | Storage Time (h) | Average [$Cl^+$] (atoms/$cm^2$) |
|---|---|---|---|---|---|
| 7 | PE-P(HA)-[5 w %] | $1^{st}$ | 5 | 16 | 3.30E+14 |
| 9 | PE-P(HA)-[5 w %] | $1^{st}$ | 5 | 16 | 2.72E+14 |
| 10 | PE-P(HA-SBMA)-1 [5 w %] | $1^{st}$ | 5 | 18 | 1.72E+16 |
| 11 | PVC-P(HA-SBMA)-1 [5 w %] | $1^{st}$ | 5 | 19 | 1.45E+17 |
| 15 | PVC-P(HA-SBMA)-2 [0.5 w %] | $1^{st}$ | 5 | 22 | 1.44E+16 |
| 16 | PVC-P(HA-SBMA)-2 [2.5 w %] | $1^{st}$ | 5 | 22 | 7.50E+16 |
| 17 | PVC-P(HA-SBMA)-2 [5.0 w %] | $1^{st}$ | 5 | 22 | 1.03E+17 |

Chlorine Content of Re-Chlorinated N-Halamine Compounded PP and PVC Polymers Films The amount of chlorine that is bound on the surface N—H groups of each N-halamine blended film after re-chlorination cycles were measured by iodometric/thiosulfate titration and results are provided in Table 6. After re-chlorination reaction, PP coupons (sample #1 and #2 from Table 1) when compounded and blended with p(HA) polymer had approximately similar chlorine amount on the surface after 2nd and 3rd re-chlorination cycle. However, chlorine amount on the surface was increased by about 10-fold from 3E+14 atoms/$cm^2$ after 1st chlorination to about 5E+15 atoms/$cm^2$ (for sample #1) and 2E+15 atoms/$cm^2$ (for sample #2) after 4th and 5th re-chlorination cycle. PP-p(HA) (e.g., 5 wt % p(HA)) compounded coupons (e.g., sample #4, #6, and #8 from Table 2) showed a significant increase in chlorine levels after 2nd re-chlorination cycle. The chlorine amount on the surface was increased from about 2E+14 atoms/$cm^2$ after 1st chlorination to approximately 2E+15 atoms/$cm^2$ after 2nd re-chlorination cycle.

However, p(HA-co-SBMA)-2 compounded PP films showed no change or decrease in chlorine amount after 2nd and 3rd re-chlorination cycles. PP-p(HA-SBMA)-2 [0.5 w %](sample #12 from Table 2) with lower amounts of polymer additive had approximately similar amounts of chlorine on the surface after 2nd and 3rd re-chlorination process. Chlorine amount on the surface of PP-p(HA-SBMA)-2 [2.5 w %] (sample #13 from Table 2), which had 2.5 wt % p(HA-co-SBMA)-2 additive in the structure, slightly decreased from 9.24E+15 atoms/$cm^2$ after 1st chlorination to approximately 4.5E+15 atoms/$cm^2$ after 2nd and 3rd re-chlorination cycle. However, when PP-p(HA-SBMA)-2 [5 w %] (sample #14 from Table 2) was re-chlorinated, the amount of chlorine measured on the surface decreased significantly. Chlorine amount on the surface of PP-p(HA-SBMA)-2 [5 w %] coupons decreased from 2.23E+16 after 1st chlorination 8.6E+15 after 2nd re-chlorination. Chlorine levels for sample #14 stabilized after 2nd re-chlorination did not change after 3rd re-chlorination cycle.

P(HA-co-SBMA)-2 compounded PVC films showed similar trend to p(HA-co-SBMA)-2 compounded PP films. The chlorine amount of PVC-P(HA-SBMA)-2 compounded coupons (sample #15, #16, and #17 from Table 4) decreased after 2nd re-chlorination cycle. This observation could be attributed to p(HA-co-SBMA)-2 polymer loss from the PP and PVC resin matrix during re-chlorination process.

TABLE 6

The average oxidative chlorine values ($Cl^+$ atoms/$cm^2$) of re-chlorinated p(HA) and p(HA-co-SBMA)-2N-halamine precursor polymer compounded PP, PE, and PVC films

| Sample ID | Sample Specifications | Re-chlorination cycles | pH of NaOCl | Storage Time (h) | Average [$Cl^+$] (atoms/$cm^2$) |
|---|---|---|---|---|---|
| 1 | PP-p(HA)-[5 w %] | $2^{nd}$ | 6 | 16 | 2.92E+14 |
| | | $3^{rd}$ | 5 | 4.5 | 4.37E+14 |
| | | $4^{th}$ | 5 | 16 | 6.56E+15 |
| | | $5^{th}$ | 5 | 168 | 4.88E+15 |
| 2 | PP-p(HA)-[5 w %] | $2^{nd}$ | 6 | 16 | 2.92E+14 |
| | | $3^{rd}$ | 5 | 4.5 | 3.64E+14 |
| | | $4^{th}$ | 5 | 16 | 2.04E+15 |
| | | $5^{th}$ | 5 | 168 | 2.48E+15 |
| 4 | PP-P(HA)-[5 w %] | $2^{nd}$ | 5 | 16 | 2.41E+15 |
| 6 | PP-P(HA)-[5 w %] | $2^{nd}$ | 5 | 16 | 2.04E+15 |
| 8 | PP-P(HA)-[5 w %] | $2^{nd}$ | 5 | 16 | 1.98E+15 |
| 12 | PP-p(HA-SBMA)-2 [0.5 w %] | $2^{nd}$ | 5 | 24 | 9.07E+14 |
| | | $3^{rd}$ | 5 | 24 | 6.48E+14 |
| 13 | PP-p(HA-SBMA)-2 [2.5 w %] | $2^{nd}$ | 5 | 24 | 4.62E+15 |
| | | $3^{rd}$ | 5 | 24 | 4.49E+15 |

TABLE 6-continued

The average oxidative chlorine values ($Cl^+$ atoms/$cm^2$) of re-chlorinated p(HA) and p(HA-co-SBMA)-2N-halamine precursor polymer compounded PP, PE, and PVC films

| Sample ID | Sample Specifications | Re-chlorination cycles | pH of NaOCl | Storage Time (h) | Average [$Cl^+$] (atoms/$cm^2$) |
|---|---|---|---|---|---|
| 14 | PP-p(HA-SBMA)-2 [2.5 w %] | $2^{nd}$ | 5 | 24 | 8.60E+15 |
| | | $3^{rd}$ | 5 | 24 | 8.60E+15 |
| 15 | PVC-P(HA-SBMA)-2 [0.5 w %] | $2^{nd}$ | 5 | 24 | 6.07E+15 |
| 16 | PVC-P(HA-SBMA)-2 [2.5 w %] | $2^{nd}$ | 5 | 24 | 2.54E+16 |
| 17 | PVC-P(HA-SBMA)-2 [5.0 w %] | $2^{nd}$ | 5 | 24 | 3.94E+16 |

Example 11: Characterization of p(HA) and p(HA-Co-SBMA)-2 N-Halamine Precursor Blended Polymer Films

Thermal Gravimetric Analysis (TGA)

Thermal gravimetric analysis (TGA) of p(HA) and p(HA-co-SBMA)-2 N-halamine precursor polymer additives, PP, PE, PVC polymer resins, and N-halamine precursor compounded PP, PE, and PVC polymer resins was determined (e.g., using TA Instruments Q500 TGA equipped with temperature control furnace). Samples (e.g., coupons) were measured in inert (nitrogen) atmosphere at a flow rate of 40 mL/min. The samples were heated from 20° C. to 600° C. at a heating rate of 10° C./min.

Extrapolated onset temperature (To) and the 1 st derivative peak temperature ($T_p$) of p(HA) and p(HA-co-SBMA)-2 N-halamine precursor polymer additives, PP, PE, PVC polymer resins, and N-halamine precursor compounded PP-p (HA)-[5 w %], PE-p(HA-co-SBMA)-[5 w %] and PVC-p (HA-co-SBMA)-2-[5 w %] films by TGA analysis are provided in Table 7.

Extrapolated onset temperature (To) denotes the decomposition temperature at which the weight loss begins. Decomposition temperatures of p(HA) and p(HA-co-SBMA)-2 N-halamine precursor polymer were 300° C. and 281° C., respectively. The first decomposition temperatures of the PP, PE, and PVC resins were 345° C., 407° C., and 195° C., respectively. When these polymers were blended with p(HA) and p(HA-co-SBMA)-2 additives, decomposition temperature of compounded films increased slightly. The first decomposition temperatures of PP-p(HA)-[5 w %], PE-p(HA-co-SBMA)-1[5 w %] and PVC-p(HA-co-SBMA)-2[5 w %] were recorded at 350° C., 416° C., and 198° C., respectively. The compounding with N-halamine precursor polymer did not affect the decomposition temperatures of the compounded films. PVC pure resin and p(HA-co-SBMA)-2 compounded PVC blend decompose further at higher temperatures (FIGS. 1-4).

TABLE 7

TGA analysis of p(HA) and p(HA-co-SBMA)-2 polymers, PP, PE, PVC polymer resins and N-halamine precursor compounded PP-p(HA) [5 w %], PE-p(HA-co-SBMA)-1 [5 w %] and PVC- p(HA-co-SBMA)-2 [5 w %] blend films.

| Sample Name | $T_O$ (° C.) | $T_P$ (° C.) |
|---|---|---|
| p(HA) | 300 | 321 |
| p(HA-co-SBMA)-2 | 281 | 316 |
| PP | 345 | 441 |
| PP-p(HA)-[5 w %] | 350 | 458 |
| PE | 407 | 461 |
| PE-p(HA-co-SBMA)-1[5 w %] | 416 | 459 |
| PVC | 195/259/441 | 232/268/463 |
| PVC-p(HA-co-SBMA)-2[5 w %] | 198/263/432 | 217/281/455 |

Differential Scanning Calorimetry (DSC) Analysis

Differential Scanning Calorimetry (DSC) of p(HA) and p(HA-co-SBMA)-2N-halamine precursor polymer additives, PP, PE, PVC polymer resins and N-halamine precursor compounded PP, PE, and PVC polymer resins was determined (e.g., by using TA Instruments DSC Q2000). Samples (e.g., coupons) were measured in inert (nitrogen) atmosphere (e.g., at a flow rate of 50 mL/min). The samples were heated (e.g., from 20° C. to 250° C. at a heating rate of 10° C./min). Melting temperatures (Tm) and glass transition (Tg) were calculated according to the peak endotherm on the second heating cycle. Crystallization temperatures (Tc) were calculated according to the peak exotherms of the first cooling cycle. Results are provided in Table 8.

TABLE 8

DSC analysis of p(HA) and p(HA-co-SBMA)-2 polymers, PP, PE, PVC polymer resins and N-halamine precursor compounded PP-p(HA)-[5 w %], PE-p(HA-co-SBMA)-1[5 w %] and PVC- p(HA-co-SBMA)-2[5 w %] blend films.

| Sample Name | $T_g$ (° C.) | $T_m$ (° C.) | $T_c$ (° C.) |
|---|---|---|---|
| p(HA) | 221 | N/A | N/A |
| p(HA-co-SBMA)-1 | 224 | N/A | N/A |
| P(HA-co-SBMA)-2 | 225 | N/A | N/A |
| PP | N/A | 163 | 114 |
| PE | N/A | 130 | 112 |
| PVC | N/A | 121 | 67 |
| PP-p(HA-co-SBMA)-2[5 w %] | N/A | 162 | 120 |
| PE-p(HA-co-SBMA)-1[5 w %] | N/A | 127 | 117 |
| PVC- p(HA-co-SBMA)-1[5 w %] | N/A | 122 | 69 |
| PVC-p(HA-co-SBMA)-2[5 w %] | N/A | 122 | 68 |

Scanning Electron Microscopy (SEM) and Energy-Dispersive X-Ray (EDX) Analysis

SEM with energy-dispersive X-ray (EDX) was used to characterize sample morphology of a variety of PP-p(HA-co-SBMA). Samples were sputter-coated with gold/palladium to ensure electrical conductivity.

All samples were smooth and homogeneous with visible surface dents and particles in micro-scale. Addition of p(HA-co-SBMA) did not significantly increase the number of visible particles or surface defects of either PP or PVC samples. Chlorination did not change surface morphology of any sample. EDX images of chlorine indicated a negligible amount of chlorine was on the control and unchlorinated PP-p(HA-SBMA) samples but existed and evenly distributed on the surface of chlorinated PP-p(HA-SBMA) samples.

Figure 5:
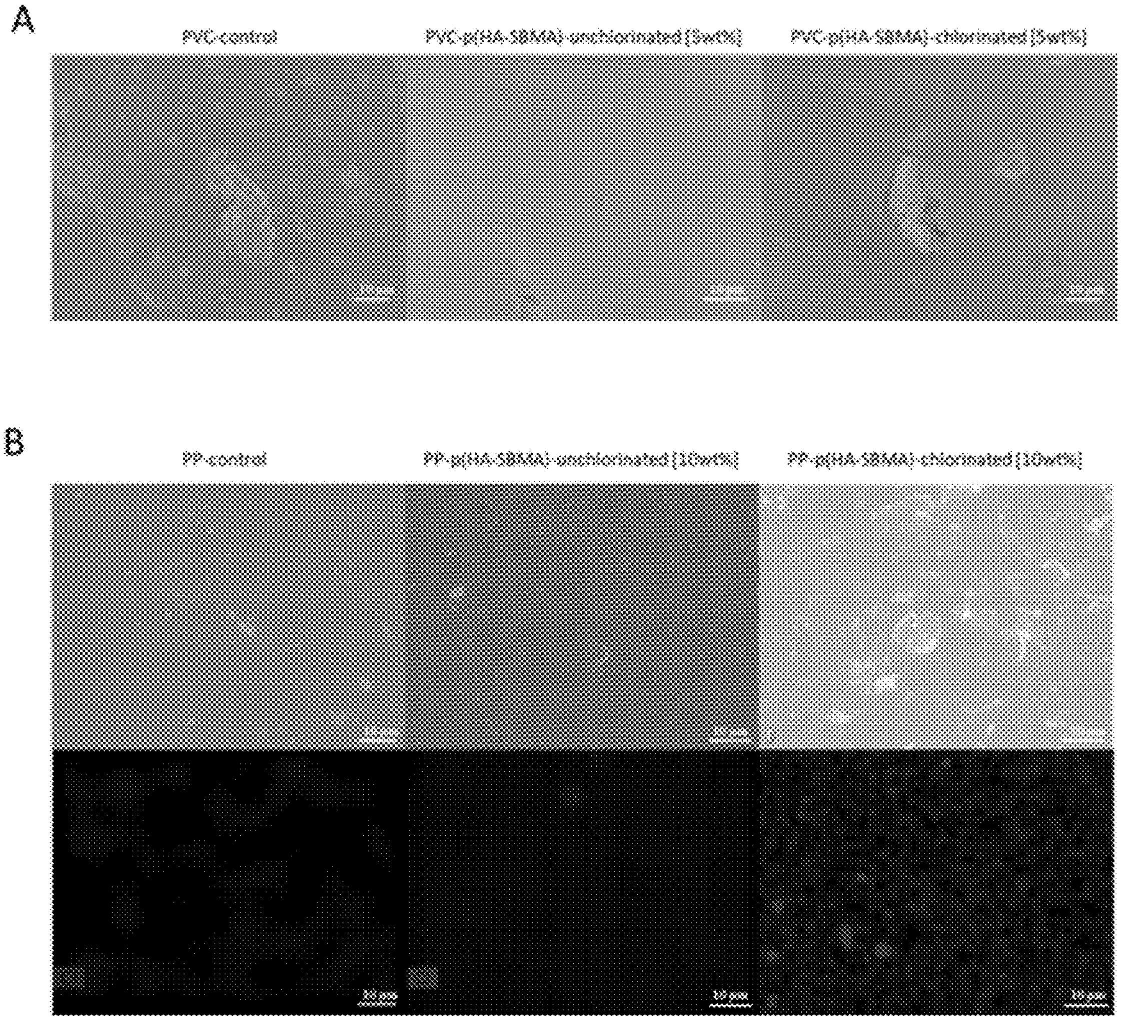
FIG. 5 shows SEM images of (A) PVC samples with addition of 5 wt % p(HA-SBMA), before or after chlorination; and (B) PP samples with addition of 10 wt % p(HA-SBMA), before or after chlorination, together with surface chlorine distribution maps characterized using Energy-Dispersive X-ray (EDX). Bright spots represent chlorine. All scale bars represent 10 μm.

FIG. 5 shows SEM images of (A) PVC samples with addition of 5 wt % p(HA-SBMA), before or after chlorination; and (B) PP samples with addition of 10 wt % p(HA-SBMA), before or after chlorination, together with surface chlorine distribution maps characterized using Energy-Dispersive X-ray (EDX). Bright spots represent chlorine. All scale bars represent 10 m.

Example 12: Antimicrobial Efficacy Test

Since samples as disclosed herein comprising poly(HA-co-SBMA)-2 (e.g., with lower molecular weight with chain transfer agents) showed higher chlorine content and overall better appearance for both PP and PVC samples, they were tested for antimicrobial efficacy. In addition, a commercial brand silver particle compounded PP plastic was also included in the test as a control to compare the efficacy.

Antibacterial Efficacy Test

The antimicrobial efficacy was evaluated following EPA Interim Method for Evaluating the Efficacy of Antimicrobial Surface Coatings (Date Revised Oct. 20, 2020). *Staphylococcus aureus* ATCC #6538 was used in this test. Briefly, a single colony of bacteria was transferred to 10 mL of Tryptic soy broth (TSB) and incubated at 37° C. for 16 h. The culture was prepared through centrifugation at 3,000 RPM for 4 min, removing supernatant, adding equal amount of phosphate buffer saline (PBS), resuspending, and washed twice with PBS and repeat for 3 times, and finally resuspended in BPB buffer. Then, the solution was diluted (e.g., to 1:25) and a soil load containing 0.25% Bovine Serum Albumin and 0.08% Bovine Mucin, and 0.35% Yeast Extract was added into the solution and an inoculum was prepared. For antimicrobial testing, a 20 μL aliquot of the inoculum (e.g., about $1\times10^6$ CFU/mL bacteria) was added to the center of the square coupon (1×1 $inch^2$) and spread out evenly and dried at room temperature. At the contact time of 2 h, the coupons were completely dried and transferred to 20 mL of a neutralizer solution (e.g., $Na_2S_2O_3$ solution, 0.05 N). The carriers in neutralizer solution were vigorously vortexed for 30 seconds and sonicate for 5 minutes±30 seconds at 45 Hz to suspend any surviving organism in the neutralizer. Ten-fold serial dilutions were made for all samples, and each dilution was plated using a membrane filtration method and incubated in trypticase soy agar (TSA) plates at 37° C. for 48 h. Bacterial colonies were enumerated and recorded for biocidal efficacy analysis. The log density of Colony Forming Units (CFU) was calculated using the following equation: bacterial number ($\log_{10}$ CFU/sample)=$\log_{10}$[(bacterial counts on agar plate×dilution factor×20 mL)/(0.02 mL)]. Then mean log density was calculated by average of three carriers in each group and log reduction was calculated through comparing with control samples. The detection limit of this assay can be 1 Log CFU/sample (0.00 Log CFU/sample).

As provided in Table 9, after being chlorinated with 1:10 dilution of house bleach (e.g., pH 7), PP modified with 5% p(HA-SBMA)-2 exhibited a complete elimination of all inoculated *S. aureus* in within 2 hour of contact time, which translates to 5.76 log reduction. This exceeds the criteria of supplemental residual antimicrobial products (3-log reduction in <2 hours). Although PP modified with 2.5% p(HA-SBMA)-2 did not achieve 3-log reduction (e.g., 1.77 log reduction), it has potential to achieve 3-log reduction after some optimization to make the sample more evenly distributed into the polypropylene substrate. In comparison, a commercial silver-modified sample only showed very minimal bactericidal efficacy (e.g., 0.27 log reduction). This is within expectation because the silver ions distributed within the PP structure is very low (e.g., less than 0.1% w/w). Also, most silver ions are immobilized in the polymer structure of PP and will not be available and only silver ions on the very top layer would be able to migrate and exhibit antimicrobial efficacy and the antimicrobial function is relatively slow.

TABLE 9

Antibacterial efficacy of p(HA-SBMA)-2 modified PP with 2 h contact time and comparison with a commercial silver PP.

| Samples | Average [$Cl^+$] (atoms/$cm^2$) | Log CFU/sample Mean | Log CFU/sample SD | Log reduction (compared to control) |
|---|---|---|---|---|
| PP-control | 0 | 5.76 | 0.07 | — |
| PP-p(HA-SBMA)-2 [0.5 w %] | 9.94E+14 | 5.60 | 0.15 | 0.17 |
| PP-p(HA-SBMA)-2 [2.5 w %] | 9.24E+15 | 3.99 | 0.14 | 1.77 |
| PP-p(HA-SBMA)-2 [5.0 w %] | 2.23E+16 | 0.00 | 0.00 | 5.76 |
| PP-silver (Brand A) | 0 | 5.49 | 0.04 | 0.27 |

As shown in Table 10, p(HA-SBMA)-2 modified PVC exhibited better efficacy then PP did. PVC modified by 2.5% p(HA-SBMA)-2 showed more than 3 log reduction in 2 hours contact time. 5% p(HA-SBMA)-2-modified PVC showed a complete elimination of all inoculated bacteria (e.g., 5.33 log reduction). As a control, the silver modified PP exhibited consistent minimum log reduction (e.g., about 0.22 log reduction) in the second test.

TABLE 10

Antibacterial efficacy of p(HA-SBMA)-2 modified PVC with 2 h of contact time and comparison with a commercial silver PP.

| Samples | Average [$Cl^+$] (atoms/$cm^2$) | Log CFU/sample Mean | Log CFU/sample SD | Log reduction (compared to control) |
|---|---|---|---|---|
| PVC-control | 0 | 5.33 | 0.35 | — |
| PVC-p(HA-SBMA)-2 [0.5 w %] | 1.44E+16 | 4.82 | 0.14 | 0.51 |
| PVC-p(HA-SBMA)-2 [2.5 w %] | 7.50E+16 | 1.71 | 1.27 | 3.61 |
| PVC-p(HA-SBMA)-2 [5.0 w %] | 1.03E+17 | 0.00 | 0.00 | 5.33 |
| PP-silver (Brand A) | 0 | 5.11 | 0.06 | 0.22 |

In some embodiments, the p(HA-SBMA)-2 modified polymeric films may exhibit comparable (e.g., substantially the same) efficacy against both gram-positive and gram-negative bacteria.

Antiviral Efficacy Test

The antimicrobial efficacy was evaluated following ASTM E1053 and EPA Interim Method for Evaluating the Efficacy of Antimicrobial Surface Coatings. Transmissible Gastroenteritis Virus (TGEV, ATCC® VR-1740™) stock solution was amplified in Swine Testicular (ST) cells (ATCC CRL-1746) and stored in single-use aliquots under −80° C. The inoculum was prepared by mixing defrosted aliquot with soil loads to achieve a final soil content of 0.25% Bovine Serum Albumin, 0.08% Bovine Mucin and 0.35% Yeast Extract. A hundred microliter of the prepared inoculum (~$1\times10^4$ fifty-percent-tissue-culture-infective-dose ($TCID_{50}$) virus) was applied onto the center of the square coupons (1 $inch^2$), spread out evenly, and let dry in biological safety hood. After 2 h or 8 h of contact, corresponding samples were immersed in 10.0 mL of Dulbecco's modified eagle's medium (DMEM) medium and agitated by vortex for 30 s to recover remaining virus. The recovered virus suspensions were 10-fold serially diluted. Viral infectivity titers before and after contact with samples were assessed by the 50% tissue culture infective dose ($TCID_{50}$) method. Briefly, ST cells were placed in 96-well plates and incubated until 70-80% confluent was reached. Each well was infected with 100 μL of corresponding dilutions with 10 replicates per dilution. The virus solutions were incubated with cell monolayers at 37° C. with 5% $CO_2$ for 1-2 h before addition of another 100 μL of DMEM supplemented with 10% fetal bovine serum (FBS). The plates were then allowed to develop in 37° C. incubator with 5% $CO_2$ for 4 days to allow full cytopathic effects (CPE) to develop. Subsequently, the plates were fixed with 10% paraformaldehyde solution for 1 h and stained with 1% crystal violet solution for 20 min. After a full wash with water, wells of the microtiter plate that were not stained by crystal violet were considered infected by virus, and wells showing purple stain were considered not infected by virus. The $TCID_{50}$ was calculated using the Reed-Muench method.

Briefly, inoculum TGEV (ATCC® VR1740) in the presence of 0.25% Bovine Serum Albumin, 0.08% Bovine Mucin, and 0.35% Yeast Extract soil load. PVC-P(HA-SBMA)-2 [5.0 w %] chlorine content was about 1.03E+17 atoms/$cm^2$. PP-P(HA-SBMA)-2 [5.0 w %] chlorine content was about 2.23E+16 atoms/$cm^2$.

As provided in Table 11, 5 wt % p(HA-SBMA)-2-modified PVC achieved more 3.65 log reduction in 2 hours. Although 5 wt % p(HA-SBMA)-2-modified PP only achieved 0.44 log reduction in 2 h, the 5 wt % p(HA-SBMA)-2-modified PP achieved 1.32 log reduction after the contact time being extended to 8 h. Silver-PP showed no significant reduction in 2 and 8 h. These results indicate p(HA-SBMA)-2 modified PP and PVC has potential to pass the EPA residual supplemental antiviral surface claim (3-log reduction in 2 h). In Table 11, the symbol "*" refers to being below the limit of detection (e.g., 1.50 Log $TCID_{50}$).

TABLE 11

Antiviral efficacy of p(HA-SBMA)-2 modified PP and PVC at different contact times.

| | 2 h | | | 8 h | | |
|---|---|---|---|---|---|---|
| | Log $TCID_{50}$ | | Log reduction (compared | Log $TCID_{50}$ | | Log reduction (compared |
| Samples | Mean | SD | to control) | Mean | SD | to control) |
| PVC-control | 3.65 | 0.15 | — | 2.92 | 0.17 | — |
| PVC-p(HA-SBMA)-2 [5.0 w %] | 0.00* | 0.00 | 3.65 | 0.00* | 0.00 | 2.92 |
| PP-p(HA-SBMA)-2 [5.0 w %] | 3.06 | 0.44 | 0.60 | 1.60 | 0.04 | 1.32 |
| PP-silver (brand A) | 3.45 | 0.10 | 0.20 | 2.98 | 0.36 | −0.06 |

The antiviral efficacy of HaloAdd-modified PP and PVC was tested. Briefly, inoculum TGEV (ATCC VR1740) in the presence of 0.25% Bovine Serum Albumin, 0.08% Bovine Mucin and 0.35 Yeast Extract soil load was determined. PVC-P(HA-SBMA)-2 [5.0 w %] chlorine content: 1.03E+17 atoms/$cm^2$; PP-P(HA-SBMA)-2 [10.0 w %] chlorine content 6.31E+16 atoms/$cm^2$; PP-P(HA-SBMA)-2 [20.0 w %] chlorine content 1.43E+17 atoms/$cm^2$. *Below limit of detection: 1.50 Log $TICD_{50}$.

500 HaloAdd-modified PVC achieved more than a 3.73 log reduction in 2 hours, and 20% HaloAdd-modified PP achieved more than a 3.71 log reduction where the 1000 HaloAdd-modified PP achieved more than a 2.62 log reduction in 2 hours. The log reductions correlated with the chlorine content with both 5% HaloAdd-modified PVC and 20% HaloAdd-modified PP with chlorine contents over 1.0 E+17 atoms/$cm^2$ and the 10% HaloAdd-modified PP at approximately 6.3E+16 atoms/$cm^2$. Table 12 shows the antiviral efficacy of HaloAdd-modified PP and PV within 2 h of contact time.

TABLE 12

| | Log $TCID_{50}$ | | Log reduction (compared |
|---|---|---|---|
| Samples | Mean | SD | to control) |
| PVC-control | 3.73 | 0.23 | — |
| PVC-p(HA-SBMA)-2 [5.0 w %] | 0.00* | 0.00 | 3.73 |
| PP-control | 3.71 | 0.29 | — |
| PP-p(HA-SBMA)-2 [10.0 w %] | 1.09 | 0.95 | 2.62 |
| PP-p(HA-SBMA)-2 [20.0 w %] | 0.00* | 0.00 | 3.71 |

Table 13 shows that 20% HaloAdd-modified PP achieved more than a 2.74 log reduction, and the samples with either cycles of dry abrasion or 40 cycles of abrasion with 2000 ppm of chlorine (ch(A)) achieved reductions of 3.17 log and 3.38 log, respectively, in 2 hours. The abrasion did not have deleterious effect of any antiviral abilities of the HaloAdd modified PP. Samples that received abrasion treatment exhibited an increase in antiviral effects. The results indicate that HaloAdd-modified plastic can maintain high-level of antiviral efficacy (>3 log reduction in 2 hours of contact time) even after one-week of repeated touch without regular cleaning/disinfection (10 cycle of dry abrasion) or one-month if regularly washed/cleaned with chlorine cleaners/disinfectants (40 cycles of Chemical A).

Inoculum TGEV (ATCC VR763) was prepared in the presence of 0.25% Bovine Serum Albumin, 0.08% Bovine Mucin and 0.35% Yeast Extract soil load. PP-P(HA-SBMA)-2 [20.0 w %] chlorine content 1.43E+17 atoms/cm2. PP-P(HA-SBMA)-2 [20.0 w %] 10 cycles dry abrasion chlorine content 8.94E+16 atoms/cm2. PP-P(HA-SBMA)-2 [20.0 w %] 40 cycles abrasion with ch(A) chlorine content 9.04E+16 atoms/cm2. *Some replicates below limit of detection: 1.50.

TABLE 13

Antiviral efficacy (2 h contact time) of HaloAdd modified PP with and without chemical/abrasion

| Samples | Log $TCID_{50}$ Mean | Log $TCID_{50}$ SD | Log reduction (compared to control) |
|---|---|---|---|
| PP-control | 4.61 | 0.09 | — |
| PP-p(HA-SBMA)-2 [20.0 w %] | 1.77 | 0.37 | 2.74 |
| PP-p(HA-SBMA)-2 [20.0 w %] 10 cycles of dry abrasion | 1.45* | 0.07 | 3.17 |
| PP-p(HA-SBMA)-2 [20.0 w %] 40 cycles of abrasion with ch(A) | 1.24* | 0.12 | 3.38 |

Example 13: Anti-Adhesion/Anti-Attachment Efficacy 2 mg/mL fluorescein isothiocyanate-labeled fibrinogen (FITC-fibrinogen) was put in contact with 1×1 $inch^2$ square sample coupons for 1 h under ambient temperature. Sample coupons were then dip-rinsed in sterile DI water and inspected immediately under fluorescence microscope. Fouling was expressed by mean fluorescence strength quantified via ImageJ. Each test was done in triplicate. An overnight culture of *Escherichia coli* (*E. coli*, ATCC 25922) was contacted with 1×1 $inch^2$ square sample coupons for 1 h and stained with BacLight LIVE/DEAD staining kit for 30 min. The samples were inspected under fluorescence microscope without any rinsing or cleaning. Adhesion was expressed by the numbers of bacterial cells normalized to the actual size of the field of vision. Bacterial cells were counted via ImageJ. Each test was done in triplicate.

Figure 6:
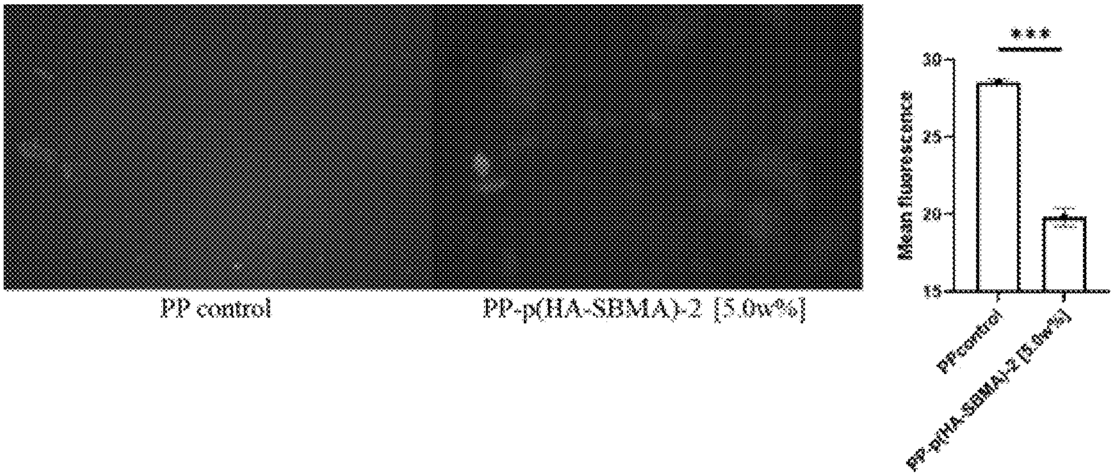
FIG. 6 shows the antifouling efficacy of HaloAdd-modified PP against FITC-fibrinogen.
Figure 7:
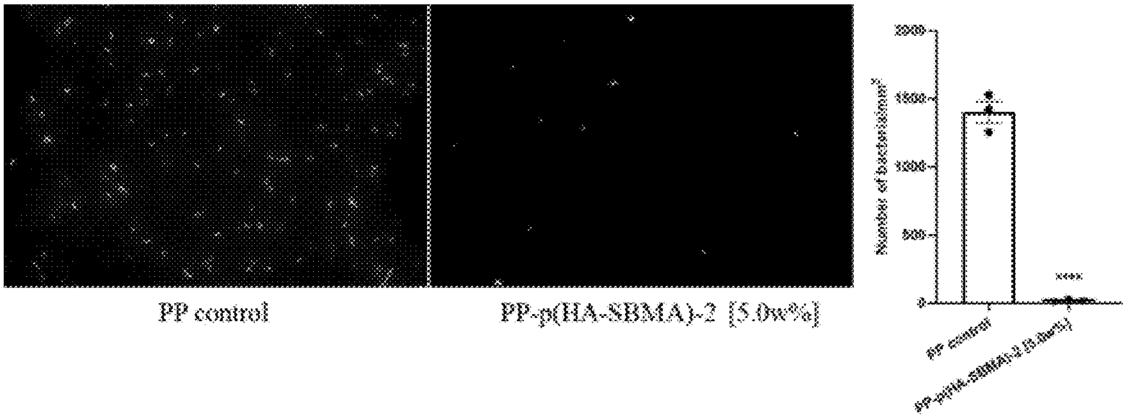
FIG. 7 shows the antifouling efficacy of HaloAdd-modified PP against *E. Coli.*

As shown in FIG. 6, HaloAdd-modified PP showed significant reduction against non-specific adsorption of FITC-fibrinogen. PP modified with 5% HaloAdd showed a 30.6% reduction compared to unmodified PP. PP modified with HaloAdd against *E. coli* attachment showed a dose-dependent descending trend in respect of percentage of HaloAdd (FIG. 7). PP modified with 5% HaloAdd showed a 99% reduction in *E. coli* attachment compared to unmodified PP.

Example 14: Anti-Biofilm Efficacy 3 pieces of 1×1 $inch^2$ square sample coupons were immersed in 20 mL of Brain-Heart Infusion (BHI) broth with 200 μL overnight culture of *Pseudomonas aeruginosa* (*P. aeruginosa*, ATCC 15442). After 48 h culture at 37° C. with 120 rpm shaking, sample coupons were taken out and dried in a clean sterile petri-dish. The sample coupons were let dry aseptically in a biosafety hood for 48 h, and then rehydrated in 20 mL fresh BHI broth for 24 h. This dry-rehydrate process was repeated twice. After the third drying cycle, samples were stained using BacLight LIVE/DEAD staining kit for 1 h, dip-rinsed twice in DI water, and inspected immediately under fluorescence microscope.

Figure 8:
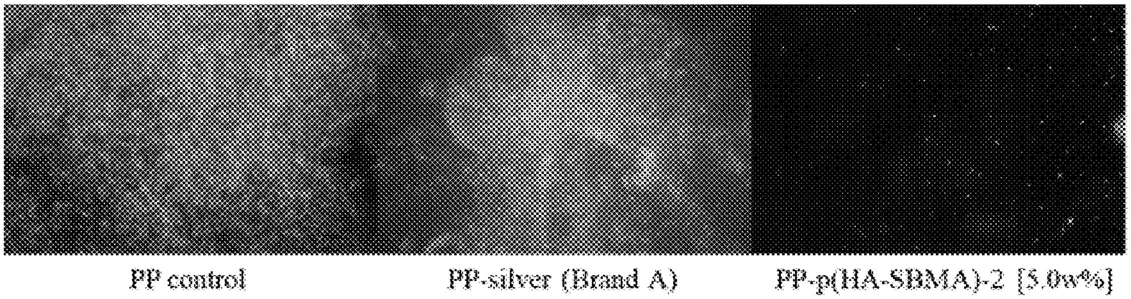
FIG. 8 shows the antibiofilm efficacy of HaloAdd-modified PP against *P. aeruginosa.*

FIG. 8 shows the antibiofilm efficacy demonstrated by the fluorescence of live and dead bacteria on the surface of PP control, PP-silver (Brand A), and PP-p(HA-SBMA)-2 [5.0 w %]. PP control showed a large population of both live and dead bacterial cells attached on the surface uniformly, indicating a well-formed biofilm on the surface. PP-silver (Brand A) showed similar level of cell attachment for both live and dead cells. PP-p(HA-SBMA)-2 [5.0 w %] showed a significant lower level of bacterial attachment, benefited from the antifouling performance. The antibiofilm test proved that PP-p(HA-SBMA)-2 [5.0 w %] has significantly improved anti-biofilm efficacy (better can commercial silver product).

Other Chlorine-Donating Agents

Chlorination of with a commercial sodium dichloro-s-triazinetrione (NaDCC) tablet: An aqueous solution of Titan 4306 was prepared by dissolving 4 tablets of 13.3 g Titan Tabs Sporicidal Disinfectant Cleaner (active ingredient: sodium dichloro-s-triazinetrione) into 1 gallon of deionized water. The pH of the chlorine solution was 6.5. The solution was sprayed on horizontally placed PP-P(HA-SBMA)-2 [5.0 w %], [10.0 w %], [20.0 w %] and [30.0 w %] 1×1 $inch^2$ coupons at a distance of 6-8 inches until both sides of the surfaces were fully wettened. The coupon surfaces were wettened for 4 minutes. After the chlorination process, the coupons were wiped by deionized water wettened microfiber cloth (Titan 4306*1). After the chlorination reaction and drying process, coupons were kept in a closed container at ambient conditions until iodometric titration of the chlorinated coupons. Samples were sufficiently cleaned by sonication in deionized water for 2 hours after titration. The same set of PP-P(HA-SBMA)-2 [10.0 w %], [20.0 w %] and [30.0 w %] coupons were chlorinated by Titan 4306 solution horizontally on both sides. The surfaces of coupons were kept wet for 4 minutes before wiped with deionized water wettened Microfiber. After the $1^{st}$ cycle of chlorination process, the coupons were treated with Titan 4306 for 4 minutes for the $2^{nd}$ cycle before wiped with deionized water wettened Microfiber (Titan 4306*2). After these 2 cycles of chlorination reaction and drying process, coupons were kept in a closed container at ambient conditions for about 24 h until titration.

Chlorination of with a commercial stabilized sodium hypochlorite formulation: An aqueous solution of Liqu-A-Klor 600 (LAK 600) was prepared by diluting 3 mL of Diversey™ Liqu-A-Klor™ solution (active ingredient: sodium hypochlorite 5.25%) into 247 mL deionized water. The pH of the LAK 600 was measured to be 12.1 after the liquid was well mixed. The solution was sprayed on horizontally placed PP-P(HA-SBMA)-2 [10.0 w %], [20.0 w %] and [30.0 w %] 1×1 $inch^2$ coupons at a distance of 6-8 inches until both sides of the surfaces were fully wettened. Allow the coupon surfaces to remain wet for 10 minutes. After the chlorination process, the coupons were left drain in the air at ambient conditions until the surface were fully dried (LAK 600*1). After the chlorination reaction and drying process, coupons were kept in a closed container at ambient condition until iodometric titration of the chlorinated coupons. Samples were sufficiently cleaned by sonication in deionized water for 2 hours after titration. The same set of PP-P(HA-SBMA)-2 [10.0 w %], [20.0 w %] and [30.0 w %] coupons were chlorinated by LAK 600 solution horizontally on both sides. The surfaces of coupons were kept wet for 10 minutes before left for draining in air at ambient condition. After the $1^{st}$ t cycle of chlorination process, the coupons were treated with LAK 600 for 10 minutes for the $2^{nd}$ cycle before draining (LAK 600*2). After these 2 cycles of chlorination reaction and drying process, coupons were kept in a closed container at ambient conditions for about 24 h until titration.

Results are shown in Table 14, Titan 4306 can charge all HaloAdd modified PP Films (10, 20, and 30 w %) to >1E+16 atoms/cm$^2$ level and the chlorine concentration increased with increased additive percentages. Chlorinating twice in the beginning did not increase the chlorine content, which indicates that a one time application of Titan Tab (4,306 ppm) with dwelling time of 4 min sufficiently charged the surface to be functional level. For LAK 600, the chlorinating efficiency was decreased because the chlorine concentration was lower and pH value was higher. However, >1E+16 atoms/cm$^2$ for [20 w %] and [30 w %] samples was still achieved. Chlorinating twice in the beginning did not significantly increase the chlorine content.

HaloAdd-modified PP could be chlorinated to target chlorine levels with potent antimicrobial efficacy with other chlorine sources under existing registered direction for use, including high concentration of hypochlorous acid (4,306 ppm, 4 min dwell time) made from commercial sodium dichloro-s-triazinetrione tablets (NaDCC) and low concentration of stabilized sodium hypochlorite formulation (600 ppm, pH 12, 10 min dwell time).

TABLE 14

Chlorinating results with other chlorine sources

| Sample ID | Sample Specifications | Re-chlorination cycles | Chlorination Source | Dwell time (min) | Average [$Cl^+$] (atoms/cm$^2$) |
|---|---|---|---|---|---|
| 18 | PP-P(HA-SBMA)-2[10.0 w %] | $1^{st}$ | Titan 4306 *1 | 4 | 1.04E+16 |
| 19 | PP-P(HA-SBMA)-2[20.0 w %] | $1^{st}$ | Titan 4306 *1 | 4 | 2.51E+16 |
| 20 | PP-P(HA-SBMA)-2[30.0 w %] | $1^{st}$ | Titan 4306 *1 | 4 | 3.28E+16 |
| 18 | PP-P(HA-SBMA)-2[10.0 w %] | $2^{nd}$ | Titan 4306 *2 | 4 | 1.06E+16 |
| 19 | PP-P(HA-SBMA)-2[20.0 w %] | $2^{nd}$ | Titan 4306 *2 | 4 | 2.33E+16 |
| 20 | PP-P(HA-SBMA)-2[30.0 w %] | $2^{nd}$ | Titan 4306 *2 | 4 | 2.95E+16 |
| 18 | PP-P(HA-SBMA)-2[10.0 w %] | $3^{rd}$ | LAK 600 *1 | 10 | 3.50E+15 |
| 19 | PP-P(HA-SBMA)-2[20.0 w %] | $3^{rd}$ | LAK 600 *1 | 10 | 1.24E+16 |
| 20 | PP-P(HA-SBMA)-2[30.0 w %] | $3^{rd}$ | LAK 600 *1 | 10 | 1.31E+16 |
| 18 | PP-P(HA-SBMA)-2[10.0 w %] | $4^{th}$ | LAK 600 *2 | 10 | 4.67E+15 |
| 19 | PP-P(HA-SBMA)-2[20.0 w %] | $4^{th}$ | LAK 600 *2 | 10 | 1.09E+16 |
| 20 | PP-P(HA-SBMA)-2[30.0 w %] | $4^{th}$ | LAK 600 *2 | 10 | 1.46E+16 |

Embodiments

The following non-limiting embodiments provide illustrative examples of the invention, but do not limit the scope of the invention.

Embodiment A1. A sample of a polymer, wherein the polymer comprises a repeating unit having a side chain that comprises a nitrogen-containing heterocycle, wherein:

(i) the nitrogen-containing heterocycle forms an N-halamine when exposed to an electrophilic halogen source, and (ii) a number average molar mass of the polymer in the sample is at least about 52 kilodaltons (kDa).

Embodiment A2. The sample of embodiment A1, wherein the number average molar mass is from about 80 kDa to about 500 kDa.

Embodiment A3. The sample of embodiment A1 or A2, wherein the number average molar mass is from about 100 kDa to about 120 kDa.

Embodiment A4. The sample of any one of embodiments A1-A3, wherein the number average molar mass is determined by a gel permeation chromatograph.

Embodiment A5. The sample of any one of embodiments A1-A4, wherein a polydispersity of the polymer sample is from about 1 to about 4 as determined by a gel permeation chromatograph.

Embodiment A6. The sample of embodiment A5, wherein the polydispersity of the polymer sample is from about 2.5 to about 3.0.

Embodiment A7. The sample of any one of embodiments A1-A7, wherein the nitrogen-containing heterocycle comprises a hydantoin group.

Embodiment A8. The sample of embodiment A7, wherein the hydantoin group has the structure:

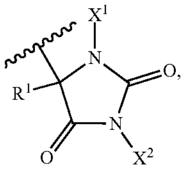,

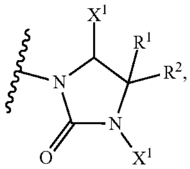, or

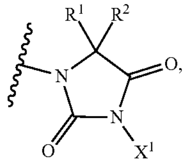

wherein:

$X^1$ is H or halogen, $X^2$ is H or halogen, $R^1$ is H or $C_1$-$C_4$ alkyl, and $R^2$ is H or $C_1$-$C_4$ alkyl.

Embodiment A9. The sample of embodiment A7 or A8, wherein the hydantoin group has the structure:

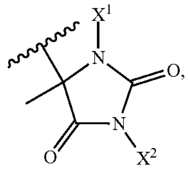

wherein: $X^1$ is H or halogen, and $X^2$ is H or halogen.

Embodiment A10. The sample of any one of embodiments A1-A9, wherein the repeating unit has the structure:

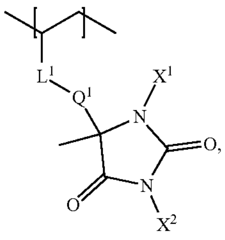

wherein: $L^1$ is an amide, ester, or arylene group; $Q^1$ is alkylene or absent; $X^1$ is H or halogen; and $X^2$ is H or halogen.

Embodiment A11. The sample of any one of embodiments A1-A10, wherein the repeating unit has the structure:

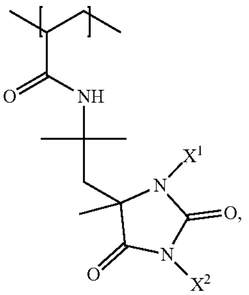

wherein: $X^1$ is H or halogen; and $X^2$ is H or halogen.

Embodiment A12. The sample of embodiment A10 or All, wherein $X^1$ is H and $X^2$ is H.

Embodiment A13. The sample of embodiment A10 or All, wherein $X^1$ is Cl and $X^2$ is Cl.

Embodiment A14. The sample of embodiment A10 or All, wherein one of $X^1$ and $X^2$ is Cl and one of $X^1$ and $X^2$ is H.

Embodiment A15. The sample of any one of embodiments A1-A14, wherein the polymer further comprises an additional repeating unit, wherein the additional repeating unit comprises a non-fouling moiety.

Embodiment A16. The sample of embodiment A15, wherein the repeating unit (RU1) and the additional repeating unit (RU2) are present in the polymer in a molar ratio of about 4:1 to about 1:2 (RU1:RU2).

Embodiment A17. The sample of embodiment A16, wherein the molar ratio of RU1:RU2 is about 2:1.

Embodiment A18. The sample of any one of embodiments A15-A17, wherein the non-fouling moiety comprises a zwitterion.

Embodiment A19. The sample of embodiment A18, wherein the zwitterion comprises a sulfobetaine group.

Embodiment A20. The sample of any one of embodiments A15-A19, wherein the additional repeating unit has the structure:

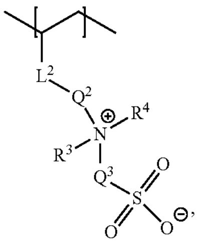

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment A21. The sample of any one of embodiments A15-A20, wherein the additional repeating unit has the structure:

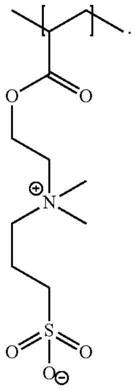

Embodiment A22. The sample of any one of embodiments A15-A21, wherein the non-fouling moiety comprises a polyether.

Embodiment A23. The sample of embodiment A22, wherein the polyether comprises a polyethylene glycol moiety.

Embodiment A24. The sample of embodiment A22, wherein the polyether comprises a polypropylene glycol moiety.

Embodiment A25. The sample of any one of embodiments A15-A19, wherein the additional repeating unit has the structure:

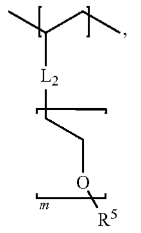

wherein: $L^2$ is an amide or ester group; $R^5$ is hydrogen or alkyl; and m is 1 to 500.

Embodiment A26. The sample of any one of embodiments A15-A19 or A25, wherein the additional repeating unit has the structure:

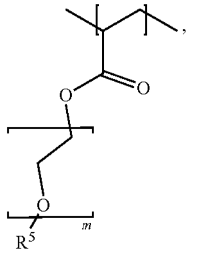

wherein: $R^5$ is hydrogen or alkyl; and m is 1 to 500.

Embodiment A27. The sample of any one of embodiments A1-A26, wherein the polymer is a homopolymer.

Embodiment A28. The sample of any one of embodiments A1-A27, wherein the polymer does not comprise a side-chain that comprises a catechol group.

Embodiment B1. A sample of a polymer, wherein the polymer comprises a repeating unit having a side chain that comprises a nitrogen-containing heterocycle, wherein: (i) the nitrogen-containing heterocycle forms an N-halamine when exposed to an electrophilic halogen source, (ii) a number average molar mass of the polymer in the sample is at least about 18 kilodaltons (kDa), and (iii) the polymer is substantially a homopolymer.

Embodiment B2. The sample of embodiment B1, wherein the number average molar mass is at least about 20 kDa.

Embodiment B3. The sample of embodiment B1, wherein the number average molar mass is from about 18 kDa to about 100 kDa.

Embodiment B4. The sample of any one of embodiments B1-B3, wherein the number average molar mass is determined by a gel permeation chromatograph.

Embodiment B5. The sample of any one of embodiments B1-B4, wherein a polydispersity of the polymer sample is from about 1 to about 4 as determined by a gel permeation chromatograph.

Embodiment B6. The sample of embodiment B1, wherein the nitrogen-containing heterocycle comprises a hydantoin group.

Embodiment B7. The sample of embodiment B6, wherein the hydantoin group has the structure:

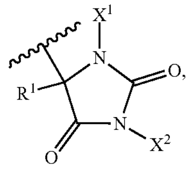
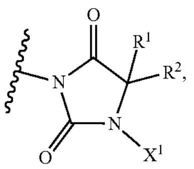 or
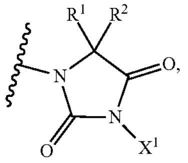

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment B8. The sample of embodiment B6, wherein the hydantoin group has the structure:

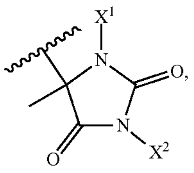

wherein: $X^1$ is H or halogen, and $X^2$ is H or halogen.

Embodiment B9. The sample of any one of embodiments B1-B8, wherein the repeating unit has the structure:

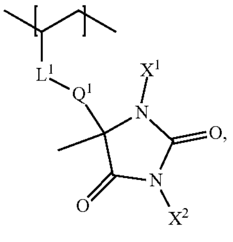

wherein: $L^1$ is an amide, ester, or arylene group; $Q^1$ is alkylene or absent; $X^1$ is H or halogen; and $X^2$ is H or halogen.

Embodiment B10. The sample of any one of embodiments B1-B9, wherein the repeating unit has the structure:

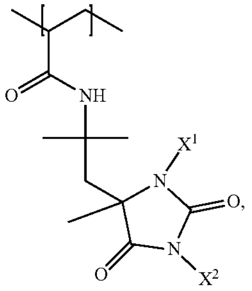

wherein: $X^1$ is H or halogen; and $X^2$ is H or halogen.

Embodiment B11. The sample of embodiment B9 or B10, wherein $X^1$ is H and $X^2$ is H.

Embodiment B12. The sample of embodiment B9 or B10, wherein $X^1$ is Cl and $X^2$ is Cl.

Embodiment B13. The sample of embodiment B9 or B10, wherein one of $X^1$ and $X^2$ is Cl and one of $X^1$ and $X^2$ is H.

Embodiment C1. A sample of a copolymer, wherein the copolymer comprises a first repeating unit and a second repeating unit, wherein: (i) the first repeating unit comprises a nitrogen-containing heterocycle, wherein the nitrogen-containing heterocycle forms an N-halamine when exposed to an electrophilic halogen source, (ii) the second repeating unit comprises a non-fouling moiety, and (iii) a number average molar mass of the copolymer in the sample is at least about 21 kilodaltons (kDa).

Embodiment C2. The sample of embodiment C1, wherein the nitrogen-containing heterocycle is on a side chain of the first repeating unit.

Embodiment C3. The sample of embodiment C1 or $C_2$, wherein the number average molar mass is from about 21 kDa to about 500 kDa.

Embodiment C4. The sample of any one of embodiments C1-C3, wherein the number average molar mass is from about 21 kDa to about 50 kDa.

Embodiment C5. The sample of any one of embodiments C1-C3, wherein the number average molar mass is from about 100 kDa to about 120 kDa.

Embodiment C6. The sample of any one of embodiments C1-C5, wherein the number average molar mass is determined by a gel permeation chromatograph.

Embodiment C7. The sample of any one of embodiments C1-C6, wherein the sample has a polydispersity ranging from about 1 to about 4 as determined by a gel permeation chromatograph.

Embodiment C8. The sample of any one of embodiments C1-C7, wherein the sample has a polydispersity of less than about 2.9.

Embodiment C9. The sample of any one of embodiments C1-C8, wherein the nitrogen-containing heterocycle comprises a hydantoin group.

Embodiment C10. The sample of embodiment C9, wherein the hydantoin group has the structure:

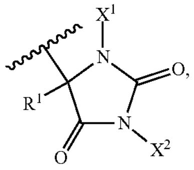
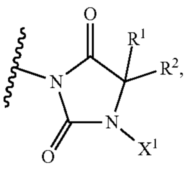 or
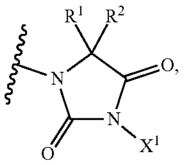

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment C11. The sample of any one of embodiments $C_1$-$C_{10}$, wherein the first repeating unit has the structure:

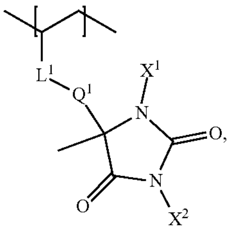

wherein: $L^1$ is an amide, ester, or arylene group; $Q^1$ is alkylene or absent; $X^1$ is H or halogen; and $X^2$ is H or halogen.

Embodiment C12. The sample of embodiment C11, wherein $X^1$ is H and $X^2$ is H.

Embodiment C13. The sample of embodiment C11, wherein $X^1$ is Cl and $X^2$ is Cl.

Embodiment C14. The sample of embodiment C11, wherein one of $X^1$ and $X^2$ is Cl and one of $X^1$ and $X^2$ is H.

Embodiment C15. The sample of any one of embodiments C1-C14, wherein the first repeating unit (RU1) and the second repeating unit (RU2) are present in the copolymer in a molar ratio of about 4:1 to about 1:2 (RU1:RU2).

Embodiment C16. The sample of embodiment C15, wherein the molar ratio of RU1:RU2 is about 2:1.

Embodiment C17. The sample of any one of embodiments C1-C16, wherein the non-fouling moiety comprises a zwitterion.

Embodiment C18. The sample of embodiment C17, wherein the zwitterion comprises a sulfobetaine group.

Embodiment C19. The sample of any one of embodiments C1-C18, wherein the second repeating unit has the structure:

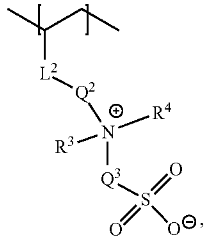

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment C20. The sample of any one of embodiments C1-C19, wherein the second repeating unit has the structure:

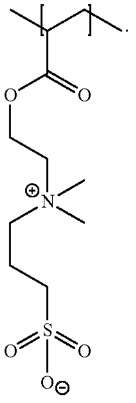

Embodiment C21. The sample of any one of embodiments C1-C20, wherein the non-fouling moiety comprises a polyether.

Embodiment C22. The sample of embodiment C21, wherein the polyether comprises a polyethylene glycol moiety.

Embodiment C23. The sample of any one of embodiments C1-C22, wherein the second repeating unit has the structure:

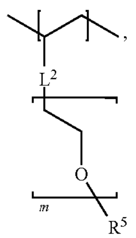

wherein: $L^2$ is an amide or ester group; $R^5$ is hydrogen or alkyl; and m is 1 to 500.

Embodiment C24. The sample of any one of embodiments C1-C23, wherein the second repeating unit has the structure:

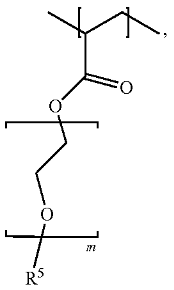

wherein: $R^5$ is hydrogen or alkyl; and m is 1 to 500.

Embodiment C25. The sample of any one of embodiments C1-C24, wherein the polymer does not comprise a side-chain that comprises a catechol group.

Embodiment D1. A sample of a copolymer, wherein the copolymer comprises a first repeating unit and a second repeating unit, wherein: (i) the first repeating unit comprises a nitrogen-containing heterocycle, wherein the nitrogen-containing heterocycle forms an N-halamine when exposed to an electrophilic halogen source, (ii) the second repeating unit comprises a non-fouling moiety, and (iii) the copolymer does not comprise a repeating unit that comprises a catechol group.

Embodiment D2. The sample of embodiment D1, wherein a number average molar mass of the copolymer in the sample is at least about 21 kilodaltons (kDa).

Embodiment D3. The sample of embodiment D2, wherein the number average molar mass is from about 21 kDa to about 500 kDa.

Embodiment D4. The sample of embodiment D2 or D3, wherein the number average molar mass is from about 21 kDa to about 50 kDa.

Embodiment D5. The sample of embodiment D2, wherein the number average molar mass is from about 100 kDa to about 120 kDa.

Embodiment D6. The sample of any one of embodiments D2-D5, wherein the number average molar mass is determined by a gel permeation chromatograph.

Embodiment D7. The sample of any one of embodiments D1-D6, wherein the nitrogen-containing heterocycle is on a side chain of the first repeating unit.

Embodiment D8. The sample of any one of embodiments D1-D7, wherein the sample has a polydispersity ranging from about 1 to about 4 as determined by a gel permeation chromatograph.

Embodiment D9. The sample of any one of embodiments D1-D8, wherein the sample has a polydispersity of less than about 2.9.

Embodiment D10. The sample of any one of embodiments D1-D9, wherein the nitrogen-containing heterocycle comprises a hydantoin group.

Embodiment D11. The sample of embodiment D10, wherein the hydantoin group has the structure:

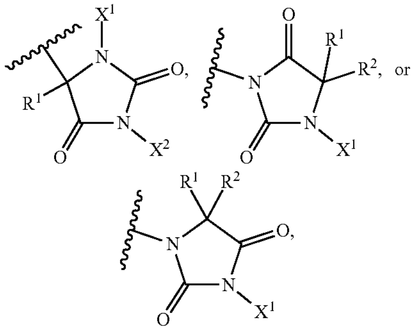

wherein: X is H or halogen; $X^2$ is H or halogen; $R^1$ is H or $C_1$-$C_4$ alkyl; and $R^2$ is H or $C_1$-$C_4$ alkyl.

Embodiment D12. The sample of any one of embodiments D1-D11, wherein the first repeating unit has the structure:

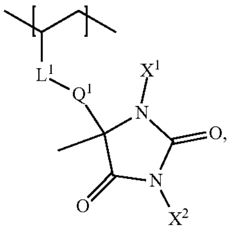

wherein: $L^1$ is an amide, ester, or arylene group; $Q^1$ is alkylene or absent; $X^1$ is H or halogen; and $X^2$ is H or halogen.

Embodiment D13. The sample of embodiment D12, wherein $X^1$ is H and $X^2$ is H.

Embodiment D14. The sample of embodiment D12, wherein $X^1$ is Cl and $X^2$ is Cl.

Embodiment D15. The sample of embodiment D12, wherein one of $X^1$ and $X^2$ is Cl and one of $X^1$ and $X^2$ is H.

Embodiment D16. The sample of any one of embodiments D1-D15, wherein the first repeating unit (RUT) and the second repeating unit (RU2) are present in the copolymer in a molar ratio of about 4:1 to about 1:2 (RU1:RU2).

Embodiment D17. The sample of embodiment D16, wherein the molar ratio of RU1:RU2 is about 2:1.

Embodiment D18. The sample of any one of embodiments D1-D17, wherein the non-fouling moiety comprises a zwitterion.

Embodiment D19. The sample of embodiment D18, wherein the zwitterion comprises a sulfobetaine group.

Embodiment D20. The sample of any one of embodiments D1-D19, wherein the second repeating unit has the structure:

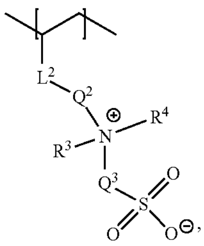

wherein: $L^2$ is an amide or ester group; $Q^2$ is alkylene or absent; Q3 is alkylene; $R^3$ is $C_1$-$C_4$ alkyl; and $R^4$ is $C_1$-$C_4$ alkyl.

Embodiment D21. The sample of any one of embodiments D1-D20, wherein the second repeating unit has the structure:

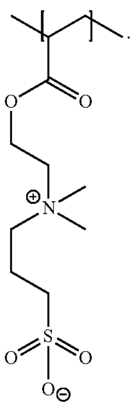

Embodiment D22. The sample of any one of embodiments D1-D21, wherein the non-fouling moiety comprises a polyether.

Embodiment D23. The sample of embodiment D22, wherein the polyether comprises a polyethylene glycol moiety.

Embodiment D24. The sample of any one of embodiments D1-D19, wherein the second repeating unit has the structure:

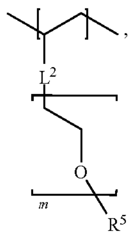

wherein: $L^2$ is an amide or ester group; $R^5$ is hydrogen or alkyl; and m is 1 to 500.

Embodiment D25. The sample of embodiment D24, wherein the second repeating unit has the structure:

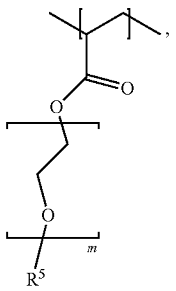

wherein: $R^5$ is hydrogen or alkyl; and m is 1 to 500.

Embodiment E1. A composition comprising: a first polymer comprising a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source; and a second polymer that does not comprise a side chain that comprises a hydantoin group, wherein a portion of the first polymer and a portion of the second polymer are substantially in a single phase.

Embodiment E2. The composition of embodiment E1, wherein the single phase is solid.

Embodiment E3. The composition of embodiment E1 or E2, wherein the single phase has a substantially homogeneous structure throughout a volume of the single phase.

Embodiment E4. The composition of any one of embodiments E1-E3, wherein the nitrogen-containing heterocycle is present in the composition in an amount of about 0.1% to about 20% by mass of the composition.

Embodiment E5. The composition of any one of embodiments E1-E4, wherein the nitrogen-containing heterocycle is present in the composition in an amount of about 0.5% to about 10% by mass of the composition.

Embodiment E6. The composition of any one of embodiments E1-E5, wherein the composition has a content of oxidative chlorine.

Embodiment E7. The composition of embodiment E6, wherein the content of oxidative chlorine is present on a surface of the composition.

Embodiment E8. The composition of embodiment E7, wherein the content of oxidative chlorine present on the surface of the composition is at least about $10^{10}$ atoms/$cm^2$.

Embodiment E9. The composition of embodiment E7, wherein the content of oxidative chlorine present on the surface of the composition is from about $10^{12}$ to about $10^{18}$ atoms/$cm^2$.

Embodiment E10. The composition of any one of embodiments E1-E9, wherein the nitrogen-containing heterocycle comprises a hydantoin group.

Embodiment E11. The composition of embodiment E10, wherein the hydantoin group has the structure:

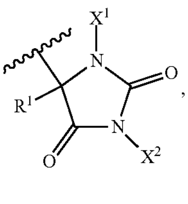
,
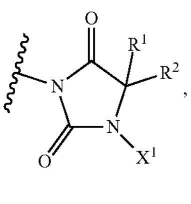
, or

-continued

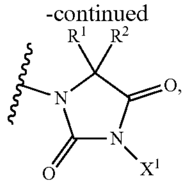

wherein: X is H or halogen; $X^2$ is H or halogen; $R^1$ is H or $C_1$-$C_4$ alkyl; and $R^2$ is H or $C_1$-$C_4$ alkyl.

Embodiment E12. The composition of any one of embodiments E1-E11, wherein the repeating unit has the structure:

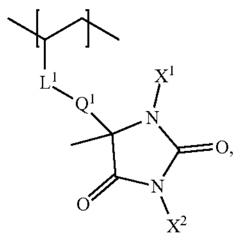

wherein: $L^1$ is an amide, ester, or arylene group; $Q^1$ is alkylene or absent; $X^1$ is H or halogen; and $X^2$ is H or halogen.

Embodiment E13. The composition of embodiment E11 or E12, wherein $X^1$ is H and $X^2$ is H.

Embodiment E14. The composition of embodiment E11 or E12, wherein $X^1$ is Cl and $X^2$ is Cl.

Embodiment E15. The composition of embodiment E11 or E12, wherein one of $X^1$ and $X^2$ is Cl and one of $X^1$ and $X^2$ is H.

Embodiment E16. The composition of any one of embodiments E1-E15, wherein the first polymer further comprises an additional repeating unit comprising a non-fouling moiety.

Embodiment E17. The composition of embodiment E16, wherein the non-fouling moiety comprises a zwitterion.

Embodiment E18. The composition of embodiment E17, wherein the zwitterion comprises a sulfobetaine group.

Embodiment E19. The composition of embodiment E16, wherein the additional repeating unit has the structure:

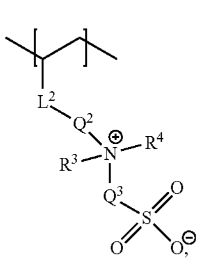

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment E20. The composition of embodiment E16, wherein the non-fouling moiety comprises a polyether.

Embodiment E21. The composition of embodiment E20, wherein the polyether comprises a polyethylene glycol moiety.

Embodiment E22. The composition of embodiment E16, wherein the additional repeating unit has the structure:

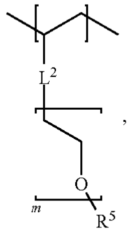

wherein: $L^2$ is an amide or ester group; $R^5$ is hydrogen or alkyl; and m is 1 to 500.

Embodiment E23. The composition of any one of embodiments E1-E22, wherein the second polymer comprises a thermoplastic.

Embodiment E24. The composition of any one of embodiments E1-E23, wherein the second polymer comprises a thermoset.

Embodiment E25. The composition of any one of embodiments E1-E24, wherein the first polymer (P1) and the second polymer (P2) are present in the composition in a mass-to-mass ratio of about 1:100 to about 100:1 (P1:P2).

Embodiment E26. The composition of embodiment E25, wherein the mass-to-mass ratio of P1:P2 is about 19:1.

Embodiment E27. The composition of embodiment E25, wherein the mass-to-mass ratio of P1:P2 is about 1:19.

Embodiment E28. The composition of any one of embodiments E1-E27, wherein the composition is non-toxic to humans.

Embodiment E29. The composition of any one of embodiments E1-E28, wherein the composition exhibits a biocidal activity against a microorganism.

Embodiment E30. The composition of embodiment E29, wherein the microorganism comprises a fungus.

Embodiment E31. The composition of embodiment E29, wherein the microorganism comprises a bacterium.

Embodiment E32. The composition of embodiment E29, wherein the microorganism comprises a virus.

Embodiment E33. The composition of embodiment E29, wherein the article exhibits the biocidal activity for at least 3 days.

Embodiment E34. The composition of embodiment E29, wherein the composition exhibits the biocidal activity for at least 1 week.

Embodiment E35. The composition of embodiment E29, wherein the composition exhibits the biocidal activity for at least 1 month.

Embodiment FT. An article of manufacture comprising: a first polymer comprising a repeating unit having a side chain, wherein the side chain comprises a nitrogen-containing heterocycle, wherein the nitrogen-containing heterocycle forms an N-halamine when exposed to an electrophilic halogen source; and a second polymer that does not comprise a side chain comprising a hydantoin group, wherein a portion of the first polymer and a portion of the second polymer are substantially in a single phase.

Embodiment F2. The article of manufacture of embodiment F1, wherein the article of manufacture is a consumer product.

Embodiment F3. The article of manufacture of embodiment F1 or F2, wherein the single phase has a substantially homogeneous structure throughout a volume of the single phase.

Embodiment F4. The article of manufacture of any one of embodiments F1-F3, wherein the nitrogen-containing heterocycle is present in the article of manufacture in an amount of about 0.1% to about 10% by mass of the article of manufacture.

Embodiment F5. The article of manufacture of any one of embodiments F1-F4, wherein the article has a content of oxidative chlorine.

Embodiment F6. The article of manufacture of embodiment F5, wherein the content of oxidative chlorine is present on a surface of the article.

Embodiment F7. The article of manufacture of embodiment F6, wherein the content of oxidative chlorine present on the surface of the article is at least about $10^{10}$ atoms/$cm^2$.

Embodiment F8. The article of manufacture of any one of embodiments F1-F7, wherein the nitrogen-containing heterocycle comprises a hydantoin group.

Embodiment F9. The article of manufacture of embodiment F8, wherein the hydantoin group has the structure:

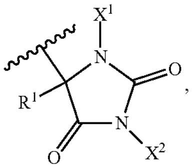, 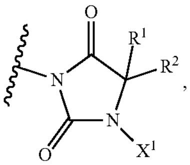, or

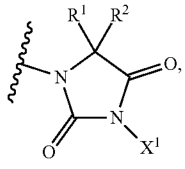

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment F10. The article of manufacture of any one of embodiments F1-F9, wherein the repeating unit has the structure:

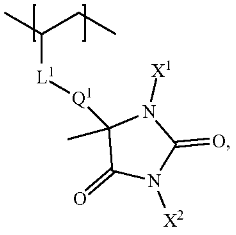

wherein: $L^1$ is an amide, ester, or arylene group; $Q^1$ is alkylene or absent; $X^1$ is H or halogen; and $X^2$ is H or halogen.

Embodiment F11. The article of manufacture of embodiment F10, wherein $X^1$ is H and $X^2$ is H.

Embodiment F12. The article of manufacture of embodiment F10, wherein $X^1$ is Cl and $X^2$ is Cl.

Embodiment F13. The article of manufacture of embodiment F10, wherein one of $X^1$ and $X^2$ is Cl and one of $X^1$ and $X^2$ is H.

Embodiment F14. The article of manufacture of any one of embodiments F1-F13, wherein the first polymer further comprises an additional repeating unit comprising a non-fouling moiety.

Embodiment F15. The article of manufacture of embodiment F14, wherein the non-fouling moiety comprises a zwitterion.

Embodiment F16. The article of manufacture of embodiment F15, wherein the zwitterion comprises a sulfobetaine group.

Embodiment F17. The article of manufacture of embodiment F14, wherein the additional repeating unit has the structure:

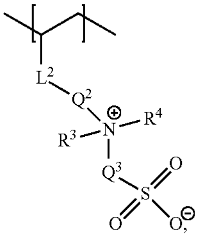

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment F18. The article of manufacture of embodiment F14, wherein the non-fouling moiety comprises a polyether.

Embodiment F19. The article of manufacture of embodiment F18, wherein the polyether comprises a polyethylene glycol moiety.

Embodiment F20. The article of manufacture of embodiment F14, wherein the additional repeating unit has the structure:

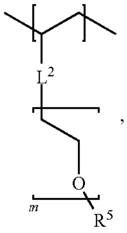, wherein: $L^2$ is an amide or ester group; $R^5$ is hydrogen or alkyl; and m is 1 to 500.

Embodiment F21. The article of manufacture of any one of embodiments F1-F20, wherein the second polymer comprises a thermoplastic.

Embodiment F22. The article of manufacture of any one of embodiments F1-F21, wherein the second polymer comprises a thermoset.

Embodiment F23. The article of manufacture of any one of embodiments F1-F22, wherein the first polymer (P1) and the second polymer (P2) are present in the article of manufacture in a mass-to-mass ratio of about 1:100 to about 10:1 (P1:P2).

Embodiment F24. The article of manufacture of embodiment F23, wherein the mass-to-mass ratio of P1:P2 is about 19:1.

Embodiment F25. The article of manufacture of embodiment F23, wherein the mass-to-mass ratio of P1:P2 is about 1:19.

Embodiment F26. The article of manufacture of any one of embodiments F1-F25, wherein the article of manufacture is non-toxic to humans.

Embodiment F27. The article of manufacture of any one of embodiments F1-F26, wherein the article of manufacture exhibits a biocidal activity against a microorganism.

Embodiment F28. The article of manufacture of embodiment F27, wherein the microorganism comprises a fungus.

Embodiment F29. The article of manufacture of embodiment F27, wherein the microorganism comprises a bacterium.

Embodiment F30. The article of manufacture of embodiment F27, wherein the microorganism comprises a virus.

Embodiment F31. The article of manufacture of embodiment F27, wherein the article exhibits the biocidal activity for at least 3 days.

Embodiment F32. The article of manufacture of embodiment F27, wherein the article exhibits the biocidal activity for at least 1 week.

Embodiment F33. The article of manufacture of embodiment F27, wherein the article exhibits the biocidal activity for at least 1 month.

Embodiment G1. A method of manufacturing a polymeric composition, comprising: (a) contacting a first polymer and a second polymer, wherein: the first polymer comprises a repeating unit, wherein the repeating unit comprises a nitrogen-containing heterocycle, wherein the nitrogen-containing heterocycle forms an N-halamine when exposed to an electrophilic halogen source, and the second polymer does not comprise a side chain that comprises a hydantoin group; and (b) softening a portion of the first polymer and a portion of the second polymer by application of a stress source, to blend the portion of the first polymer and the portion of the second polymer.

Embodiment G2. The method of embodiment G1, wherein the nitrogen-containing heterocycle is on a side chain of the repeating unit.

Embodiment G3. The method of embodiment G1 or G2, further comprising removing the stress source.

Embodiment G4. The method of any one of embodiments G1-G3, wherein the stress source comprises a pressure source.

Embodiment G5. The method of any one of embodiments G1-G4, wherein the stress source comprises a heat source.

Embodiment G6. The method of embodiment G5, wherein the heat source subjects the portion of the first polymer and the portion of the second polymer to a temperature of at least about 100° C.

Embodiment G7. The method of embodiment G5 or G6, wherein the heat source subjects the portion of the first polymer and the portion of the second polymer to a temperature from about 140° C. to about 220° C.

Embodiment G8. The method of any one of embodiments G1-G7, wherein, in (b), the application of the stress source melts the portion of the first polymer.

Embodiment G9. The method of any one of embodiments G1-G8, wherein the application of the stress source melts the portion of the second polymer.

Embodiment G10. The method of embodiment G9, wherein a first melting temperature of the first polymer and a second melting temperature of the second polymer differ by no more than about 20° C.

Embodiment G11. The method of embodiment G10, wherein the first melting temperature and the second melting temperature differ by no more than about 10° C.

Embodiment G12. The method of any one of embodiments G1-G11, wherein the second polymer comprises a thermoplastic.

Embodiment G13. The method of any one of embodiments G1-G12, wherein the second polymer comprises a thermoset.

Embodiment G14. The method of any one of embodiments G1-G13, further comprising mixing the portion of the first polymer and the portion of the second polymer.

Embodiment G15. The method of embodiment G14, wherein the mixing comprises co-extruding the portion of the first polymer and the portion of the second polymer to form a polymeric mixture, wherein the polymeric mixture comprises the portion of the first polymer and the portion of the second polymer in a homogeneous structure.

Embodiment G16. The method of any one of embodiments G1-G15, further comprising, subsequent to (b), molding the portion of the first polymer and the portion of the second polymer into a shape.

Embodiment G17. The method of any one of embodiments G1-G16, wherein the nitrogen-containing heterocycle comprises a hydantoin group.

Embodiment G18. The method of embodiment G17, wherein the hydantoin group has the structure:

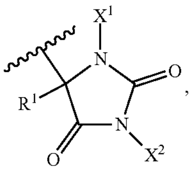
,
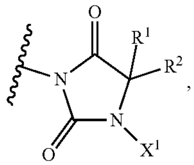
, or
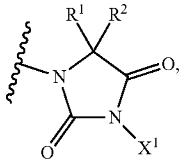

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment G19. The article of manufacture of any one of embodiments G1-G18, wherein the repeating unit has the structure:

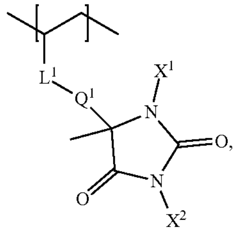

wherein: $L^1$ is an amide, ester, or arylene group; $Q^1$ is alkylene or absent; $X^1$ is H or halogen; and $X^2$ is H or halogen.

Embodiment G20. The article of manufacture of embodiment G19, wherein $X^1$ is H and $X^2$ is H.

Embodiment G21. The article of manufacture of embodiment G19, wherein $X^1$ is Cl and $X^2$ is Cl.

Embodiment G22. The article of manufacture of embodiment G19, wherein one of $X^1$ and $X^2$ is Cl and one of $X^1$ and $X^2$ is H.

Embodiment H1. A method comprising: contacting a surface of an item with a medium that comprises an electrophilic halogen source, wherein the item is molded at least partially from a polymer, wherein the polymer comprises a repeating unit, wherein the repeating unit comprises a nitrogen-containing heterocycle, wherein the nitrogen-containing heterocycle forms an N-halamine upon exposure to the electrophilic halogen source.

Embodiment H2. The method of embodiment H1, wherein the medium comprises an electrophilic chlorine source.

Embodiment H3. The method of embodiment H1 or H2, wherein the medium comprises sodium hypochlorite.

Embodiment H4. The method of any one of embodiments H1-H3, wherein the medium comprises sodium dichloroisocyanurate.

Embodiment H5. The method of any one of embodiments H1-H4, wherein the surface of the item has a content of oxidative chlorine.

Embodiment H6. The method of embodiment H5, wherein the content of oxidative chlorine present on the surface of the item is at least about $10^{10}$ atoms/$cm^2$.

Embodiment H7. The method of embodiment H5, wherein the content of oxidative chlorine present on the surface of the item is from about $10^{13}$ to about $10^{18}$ atoms/$cm^2$.

Embodiment H8. The method of any one of embodiments H1-H7, wherein the contacting comprises immersing a portion of the item in the medium.

Embodiment H9. The method of any one of embodiments H1-H8, wherein the contacting is performed for at least about 1 minute.

Embodiment H10. The method of any one of embodiments H1-H9, wherein the contacting is performed for at least about 30 minutes.

Embodiment H11. The method of any one of embodiments H1-H10, wherein a biocidal activity of the surface of the item is increased by at least 2-fold by the contacting.

Embodiment H12. The method of embodiment H11, wherein the biocidal activity of the surface of the item is increased by at least 5-fold as compared to the item without the contacting.

Embodiment H13. The method of any one of embodiments H1-H12, wherein the surface of the item maintains a biocidal activity for at least about 24 hours after the contacting.

Embodiment H14. The method of embodiment H13, wherein the surface of the item maintains a biocidal activity for at least about 1 week after the contacting.

Embodiment H15. The method of any one of embodiments H1-H14, further comprising contacting the surface of the item with a microorganism.

Embodiment H16. The method of embodiment H15, wherein the microorganism is killed by the immobilized oxidative chlorine.

Embodiment H17. The method of embodiment H15, wherein the microorganism comprises a fungus.

Embodiment H18. The method of embodiment H15, wherein the microorganism comprises a bacterium.

Embodiment H19. The method of any one of embodiments H1-H18, wherein the polymer is a copolymer comprising the repeating unit and an additional repeating unit.

Embodiment H20. The method of embodiment H19, wherein the additional repeating unit comprises a non-fouling moiety.

Embodiment H21. The method of embodiment H19, wherein a number average molar mass of the copolymer is at least about 21 kilodaltons (kDa).

Embodiment I1. A sample of a polymer prepared by a process, wherein the process comprises: subjecting a plurality of polymerizable monomers to polymerization to generate the sample of the polymer, wherein a monomer of the plurality of polymerizable monomers comprises a side chain, wherein the side chain comprises a nitrogen-containing heterocycle, wherein: (i) the nitrogen-containing heterocycle forms an N-halamine when exposed to an electrophilic halogen source, (ii) the plurality of polymerizable monomers are subjected to the polymerization in a solvent, wherein the solvent comprises methanol (MeOH) and water ($H_2O$) in a volume-to-volume ratio ($MeOH:H_2O$) of about 15:1 to about 1:1; and (iii) the polymerization occurs at a temperature of at least about 50° C.

Embodiment 12. The sample of embodiment I1, wherein the volume-to-volume ratio of $MeOH:H_2O$ is about 9:1.

Embodiment 13. The sample of embodiment I1, wherein the volume-to-volume ratio of $MeOH:H_2O$ is about 8:2.

Embodiment 14. The sample of embodiment I1, wherein the volume-to-volume ratio of $MeOH:H_2O$ is about 7:3.

Embodiment 15. The sample of any one of embodiments I1-I4, wherein the plurality of monomers are contacted with an initiator.

Embodiment 16. The sample of embodiment 15, wherein the initiator comprises azobisisobutyronitrile (AIBN).

Embodiment 17. The sample of any one of embodiments I1-I6, wherein the plurality of polymerizable monomers are subjected to the polymerization for at least about 1 hour.

Embodiment 18. The sample of any one of embodiments I1-I7, wherein the plurality of polymerizable monomers are subjected to the polymerization for at least about 3 hours.

Embodiment 19. The sample of any one of embodiments I1-I8, the temperature for polymerization is at least about 60° C.

Embodiment J1. An article of manufacture prepared by a process, wherein the process comprises: (a) contacting a first polymer and a second polymer, wherein: (i) the first polymer comprises a repeating unit, wherein the repeating unit comprises a nitrogen-containing heterocycle, wherein the nitrogen-containing heterocycle forms an N-halamine when exposed to an electrophilic halogen source; and (ii) the second polymer does not comprise a side chain that comprises a hydantoin group; and (b) softening a portion of the first polymer and a portion of the second polymer by application of a stress source, to generate the article of manufacture comprising the portion of the first polymer and the portion of the second polymer.

Embodiment J2. The article of manufacture of embodiment J1, wherein the nitrogen-containing heterocycle is on a side chain of the repeating unit.

Embodiment J3. The article of manufacture of embodiment J1 or J2, wherein the process further comprises removing the stress source.

Embodiment J4. The article of manufacture of any one of embodiments J1-J3, wherein the stress source comprises a pressure source.

Embodiment J5. The article of manufacture of any one of embodiments J1-J4, wherein the stress source comprises a heat source.

Embodiment J6. The article of manufacture of embodiment J5, wherein the heat source applies heat at a temperature from about 150° C. and about 250° C.

Embodiment J7. The article of manufacture of any one of embodiments J1-J6, wherein, in (b), the application of the stress source melts the portion of the first polymer.

Embodiment J8. The article of manufacture of any one of embodiments J1-J7, wherein the application of the stress source melts the portion of the second polymer.

Embodiment J9. The article of manufacture of any one of embodiments J1-J8, wherein the second polymer comprises a thermoplastic.

Embodiment J10. The article of manufacture of any one of embodiments J1-J9, wherein the second polymer comprises a thermoset.

Embodiment J11. The article of manufacture of any one of embodiments J1-J10, wherein the second polymer comprises polyvinyl chloride.

Embodiment J12. The article of manufacture of any one of embodiments J1-J11, wherein the second polymer comprises polypropylene.

Embodiment J13. The article of manufacture of any one of embodiments J1-J12, wherein the process further comprises mixing the portion of the first polymer and the portion of the second polymer.

Embodiment J14. The article of manufacture of any one of embodiments J1-J13, wherein the process further comprises molding the portion of the first polymer and the portion of the second polymer into a shape.

Embodiment J15. The article of manufacture of any one of embodiments J1-J14, wherein the process further comprises softening a portion of the shape by application of an additional stress source to generate the article of manufacture.

Embodiment J16. The article of manufacture of any one of embodiments J1-J15, wherein the nitrogen-containing heterocycle comprises a hydantoin group.

Embodiment K1. A composition comprising: a first polymer comprising a plurality of active regions, wherein each active region of the plurality of active regions exhibits antimicrobial activity; and a second polymer that does not comprise the plurality of active regions, wherein in a study of discharging and recharging active regions of a test composition, wherein the test composition comprises a first portion that is the first polymer and a second portion that is the second polymer, wherein the study comprises a number of iterations of a two-phase experiment, wherein phase one of the two-phase experiment is discharging of the test composition by immersion of the test composition in a sodium hypochlorite solution for at least about 1 hour wherein a sodium hypochlorite content in the sodium hypochlorite solution is about 0.825 weight %, wherein phase two of the two-phase experiment is discharging the test composition by an iodometric titration using 60 mM potassium iodide, 15% acetic acid, and 0.001 N sodium thiosulfate solution, and the number of iterations is at least three, then the test composition exhibits at least about 10% recharging of the active regions of the test composition as determined by the iodometric titration.

Embodiment K2. The composition of embodiment K1, wherein the first polymer and the second polymer are blended within the composition.

Embodiment K3. The composition of embodiment K1 or K2, wherein, in the study, the test composition exhibits at least about 20% recharging of the active regions of the test composition.

Embodiment K4. The composition of embodiment K1 or K2, wherein, in the study, the test composition exhibits at least about 40% recharging of the active regions of the test composition.

Embodiment K5. The composition of embodiment K1 or K2, wherein, in the study, the test composition exhibits at least about 60% recharging of the active regions of the test composition.

Embodiment K6. The composition of embodiment K1 or K2, wherein, in the study, the test composition exhibits at least about 70% recharging of the active regions of the test composition.

Embodiment K7. The composition of embodiment K1 or K2, wherein, in the study, the test composition exhibits at least about 90% recharging of the active regions of the test composition.

Embodiment K8. The composition of embodiment K1 or K2, wherein, in the study, the test composition exhibits at least about 95% recharging of the active regions of the test composition.

Embodiment K9. The composition of embodiment K1 or K2, wherein, in the study, the test composition exhibits about 100% recharging of the active regions of the test composition.

Embodiment K10. The composition of any one of embodiments K1-K9, wherein the iodometric titration measures a content of oxidative chlorine from the test composition.

Embodiment K111. The composition of embodiment K10, wherein the measured content of the oxidative chlorine is at least about $10^{10}$ atoms/$cm^2$.

Embodiment K12. The composition of embodiment K10, wherein the measured content of the oxidative chlorine is from about $10^{12}$ to about $10^{18}$ atoms/$cm^2$.

Embodiment K13. The composition of embodiment K10, wherein the measured content of the oxidative chlorine is from about $10^{13}$ to about $10^{17}$ atoms/$cm^2$.

Embodiment K14. The composition of any one of embodiments K1-K13, the number of iterations is at least four.

Embodiment K15. The composition of any one of embodiments K1-K14, the number of iterations is at least five.

Embodiment K16. The composition of any one of embodiments K1-K15, the number of iterations is at least six.

Embodiment K17. The composition of any one of embodiments K1-K16, the number of iterations is at least ten.

Embodiment K18. The composition of any one of embodiments K1-K17, wherein each active region comprises a nitrogen-containing heterocycle, and wherein the nitrogen-containing heterocycle forms an N-halamine when exposed to an electrophilic halogen source.

Embodiment K19. The composition of any one of embodiments K1-K18, wherein the first polymer comprises a repeating unit, wherein the repeating unit comprises a side chain, wherein the side chain comprises the nitrogen-containing heterocycle.

Embodiment K20. The composition of any one of embodiments K1-K19, wherein the nitrogen-containing heterocycle comprises a hydantoin group.

Embodiment K21. The composition of embodiment K20, wherein the hydantoin group has the structure:

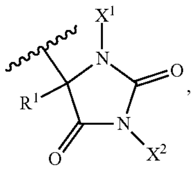
,
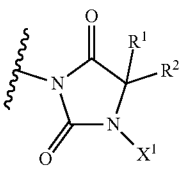
, or
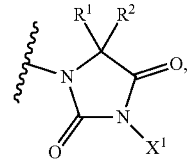

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment K22. The composition of embodiment K19, wherein the repeating unit has the structure:

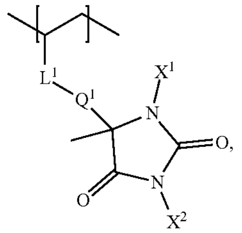

wherein: $L^1$ is an amide, ester, or arylene group; $Q^1$ is alkylene or absent; $X^1$ is H or halogen; and $X^2$ is H or halogen.

Embodiment K23. The composition of embodiment K22, wherein $X^1$ is H and $X^2$ is H.

Embodiment K24. The composition of embodiment K22, wherein $X^1$ is Cl and $X^2$ is Cl.

Embodiment K25. The composition of embodiment K22, wherein one of $X^1$ and $X^2$ is Cl and one of $X^1$ and $X^2$ is H.

Embodiment K26. The composition of any one of embodiments K1-K25, wherein the first polymer is a homopolymer.

Embodiment K27. The composition of any one of embodiments K1-K26, wherein the first polymer further comprises an additional repeating unit, wherein the additional repeating unit comprises a non-fouling moiety.

Embodiment K28. The composition of embodiment K27, wherein the non-fouling moiety comprises a zwitterion.

Embodiment K29. The composition of embodiment K28, wherein the zwitterion comprises a sulfobetaine group.

Embodiment K30. The composition of embodiment K27, wherein the additional repeating unit has the structure:

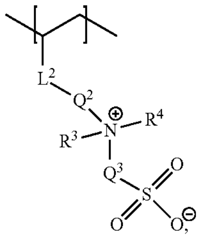

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment K31. The composition of any one of embodiments K1-K30, wherein the second polymer comprises a thermoplastic.

Embodiment K32. The composition of any one of embodiments K1-K31, wherein the second polymer comprises a thermoset.

Embodiment K33. The composition of any one of embodiments K1-K32, wherein the second polymer comprises polypropylene.

Embodiment K34. The composition of any one of embodiments K1-K33, wherein the second polymer comprises polyvinyl chloride.

Embodiment K35. The composition of any one of embodiments K1-K34, wherein the first polymer (P1) and the second polymer (P2) are present in the composition in a mass-to-mass ratio of about 1:100 to about 100:1 (P1:P2).

Embodiment K36. The composition of embodiment K35, wherein the mass-to-mass ratio is about 0.5:100.

Embodiment K37. The composition of embodiment K35, wherein the mass-to-mass ratio is about 2.5:100.

Embodiment K38. The composition of embodiment K35, wherein the mass-to-mass ratio is about 5:100.

Embodiment K39. The composition of any one of embodiments K1-K38, wherein pH of the sodium hypochlorite solution is less than about 7.

Embodiment K40. The composition of any one of embodiments K1-K39, wherein the pH of the sodium hypochlorite solution is less than about 6.5.

Embodiment K41. The composition of any one of embodiments K1-K40, wherein the pH of the sodium hypochlorite solution is less than about 6.

Embodiment K42. The composition of any one of embodiments K1-K41, wherein the pH of the sodium hypochlorite solution is less than about 5.5.

Embodiment L1. An article of manufacture prepared by a process, wherein the process comprises mixing a first polymer and a second polymer, wherein: (i) the first polymer comprises a plurality of active regions, wherein each active region of the plurality of active regions exhibits antimicrobial activity; (ii) the second polymer does not comprise the plurality of active regions; and (iii) in a study of discharging and recharging active regions of a test article of manufacture, wherein the test article of manufacture comprises a first portion that is the first polymer and a second portion that is the second polymer, wherein the study comprises a number of iterations of a two-phase experiment, wherein phase one of the two-phase experiment is discharging of the test article of manufacture by immersion of the test article of manufacture in a sodium hypochlorite solution for at least about 1 hour, wherein a sodium hypochlorite content in the sodium hypochlorite solution is about 0.825 weight %, wherein phase two of the two-phase experiment is discharging the test article of manufacture by an iodometric titration using 60 mM potassium iodide, 15% acetic acid, and 0.001 N sodium thiosulfate solution, and the number of iterations is at least three, then the test article of manufacture exhibits at least about 10% recharging of the active regions of the test article of manufacture as determined by the iodometric titration.

Embodiment L2. The article of manufacture of embodiment L1, wherein the first polymer and the second polymer are blended within the article of manufacture.

Embodiment L3. The article of manufacture of embodiment L1 or L2, wherein, in the study, the test article of manufacture exhibits at least about 20% recharging of the active regions of the test article of manufacture.

Embodiment L4. The article of manufacture of any one of embodiments L1-L3, wherein, in the study, the test article of manufacture exhibits at least about 40% recharging of the active regions of the test article of manufacture.

Embodiment L5. The article of manufacture of any one of embodiments L1-L4, wherein, in the study, the test article of manufacture exhibits at least about 60% recharging of the active regions of the test article of manufacture.

Embodiment L6. The article of manufacture of any one of embodiments L1-L5, wherein, in the study, the test article of manufacture exhibits at least about 70% recharging of the active regions of the test article of manufacture.

Embodiment L7. The article of manufacture of any one of embodiments L1-L6, wherein, in the study, the test article of manufacture exhibits at least about 90% recharging of the active regions of the test article of manufacture.

Embodiment L8. The article of manufacture of any one of embodiments L1-L7, wherein, in the study, the test article of manufacture exhibits at least about 95% recharging of the active regions of the test article of manufacture.

Embodiment L9. The article of manufacture of any one of embodiments L1-L8, wherein, in the study, the test article of manufacture exhibits about 100% recharging of the active regions of the test article of manufacture.

Embodiment L10. The article of manufacture of any one of embodiments L1-L9, wherein the iodometric titration measures a content of oxidative chlorine from the test article of manufacture.

Embodiment L11. The article of manufacture of embodiment L10, wherein the measured content of the oxidative chlorine is at least about $10^{10}$ atoms/$cm^2$.

Embodiment L12. The article of manufacture of embodiment L10, wherein the measured content of the oxidative chlorine is from about $10^{12}$ to about $10^{18}$ atoms/$cm^2$.

Embodiment L13. The article of manufacture of embodiment L10, wherein the measured content of the oxidative chlorine is from about $10^{13}$ to about $10^{17}$ atoms/$cm^2$.

Embodiment L14. The article of manufacture of any one of embodiments L1-L13, the number of iterations is at least four.

Embodiment L15. The article of manufacture of any one of embodiments L1-L14, the number of iterations is at least five.

Embodiment L16. The article of manufacture of any one of embodiments L1-L15, the number of iterations is at least six.

Embodiment L17. The article of manufacture of any one of embodiments L1-L16, the number of iterations is at least ten.

Embodiment L18. The article of manufacture of any one of embodiments L1-L17, wherein each active region comprises a nitrogen-containing heterocycle, and wherein the nitrogen-containing heterocycle forms an N-halamine when exposed to an electrophilic halogen source.

Embodiment L19. The article of manufacture of any one of embodiments L1-L18, wherein the first polymer comprises a repeating unit, wherein the repeating unit comprises a side chain, wherein the side chain comprises the nitrogen-containing heterocycle.

Embodiment L20. The article of manufacture of any one of embodiments L1-L18, wherein the nitrogen-containing heterocycle comprises a hydantoin group.

Embodiment L21. The article of manufacture of embodiment L20, wherein the hydantoin group has the structure:

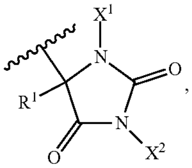
,
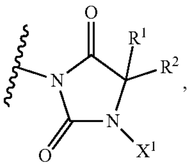
, or
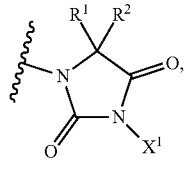

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment L22. The article of manufacture of embodiment L19, wherein the repeating unit has the structure:

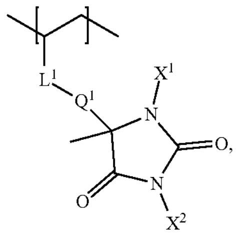

wherein: $L^1$ is an amide, ester, or arylene group; $Q^1$ is alkylene or absent; $X^1$ is H or halogen; and $X^2$ is H or halogen.

Embodiment L23. The article of manufacture of embodiment L22, wherein $X^1$ is H and $X^2$ is H.

Embodiment L24. The article of manufacture of embodiment L22, wherein $X^1$ is Cl and $X^2$ is Cl.

Embodiment L25. The article of manufacture of embodiment L22, wherein one of $X^1$ and $X^2$ is Cl and one of $X^1$ and $X^2$ is H.

Embodiment L26. The article of manufacture of any one of embodiments L1-L25, wherein the first polymer is a homopolymer.

Embodiment L27. The article of manufacture of embodiment L19, wherein the first polymer further comprises an additional repeating unit, wherein the additional repeating unit comprises a non-fouling moiety.

Embodiment L28. The article of manufacture of embodiment L27, wherein the non-fouling moiety comprises a zwitterion.

Embodiment L29. The article of manufacture of embodiment L28, wherein the zwitterion comprises a sulfobetaine group.

Embodiment L30. The article of manufacture of embodiment L27, wherein the additional repeating unit has the structure:

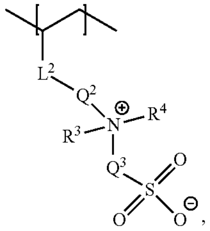

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment L31. The article of manufacture of any one of embodiments L1-L30, wherein the second polymer comprises a thermoplastic.

Embodiment L32. The article of manufacture of any one of embodiments L1-L31, wherein the second polymer comprises a thermoset.

Embodiment L33. The article of manufacture of any one of embodiments L1-L32, wherein the second polymer comprises polypropylene.

Embodiment L34. The article of manufacture of any one of embodiments L1-L33, wherein the second polymer comprises polyvinyl chloride.

Embodiment L35. The article of manufacture of any one of embodiments L1-L34, wherein the first polymer (P1) and the second polymer (P2) are present in the article of manufacture in a mass-to-mass ratio of about 1:100 to about 100:1 (P1:P2).

Embodiment L36. The article of manufacture of embodiment L35, wherein the mass-to-mass ratio is about 0.5:100.

Embodiment L37. The article of manufacture of embodiment L35, wherein the mass-to-mass ratio is about 2.5:100.

Embodiment L38. The article of manufacture of embodiment L35, wherein the mass-to-mass ratio is about 5:100.

Embodiment L39. The article of manufacture of any one of embodiments L1-L38, wherein pH of the sodium hypochlorite solution is less than about 7.

Embodiment L40. The article of manufacture of any one of embodiments L1-L39, wherein the pH of the sodium hypochlorite solution is less than about 6.5.

Embodiment L41. The article of manufacture of any one of embodiments L1-L40, wherein the pH of the sodium hypochlorite solution is less than about 6.

Embodiment L42. The article of manufacture of any one of embodiments L1-L41, wherein the pH of the sodium hypochlorite solution is less than about 5.5.

Embodiment M1. A composition comprising: a polymer comprising a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source, wherein the N-halamine exhibits antiviral activity, wherein, in a study of antiviral activity of a test composition, wherein the test composition comprises the polymer, wherein the study comprises contacting a surface of the test composition with a viral inoculum for a period of time, wherein the antiviral activity is measured subsequent to the period of time via a fifty-percent-tissue-culture-infective-dose ($TCID_{50}$) assay, and wherein the period of time is at least about 1 hour, then the surface of the test composition exhibits a reduction of the viral inoculum of at least about 0.1 log relative to a surface of a control composition as determined by the $TCID_{50}$ assay, wherein the control composition does not comprise the first polymer.

Embodiment M2. The composition of embodiment M1, wherein the reduction of the viral inoculum is at least about 0.5 log reduction.

Embodiment M3. The composition of embodiment M1 or M2, wherein the reduction of the viral inoculum is at least about 1 log reduction.

Embodiment M4. The composition of any one of embodiments M1-M3, wherein the reduction of the viral inoculum is at least about 2 log reduction.

Embodiment M5. The composition of any one of embodiments M1-M4, wherein the reduction of the viral inoculum is at least about 3 log reduction.

Embodiment M6. The composition of any one of embodiments M1-M5, wherein the reduction of the viral inoculum is at least about 3.5 log reduction.

Embodiment M7. The composition of any one of embodiments M1-M6, wherein the period of time is at least about 2 hours.

Embodiment M8. The composition of any one of embodiments M1-M7, wherein the period of time is at least about 8 hours.

Embodiment M9. The composition of any one of embodiments M1-M8, wherein, in the study, the surface of the test composition is determined to have a content of oxidative chlorine of at least about $10^{10}$ atoms/$cm^2$ as measured by an iodometric titration assay.

Embodiment M10. The composition of embodiment M9, wherein the content of oxidative chlorine is from about $10^{12}$ to about $10^{18}$ atoms/$cm^2$.

Embodiment M11. The composition of embodiment M9, wherein the content of oxidative chlorine is from about $10^{13}$ to about $10^{17}$ atoms/$cm^2$.

Embodiment M12. The composition of any one of embodiments M1-M11, wherein the viral inoculum comprises Gastroenteritis Virus.

Embodiment M13. The composition of any one of embodiments M1-M12, wherein the nitrogen-containing heterocycle comprises a hydantoin group.

Embodiment M14. The composition of embodiment M13, wherein the hydantoin group has the structure:

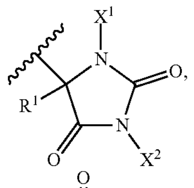

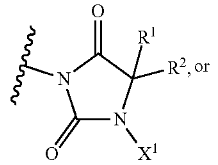

or

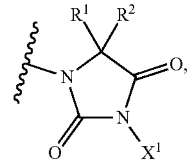

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment M15. The composition of any one of embodiments M1-M14, wherein the repeating unit has the structure:

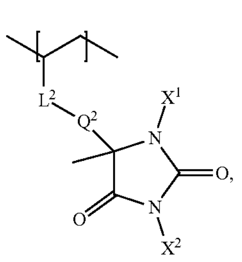

wherein: $L^1$ is an amide, ester, or arylene group; $Q^1$ is alkylene or absent; $X^1$ is H or halogen; and $X^2$ is H or halogen.

Embodiment M16. The composition of embodiment M15, wherein $X^1$ is H and $X^2$ is H.

Embodiment M17. The composition of embodiment M15, wherein $X^1$ is Cl and $X^2$ is Cl.

Embodiment M18. The composition of embodiment M15, wherein one of $X^1$ and $X^2$ is Cl and one of $X^1$ and $X^2$ is H.

Embodiment M19. The composition of any one of embodiments M1-M18, wherein the polymer is a homopolymer.

Embodiment M20. The composition of any one of embodiments M1-M19, wherein the polymer further comprises an additional repeating unit comprising a non-fouling moiety.

Embodiment M21. The composition of embodiment M20, wherein the non-fouling moiety comprises a zwitterion.

Embodiment M22. The composition of embodiment M21, wherein the zwitterion comprises a sulfobetaine group.

Embodiment M23. The composition of embodiment M20, wherein the additional repeating unit has the structure:

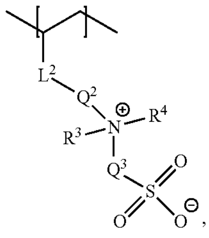

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment M24. The composition of any one of embodiments M1-M23, further comprising an additional polymer.

Embodiment M25. The composition of embodiment M24, wherein the additional polymer comprises a thermoplastic.

Embodiment M26. The composition of embodiment M24, wherein the additional polymer comprises a thermoset.

Embodiment M27. The composition of embodiment M24, wherein the additional polymer comprises polypropylene.

Embodiment M28. The composition of embodiment M24, wherein the additional polymer comprises polyvinyl chloride.

Embodiment M29. The composition of embodiment M24, wherein the polymer (P1) and the additional polymer (P2) are present in the composition in a mass-to-mass ratio of about 1:100 to about 100:1 (P1:P2).

Embodiment M30. The composition of embodiment M29, wherein the mass-to-mass ratio is about 0.5:100.

Embodiment M31. The composition of embodiment M29, wherein the mass-to-mass ratio is about 2.5:100.

Embodiment M32. The composition of embodiment M29, wherein the mass-to-mass ratio is about 5:100.

Embodiment N1. An article of manufacture prepared by a process, wherein the process comprises shaping a polymer resin into the article of manufacture, wherein the polymer resin comprises a polymer, wherein the polymer comprises a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source, wherein the N-halamine exhibits antiviral activity, and wherein, in a study of antiviral activity of a test article of manufacture, wherein the test article of manufacture comprises the polymer, wherein the study comprises contacting a surface of the test article of manufacture with a viral inoculum for a period of time, wherein the antiviral activity is measured subsequent to the period of time via a fifty-percent-tissue-culture-infective-dose ($TCID_{50}$) assay, and wherein the period of time is at least about 1 hour, then the surface of the test article of manufacture exhibits a reduction of the viral inoculum of at least about 0.1 log relative to a surface of a control article of manufacture as determined by the $TCID_{50}$ assay, wherein the control article of manufacture does not comprise the polymer.

Embodiment N2. The article of manufacture of embodiment N1, wherein the reduction of the viral inoculum is at least about 0.5 log reduction.

Embodiment N3. The article of manufacture of embodiment N1 or N2, wherein the reduction of the viral inoculum is at least about 1 log reduction.

Embodiment N4. The article of manufacture of any one of embodiments N1-N3, wherein the reduction of the viral inoculum is at least about 2 log reduction.

Embodiment N5. The article of manufacture of any one of embodiments N1-N4, wherein the reduction of the viral inoculum is at least about 3 log reduction.

Embodiment N6. The article of manufacture of any one of embodiments N1-N5, wherein the reduction of the viral inoculum is at least about 3.5 log reduction.

Embodiment N7. The article of manufacture of any one of embodiments N1-N6, wherein the period of time is at least about 2 hours.

Embodiment N8. The article of manufacture of any one of embodiments N1-N7, wherein the period of time is at least about 8 hours.

Embodiment N9. The article of manufacture of any one of embodiments N1-N8, wherein, in the study, the surface of the item is determined to have a content of oxidative chlorine of at least about $10^{10}$ atoms/$cm^2$ as measured by an iodometric titration assay.

Embodiment N10. The article of manufacture of embodiment N9, wherein the content of oxidative chlorine is from about $10^{12}$ to about $10^{18}$ atoms/$cm^2$.

Embodiment N11. The article of manufacture of embodiment N9, wherein the content of oxidative chlorine is from about $10^{13}$ to about $10^{17}$ atoms/$cm^2$.

Embodiment N12. The article of manufacture of any one of embodiments N1-N11, wherein the viral inoculum comprises Gastroenteritis Virus.

Embodiment N13. The article of manufacture of any one of embodiments N1-N12, wherein the nitrogen-containing heterocycle comprises a hydantoin group.

Embodiment N14. The article of manufacture of embodiment N13, wherein the hydantoin group has the structure: III

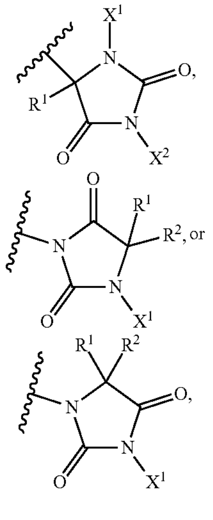

wherein: $X^1$ is H or halogen; $X^2$ is H or halogen; $R^1$ is H or C1-C4 alkyl; and $R^2$ is H or C1-C4 alkyl.

Embodiment N15. The article of manufacture of any one of embodiments N1-N14, wherein the repeating unit has the structure:

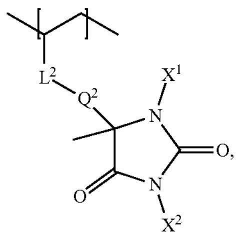

wherein: $L^1$ is an amide, ester, or arylene group; $Q^1$ is alkylene or absent; $X^1$ is H or halogen; and $X^2$ is H or halogen.

Embodiment N16. The article of manufacture of embodiment N15, wherein $X^1$ is H and $X^2$ is H.

Embodiment N17. The article of manufacture of embodiment N15, wherein $X^1$ is Cl and $X^2$ is Cl.

Embodiment N18. The article of manufacture of embodiment N15, wherein one of $X^1$ and $X^2$ is Cl and one of $X^1$ and $X^2$ is H.

Embodiment N19. The article of manufacture of any one of embodiments N1-N18, wherein the polymer is a homopolymer.

Embodiment N20. The article of manufacture of any one of embodiments N1-N19, wherein the polymer further comprises an additional repeating unit comprising a non-fouling moiety.

Embodiment N21. The article of manufacture of embodiment N20, wherein the non-fouling moiety comprises a zwitterion.

Embodiment N22. The article of manufacture of embodiment N21, wherein the zwitterion comprises a sulfobetaine group.

Embodiment N23. The article of manufacture of embodiment N20, wherein the additional repeating unit has the structure:

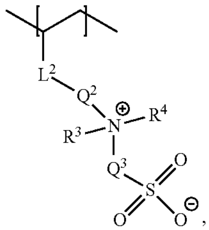

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment N24. The article of manufacture of any one of embodiments N1-N23, wherein the process comprises shaping a mixture of polymer resins into the article of manufacture, wherein the mixture comprises the polymer resin and an additional polymer resin, wherein the additional polymer resin comprises an additional polymer, and wherein the test article of manufacture comprises the additional polymer.

Embodiment N25. The article of manufacture of embodiment N24, wherein the additional polymer comprises a thermoplastic.

Embodiment N26. The article of manufacture of embodiment N24, wherein the additional polymer comprises a thermoset.

Embodiment N27. The article of manufacture of embodiment N24, wherein the additional polymer comprises polypropylene.

Embodiment N28. The article of manufacture of embodiment N24, wherein the additional polymer comprises polyvinyl chloride.

Embodiment N29. The article of manufacture of embodiment N24, wherein the polymer (P1) and the additional polymer (P2) are present in the article of manufacture in a mass-to-mass ratio of about 1:100 to about 100:1 (P1:P2).

Embodiment N30. The article of manufacture of embodiment N29, wherein the mass-to-mass ratio is about 0.5:100.

Embodiment N31. The article of manufacture of embodiment N29, wherein the mass-to-mass ratio is about 2.5:100.

Embodiment N32. The article of manufacture of embodiment N29, wherein the mass-to-mass ratio is about 5:100.

Embodiment X1. A method comprising: contacting a surface of an item with a medium that comprises an electrophilic halogen source, wherein pH of the medium is less than 7, wherein the item comprises a polymer, wherein the polymer comprises a repeating unit, wherein the repeating unit comprises a nitrogen-containing heterocycle, wherein the nitrogen-containing heterocycle forms an N-halamine upon exposure to the electrophilic halogen source.

Embodiment X2. The method of embodiment X1, wherein the medium comprises an electrophilic chlorine source.

Embodiment X3. The method of embodiment X1 or X2, wherein the medium comprises sodium hypochlorite.

Embodiment X4. The method of any one of embodiments X1-X3, wherein the pH of the medium is less than about 6.5.

Embodiment X4. The method of any one of embodiments X1-X4, wherein the pH of the medium is less than about 6.

Embodiment X5. The method of any one of embodiments X1-X5, wherein the pH of the medium is less than about 5.5.

Embodiment X6. The method of any one of embodiments X1-X5, wherein an electrophilic chlorine content of the medium is between about 1,000 parts per million (ppm) to about 10,000 ppm.

Embodiment X7. The method of any one of embodiments X1-X6, wherein the electrophilic chlorine content of the medium is between about 5,000 ppm to about 10,000 ppm.

Embodiment X8. The method of any one of embodiments X1-X8, wherein the contacting comprises immersing a portion of the item in the medium.

Embodiment X9. The method of any one of embodiments X1-X8, wherein the contacting is performed for at least about 1 minute.

Embodiment X10. The method of any one of embodiments X1-X9, wherein the contacting is performed for at least about 30 minutes.

Embodiment X11. The method of any one of embodiments X1-X10, wherein a biocidal activity of the surface of the item is increased by at least 2-fold by the contacting.

Embodiment X12. The method of embodiment X11, wherein the biocidal activity of the surface of the item is increased by at least 5-fold as compared to the item without the contacting.

Embodiment X13. The method of any one of embodiments X1-X12, wherein the surface of the item maintains a biocidal activity for at least about 24 hours after the contacting.

Embodiment X14. The method of embodiment X13, wherein the surface of the item maintains the biocidal activity for at least about 1 week after the contacting.

Embodiment X15. The method of any one of embodiments X1-X14, wherein the polymer is a copolymer comprising the repeating unit and an additional repeating unit.

Embodiment X16. The method of embodiment X15, wherein the additional repeating unit comprises a non-fouling moiety.

Embodiment X17. The method of embodiment X15, wherein a number average molar mass of the copolymer is at least about 5 kilodaltons (kDa).

Embodiment X18. The method of embodiment X17, wherein the number average molar mass of the copolymer is at least about 10 kDa.

Embodiment X19. The method of any one of embodiments X1-X18, wherein a number average molar mass of the polymer is at least about 0.5 kDa.

Embodiment X20. The method of embodiment X19, wherein the number average molar mass of the polymer is at least about 1 kDa.

Embodiment X21. The method of embodiment X20, wherein the number average molar mass of the polymer is at least about 5 kDa.

Embodiment Y1. A composition comprising: a polymer comprising a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source, wherein the N-halamine exhibits antiviral activity, wherein, in a study of biocidal activity of a test composition, wherein the test composition comprises the polymer, wherein the study comprises contacting a surface of the test composition with a biological sample for a period of time, wherein the biological sample comprises (i) a microorganism inoculum and (ii) an organic soil content of about 0.68% by weight of the biological sample, wherein the biocidal activity is measured subsequent to the period of time via a fifty-percent-tissue-culture-infective-dose ($TCID_{50}$) assay, and wherein the period of time is at least about 1 hour, then the surface of the test composition exhibits a reduction of the microorganism inoculum of at least about 0.1 log relative to a surface of a control composition as determined by the $TCID_{50}$ assay, wherein the control composition does not comprise the polymer.

Embodiment Y2. The composition of embodiment YT, wherein the microorganism inoculum comprises a bacterial inoculum.

Embodiment Y3. The composition of embodiment Y1 or Y2, wherein the microorganism inoculum comprises a viral inoculum.

Embodiment Y4. The composition of any one of embodiments Y1-Y3, wherein the organic soil content comprises (1) a Bovine Serum Albumin content of about 0.25% by weight of the biological sample, (2) a Bovine Mucin content of about 0.08% by weight of the biological sample, and (3) a Yeast Extract content of about 0.35% by weight of the biological sample.

Embodiment Y5. The composition of any one of embodiments Y1-Y4, wherein the reduction of the microorganism inoculum is at least about 0.5 log reduction.

Embodiment Y6. The composition of any one of embodiments Y1-Y5, wherein the reduction of the microorganism inoculum is at least about 1 log reduction.

Embodiment Y7. The composition of any one of embodiments Y1-Y6, wherein the reduction of the microorganism inoculum is at least about 2 log reduction.

Embodiment Y8. The composition of any one of embodiments Y1-Y7, wherein the reduction of the microorganism inoculum is at least about 3 log reduction.

Embodiment Y9. The composition of any one of embodiments Y1-Y8, wherein the reduction of the microorganism inoculum is at least about 3.5 log reduction.

Embodiment Y10. The composition of any one of embodiments Y1-Y9, wherein the period of time is at least about 2 hours.

Embodiment Y11. The composition of any one of embodiments Y1-Y10, wherein the period of time is at least about 8 hours.

Embodiment Y12. The composition of any one of embodiments Y1-Y11, wherein, in the study, the surface of the test composition is determined to have a content of oxidative chlorine of at least about $10^{10}$ atoms/$cm^2$ as measured by an iodometric titration assay.

Embodiment Y13. The composition of embodiment Y12, wherein the content of oxidative chlorine is from about $10^{12}$ to about $10^{18}$ atoms/$cm^2$.

Embodiment Y14. The composition of embodiment Y12, wherein the content of oxidative chlorine is from about $10^{13}$ to about $10^{17}$ atoms/$cm^2$.

Embodiment Y15. The composition of any one of embodiments Y1-Y14, wherein the nitrogen-containing heterocycle comprises a hydantoin group.

Embodiment Y13. The composition of embodiment Y15, wherein the hydantoin group has the structure:

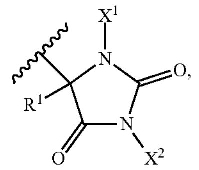

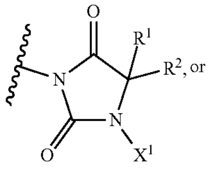

or

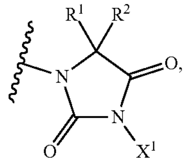

wherein: $X^1$ is H or halogen; $X^2$ is H or halogen; $R^1$ is H or $C_1$-$C_4$ alkyl; and $R^2$ is H or $C_1$-$C_4$ alkyl.

Embodiment Y17. The composition of any one of embodiments Y1-Y16, wherein the repeating unit has the structure:

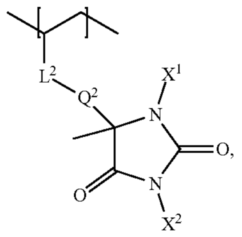

wherein: $L^1$ is an amide, ester, or arylene group; $Q^1$ is alkylene or absent; $X^1$ is H or halogen; and $X^2$ is H or halogen.

Embodiment Y18. The composition of embodiment Y17, wherein $X^1$ is H and $X^2$ is H.

Embodiment Y19. The composition of embodiment Y17, wherein $X^1$ is Cl and $X^2$ is Cl.

Embodiment Y20. The composition of embodiment Y17, wherein one of $X^1$ and $X^2$ is Cl and one of $X^1$ and $X^2$ is H.

Embodiment Y21. The composition of any one of embodiments Y1-Y20, wherein the polymer is a homopolymer.

Embodiment Y22. The composition of any one of embodiments Y1-Y21, wherein the polymer further comprises an additional repeating unit comprising a non-fouling moiety.

Embodiment Y23. The composition of embodiment Y22, wherein the non-fouling moiety comprises a zwitterion.

Embodiment Y24. The composition of embodiment Y23, wherein the zwitterion comprises a sulfobetaine group.

Embodiment Y25. The composition of embodiment Y22, wherein the additional repeating unit has the structure:

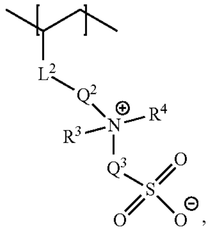

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment Y26. The composition of any one of embodiments Y1-Y25, further comprising an additional polymer.

Embodiment Y27. The composition of embodiment Y26, wherein the additional polymer comprises a thermoplastic.

Embodiment Y28. The composition of embodiment Y26, wherein the additional polymer comprises a thermoset.

Embodiment Y29. The composition of embodiment Y26, wherein the additional polymer comprises polypropylene.

Embodiment Y30. The composition of embodiment Y26, wherein the additional polymer comprises polyvinyl chloride.

Embodiment Y31. The composition of embodiment Y26, wherein the polymer (P1) and the additional polymer (P2) are present in the composition in a mass-to-mass ratio of about 1:100 to about 100:1 (P1:P2).

Embodiment Y32. The composition of embodiment Y31, wherein the mass-to-mass ratio is about 0.5:100.

Embodiment Y33. The composition of embodiment Y31, wherein the mass-to-mass ratio is about 2.5:100.

Embodiment Y34. The composition of embodiment Y31, wherein the mass-to-mass ratio is about 5:100.

Embodiment Z1. An article of manufacture prepared by a process, wherein the process comprises shaping a polymer resin into the article of manufacture, wherein the polymer resin comprises a polymer, wherein the polymer comprises a repeating unit, wherein the repeating unit comprises a side chain, wherein the side chain comprises a nitrogen-containing heterocycle, and wherein the nitrogen-containing heterocycle forms an N-halamine when exposed to an electrophilic halogen source, wherein the N-halamine exhibits antiviral activity, and wherein, in a study of biocidal activity of a test article of manufacture, wherein the test article of manufacture comprises the polymer, wherein the study comprises contacting a surface of the test article of manufacture with a biological sample for a period of time, wherein the biological sample comprises (i) a microorganism inoculum and (ii) an organic soil content of about 0.68% by weight of the biological sample, wherein the biocidal activity is measured subsequent to the period of time via a fifty-percent-tissue-culture-infective-dose ($TCID_{50}$) assay, and wherein the period of time is at least about 1 hour, then the surface of the test article of manufacture exhibits a reduction of the microorganism inoculum of at least about 0.1 log relative to a surface of a control article of manufacture as determined by the $TCID_{50}$ assay, wherein the control article of manufacture does not comprise the polymer.

Embodiment Z2. The article of manufacture of embodiment Z1, wherein the microorganism inoculum comprises a bacterial inoculum.

Embodiment Z3. The article of manufacture of embodiment Z1 or Z2, wherein the microorganism inoculum comprises a viral inoculum.

Embodiment Z4. The article of manufacture of any one of embodiments Z1-Z3, wherein the organic soil content comprises (1) a Bovine Serum Albumin content of about 0.25% by weight of the biological sample, (2) a Bovine Mucin content of about 0.08% by weight of the biological sample, and (3) a Yeast Extract content of about 0.35% by weight of the biological sample.

Embodiment Z5. The article of manufacture of any one of embodiments Z1-Z4, wherein the reduction of the microorganism inoculum is at least about 0.5 log reduction.

Embodiment Z6. The article of manufacture of any one of embodiments Z1-Z5, wherein the reduction of the microorganism inoculum is at least about 1 log reduction.

Embodiment Z7. The article of manufacture of any one of embodiments Z1-Z6, wherein the reduction of the microorganism inoculum is at least about 2 log reduction.

Embodiment Z8. The article of manufacture of any one of embodiments Z1-Z7, wherein the reduction of the microorganism inoculum is at least about 3 log reduction.

Embodiment Z9. The article of manufacture of any one of embodiments Z1-Z8, wherein the reduction of the microorganism inoculum is at least about 3.5 log reduction.

Embodiment Z10. The article of manufacture of any one of embodiments Z1-Z9, wherein the period of time is at least about 2 hours.

Embodiment Z11. The article of manufacture of any one of embodiments Z1-Z10, wherein the period of time is at least about 8 hours.

Embodiment Z12. The article of manufacture of any one of embodiments Z1-Z11, wherein, in the study, the surface of the test article of manufacture is determined to have a content of oxidative chlorine of at least about $10^{10}$ atoms/$cm^2$ as measured by an iodometric titration assay.

Embodiment Z13. The article of manufacture of embodiment Z12, wherein the content of oxidative chlorine is from about $10^{12}$ to about $10^{18}$ atoms/$cm^2$.

Embodiment Z14. The article of manufacture of embodiment Z12, wherein the content of oxidative chlorine is from about $10^{13}$ to about $10^{17}$ atoms/$cm^2$.

Embodiment Z15. The article of manufacture of any one of embodiments Z1-Z14, wherein the nitrogen-containing heterocycle comprises a hydantoin group.

Embodiment Z13. The article of manufacture of embodiment Z15, wherein the hydantoin group has the structure:

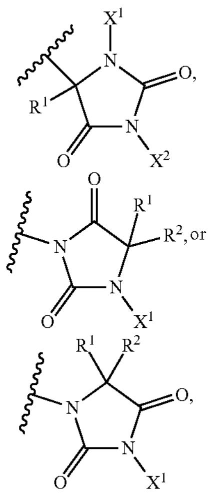

wherein: $X^1$ is H or halogen; $X^2$ is H or halogen; $R^1$ is H or C1-C4 alkyl; and $R^2$ is H or C1-C4 alkyl.

Embodiment Z17. The article of manufacture of any one of embodiments Z1-Z16, wherein the repeating unit has the structure:

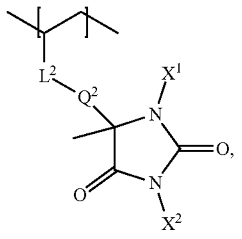

wherein: $L^1$ is an amide, ester, or arylene group; $Q^1$ is alkylene or absent; $X^1$ is H or halogen; and $X^2$ is H or halogen.

Embodiment Z18. The article of manufacture of embodiment Z17, wherein $X^1$ is H and X is H.

Embodiment Z19. The article of manufacture of embodiment Z17, wherein $X^1$ is Cl and $X^2$ is Cl.

Embodiment Z20. The article of manufacture of embodiment Z17, wherein one of X and $X^2$ is Cl and one of $X^1$ and $X^2$ is H.

Embodiment Z21. The article of manufacture of any one of embodiments Z1-Z20, wherein the polymer is a homopolymer.

Embodiment Z22. The article of manufacture of any one of embodiments Z1-Z21, wherein the polymer further comprises an additional repeating unit comprising a non-fouling moiety.

Embodiment Z23. The article of manufacture of embodiment Z22, wherein the non-fouling moiety comprises a zwitterion.

Embodiment Z24. The article of manufacture of embodiment Z23, wherein the zwitterion comprises a sulfobetaine group.

Embodiment Z25. The article of manufacture of embodiment Z22, wherein the additional repeating unit has the structure:

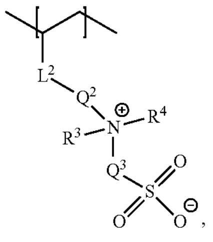

wherein: $L^2$ is an amide or ester group; $Q^2$ is alkylene or absent; $Q^3$ is alkylene; $R^3$ is $C_1$-$C_4$ alkyl; and $R^4$ is $C_1$-$C_4$ alkyl.

Embodiment Z26. The article of manufacture of any one of embodiments Z1-Z25, further comprising an additional polymer.

Embodiment Z27. The article of manufacture of embodiment Z26, wherein the additional polymer comprises a thermoplastic.

Embodiment Z28. The article of manufacture of embodiment Z26, wherein the additional polymer comprises a thermoset.

Embodiment Z29. The article of manufacture of embodiment Z26, wherein the additional polymer comprises polypropylene.

Embodiment Z30. The article of manufacture of embodiment Z26, wherein the additional polymer comprises polyvinyl chloride.

Embodiment Z31. The article of manufacture of embodiment Z26, wherein the polymer (P1) and the additional polymer (P2) are present in the article of manufacture in a mass-to-mass ratio of about 1:100 to about 100:1 (P1:P2).

Embodiment Z32. The article of manufacture of embodiment Z31, wherein the mass-to-mass ratio is about 0.5:100.

Embodiment Z33. The article of manufacture of embodiment Z31, wherein the mass-to-mass ratio is about 2.5:100.

Embodiment Z34. The article of manufacture of embodiment Z31, wherein the mass-to-mass ratio is about 5:100.

What is claimed is:

1. A sample of a copolymer, wherein the copolymer comprises a first repeating unit and a second repeating unit, wherein:

(i) the first repeating unit comprises a nitrogen-containing heterocycle, wherein the nitrogen-containing heterocycle forms an N-halamine when exposed to an electrophilic halogen source, (ii) the second repeating unit comprises a non-fouling moiety, wherein the non-fouling moiety comprises a zwitterion, and (iii) the copolymer does not comprise a repeating unit that comprises a catechol group, wherein a number average molar mass of the copolymer in the sample is at most about 25 kilodaltons (kDa).

2. The sample of claim 1, wherein a number average molar mass of the copolymer in the sample is at least about 21 kilodaltons (kDa).

3. The sample of claim 1, wherein a number average molar mass of the copolymer in the sample is from about 3 kDa to about 25 kDa.

4. The sample of claim 1, wherein the nitrogen-containing heterocycle is on a side chain of the first repeating unit.

5. The sample of claim 1, wherein the sample has a polydispersity ranging from about 1 to about 4 as determined by a gel permeation chromatograph.

6. The sample of claim 1, wherein the sample has a polydispersity of less than about 2.9.

7. The sample of claim 1, wherein the nitrogen-containing heterocycle comprises a hydantoin group, wherein the hydantoin group has the structure:

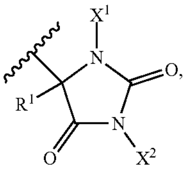

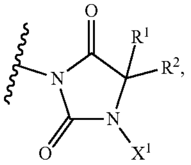

or

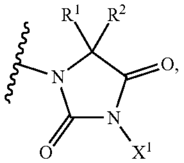

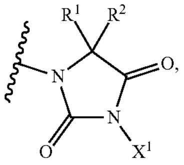

wherein:

$X^1$ is H or halogen, $X^2$ is H or halogen, $R^1$ is H or $C_1$-$C_4$ alkyl, and $R^2$ is H or $C_1$-$C_4$ alkyl.

8. The sample of claim 1, wherein the first repeating unit has the structure:

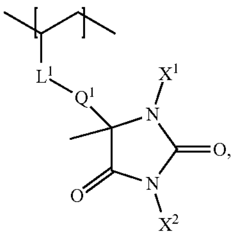

wherein:

$L^1$ is an amide, ester, or arylene group, $Q^1$ is alkylene or absent, $X^1$ is H or halogen, and $X^2$ is H or halogen.

9. The sample of claim 8, wherein $X^1$ is H and $X^2$ is H.

10. The sample of claim 8, wherein $X^1$ is Cl and $X^2$ is Cl.

11. The sample of claim 8, wherein one of $X^1$ and $X^2$ is Cl and one of $X^1$ and $X^2$ is H.

12. The sample of claim 1, wherein the first repeating unit (RU1) and the second repeating unit (RU2) are present in the copolymer in a molar ratio of about 4:1 to about 1:2 (RU1: RU2).

13. The sample of claim 12, wherein the molar ratio of RU1: RU2 is about 2:1.

14. The sample of claim 1, wherein the zwitterion comprises a sulfobetaine group.

15. The sample of claim 1, wherein the second repeating unit has the structure:

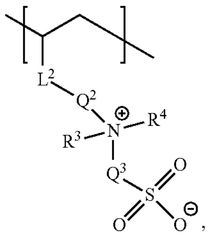

wherein:

$L^2$ is an amide or ester group, $Q^2$ is alkylene or absent, $Q^3$ is alkylene, $R^3$ is $C_1$-$C_4$ alkyl, and $R^4$ is $C_1$-$C_4$ alkyl.

16. The sample of claim 1, wherein the second repeating unit has the structure:

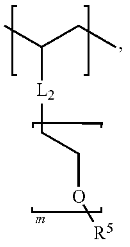

wherein:

$L^2$ is an amide or ester group, $R^5$ is hydrogen or alkyl, and m is 1 to 500.

17. The sample of claim 16, wherein the second repeating unit has the structure:

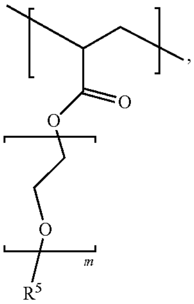

wherein:

$R^5$ is hydrogen or alkyl, and m is 1 to 500.

* * * * *